US007123575B2

(12) United States Patent
Tanaka et al.

(10) Patent No.: US 7,123,575 B2
(45) Date of Patent: Oct. 17, 2006

(54) RECORDING MEDIUM AND AUDIO-SIGNAL PROCESSING APPARATUS

(75) Inventors: Yoshiaki Tanaka, Fujisawa (JP); Norihiko Fuchigami, Yamato (JP); Shoji Ueno, Fujisawa (JP)

(73) Assignee: Victor Company of Japan, Ltd., Yokohama (JP)

( * ) Notice: Subject to any disclaimer, the term of this patent is extended or adjusted under 35 U.S.C. 154(b) by 636 days.

(21) Appl. No.: 10/648,406

(22) Filed: Aug. 27, 2003

(65) Prior Publication Data

US 2004/0208095 A1 Oct. 21, 2004

Related U.S. Application Data

(62) Division of application No. 09/114,185, filed on Jul. 13, 1998, now Pat. No. 6,636,474.

(30) Foreign Application Priority Data

Jul. 16, 1997 (JP) .................................. 9-207242
Jan. 14, 1998 (JP) .................................. 10-18013

(51) Int. Cl.
*G11B 7/00* (2006.01)

(52) U.S. Cl. ................................ 369/275.3; 369/59.25

(58) Field of Classification Search ............. 369/275.3, 369/59.25, 59.24, 44.26, 47.1, 47.27
See application file for complete search history.

(56) References Cited

U.S. PATENT DOCUMENTS 5,706,269 A 1/1998 Ogura et al.
5,737,720 A 4/1998 Miyamori et al.
5,748,594 A 5/1998 Nishio et al.
5,844,513 A 12/1998 Nishio
5,974,380 A 10/1999 Smyth et al.
5,987,417 A 11/1999 Heo et al.
6,173,022 B1 1/2001 McPherson et al.
6,208,802 B1 3/2001 Mori et al.
6,449,227 B1 9/2002 Heo

FOREIGN PATENT DOCUMENTS

EP 0558852 9/1993
EP 0737008 10/1996
EP 0777227 6/1997
EP 0795870 9/1997
EP 0797197 9/1997
EP 0797199 9/1997
EP 0855715 7/1998
EP 0856849 8/1998
EP 0858073 8/1998
EP 0867887 9/1998

OTHER PUBLICATIONS

Stolzmann J: "DVD: Grundlagen, Technische Betrachtung" Fernseh Und Kinotechnik, VDE Verlag GMBH. Berlin, DE, vol. 51, No. 11, Nov. 1, 1997, pp. 716-718, 720, 722-724, XP 000765318, ISSN: 0015-0142.

*Primary Examiner*—Nabil Hindi
(74) *Attorney, Agent, or Firm*—Connolly Bove Lodge & Hutz LLP

(57) ABSTRACT

A digital signal recording disc has a first area and a second area. The second area differs from the first area. The first area stores a first-channel digital audio signal and a second-channel digital audio signal. The first-channel digital audio signal results from quantizing a first-channel analog audio signal with a first quantization bit number. The second-channel digital audio signal results from quantizing a second-channel analog audio signal with a second quantization bit number. The second area stores information of the first and second quantization bit numbers.

5 Claims, 35 Drawing Sheets

AOTT—VOB—AST—ATR
b127 b126 b125 b124 b123 b122 b121 b120
AUDIO ENCODING MODE
b119 b118 b117 b116 b115 b114 b113 b112
b111 b110 b109 b108 b107 b106 b105 b104
Q
b103 b102 b101 b100 b99 b98 b97 b96
fs
b95 b94 b93 b92 b91 b90 b89 b88
MULTICHANNEL STRUCTURE TYPE | CHANNEL ASSIGNMENT
b87 b86 b85 b84 b83 b82 b81 b80
DECODING AUDIO STREAM NUMBER
b79 b78 b77 b76 b75 b74 b73 b72
MPEG AUDIO DRC | COMPRESSION AUDIO CHANNEL NUMBER
b71 b70 b69 b68 b67 b66 b65 b64
b63 b62 b61 b60 b59 b58 b57 b56
b55 b54 b53 b52 b51 b50 b49 b48
b47 b46 b45 b44 b43 b42 b41 b40
b39 b38 b37 b36 b35 b34 b33 b32
b31 b30 b29 b28 b27 b26 b25 b24
b23 b22 b21 b20 b19 b18 b17 b16
b15 b14 b13 b12 b11 b10 b9 b8
b7 b6 b5 b4 b3 b2 b1 b0

FIG. 5

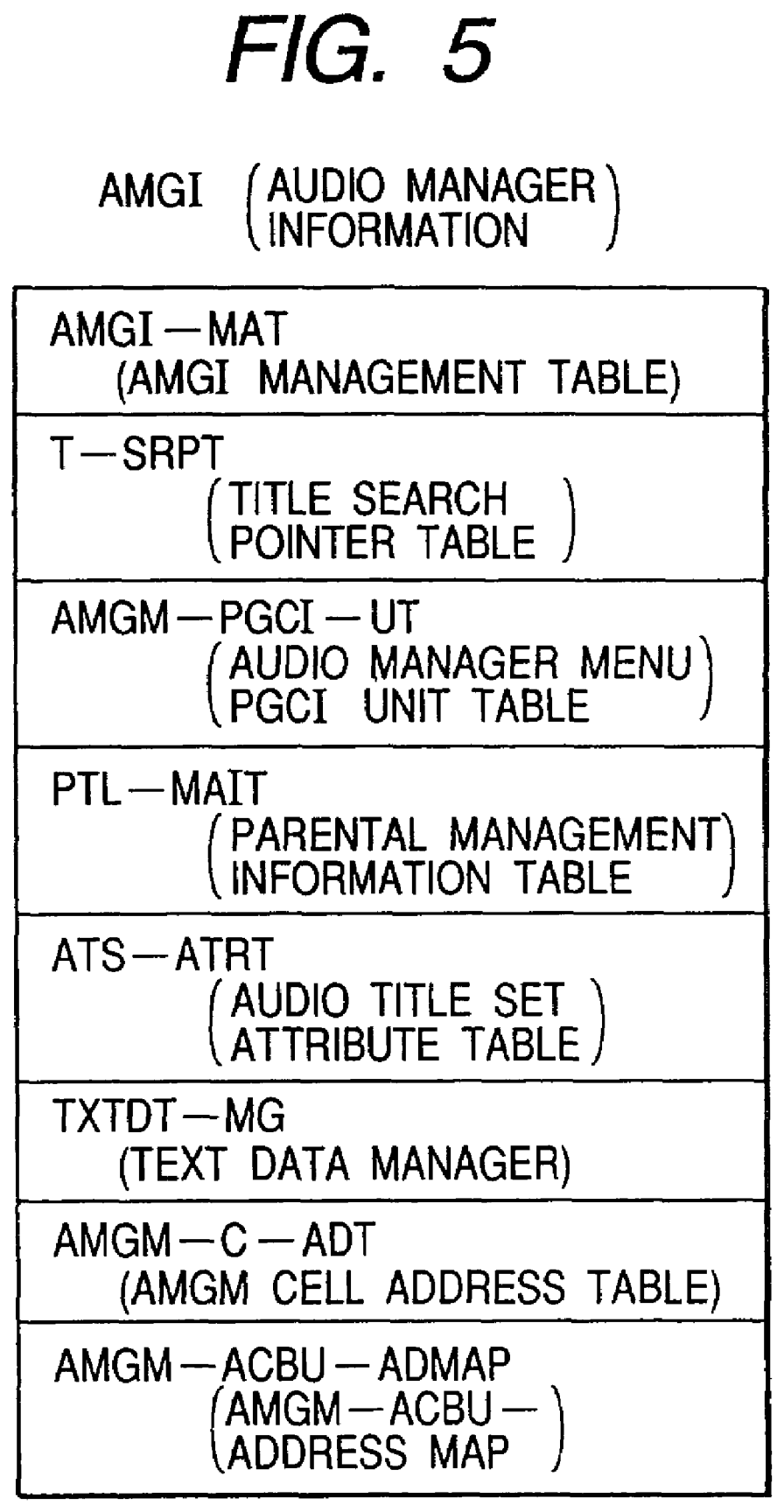

AMGI (AUDIO MANAGER INFORMATION)

| |
|---|
| AMGI—MAT (AMGI MANAGEMENT TABLE) |
| T—SRPT (TITLE SEARCH POINTER TABLE) |
| AMGM—PGCI—UT (AUDIO MANAGER MENU PGCI UNIT TABLE) |
| PTL—MAIT (PARENTAL MANAGEMENT INFORMATION TABLE) |
| ATS—ATRT (AUDIO TITLE SET ATTRIBUTE TABLE) |
| TXTDT—MG (TEXT DATA MANAGER) |
| AMGM—C—ADT (AMGM CELL ADDRESS TABLE) |
| AMGM—ACBU—ADMAP (AMGM—ACBU—ADDRESS MAP) |

ATS—ATRT (AUDIO TITLE SET ATTRIBUTE TABLE)

ATS—ATR (ATS ATTRIBUTE)

| Field | | Size |
|---|---|---|
| ATS—ATR—EA (END ADDRESS) | | 4 BYTES |
| ATS—CAT (CATEGORY) | | 4 BYTES |
| ATS—ATR I (ATS—ATR INFORMATION) | | 768 BYTES |

FIG. 8

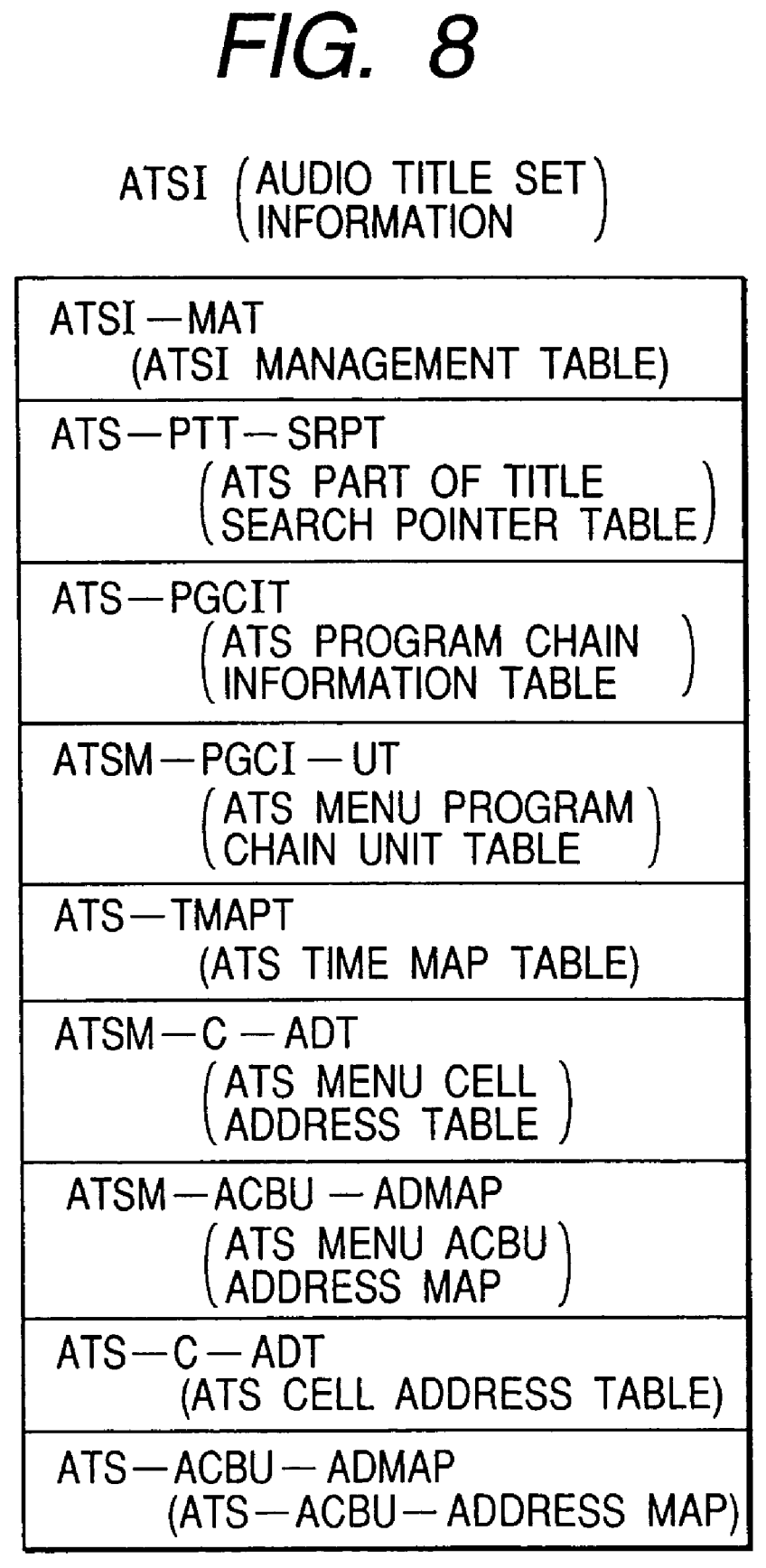

ATSI (AUDIO TITLE SET INFORMATION)

| ATSI |
|---|
| ATSI—MAT (ATSI MANAGEMENT TABLE) |
| ATS—PTT—SRPT (ATS PART OF TITLE SEARCH POINTER TABLE) |
| ATS—PGCIT (ATS PROGRAM CHAIN INFORMATION TABLE) |
| ATSM—PGCI—UT (ATS MENU PROGRAM CHAIN UNIT TABLE) |
| ATS—TMAPT (ATS TIME MAP TABLE) |
| ATSM—C—ADT (ATS MENU CELL ADDRESS TABLE) |
| ATSM—ACBU—ADMAP (ATS MENU ACBU ADDRESS MAP) |
| ATS—C—ADT (ATS CELL ADDRESS TABLE) |
| ATS—ACBU—ADMAP (ATS—ACBU—ADDRESS MAP) |

FIG. 9

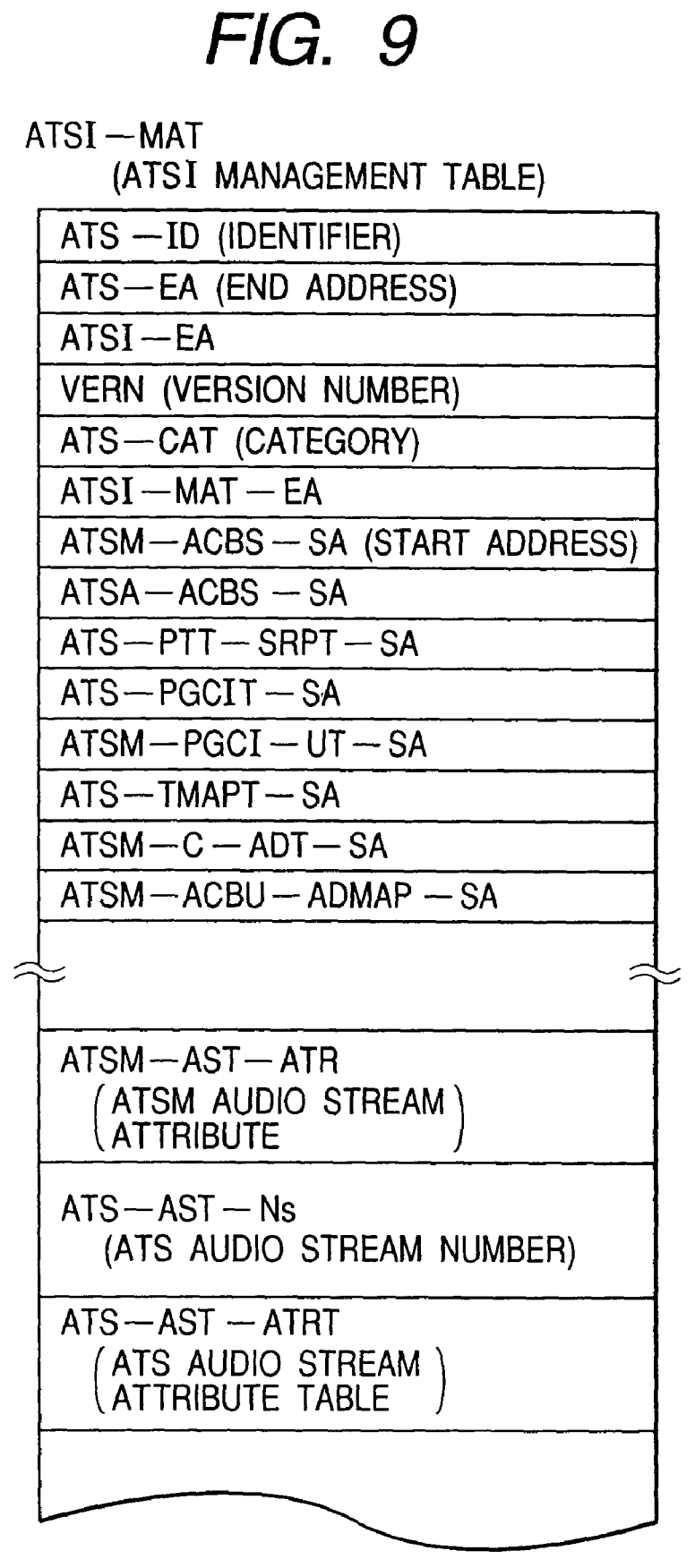

ATSI—MAT
(ATSI MANAGEMENT TABLE)

| ATS—ID (IDENTIFIER) |
|---|
| ATS—EA (END ADDRESS) |
| ATSI—EA |
| VERN (VERSION NUMBER) |
| ATS—CAT (CATEGORY) |
| ATSI—MAT—EA |
| ATSM—ACBS—SA (START ADDRESS) |
| ATSA—ACBS—SA |
| ATS—PTT—SRPT—SA |
| ATS—PGCIT—SA |
| ATSM—PGCI—UT—SA |
| ATS—TMAPT—SA |
| ATSM—C—ADT—SA |
| ATSM—ACBU—ADMAP—SA |
| ≈ |
| ATSM—AST—ATR (ATSM AUDIO STREAM ATTRIBUTE) |
| ATS—AST—Ns (ATS AUDIO STREAM NUMBER) |
| ATS—AST—ATRT (ATS AUDIO STREAM ATTRIBUTE TABLE) |
| |

FIG. 11

ATS—AST—ATRT

| | | |
|---|---|---|
| AUDIO STREAM (AST) #0 | ATS—AST—ATR | 8 BYTES |
| AUDIO STREAM (AST) #1 | ATS—AST—ATR | 8 BYTES |
| AUDIO STREAM (AST) #2 | ATS—AST—ATR | 8 BYTES |
| AUDIO STREAM (AST) #3 | ATS—AST—ATR | 8 BYTES |
| AUDIO STREAM (AST) #4 | ATS—AST—ATR | 8 BYTES |
| AUDIO STREAM (AST) #5 | ATS—AST—ATR | 8 BYTES |
| AUDIO STREAM (AST) #6 | ATS—AST—ATR | 8 BYTES |
| AUDIO STREAM (AST) #7 | ATS—AST—ATR | 8 BYTES |

FIG. 16

ACD (636 BYTES)

| GENERAL INFORMATION | 48 BYTES | |
|---|---|---|
| NAME SPACE | 93 BYTES | 93 BYTES |
| FREE SPACE 1 | 93 BYTES | 93 BYTES |
| FREE SPACE 2 | 93 BYTES | 93 BYTES |
| DATA POINTER | 15 BYTES | 15 BYTES |
| TOTAL | 294 BYTES | 294 BYTES |
| | FIRST LANGUAGE | SECOND LANGUAGE |

FIG. 17

キョクモクカイセツ
前作のエディング曲
" FORGET-ME-NOT "

FIG. 20

| | 2CH (STEREO) | 6CH | 8CH | Mbps | TIME (MIN) | ABOVE 80MIN |
|---|---|---|---|---|---|---|
| 2ch | 48khz /16bit (1.536Mbps)<br>48khz /20bit (1.920Mbps)<br>48khz /24bit (2.304Mbps) | | | 1.536<br>1.920<br>2.304 | 387<br>310<br>258 | *<br>*<br>* |
| | 96khz /16bit (3.072Mbps)<br>96khz /20bit (3.804Mbps)<br>96khz /24bit (4.608Mbps) | | | 3.072<br>3.804<br>4.608 | 194<br>156<br>129 | *<br>*<br>* |
| | 192khz /16bit (6.144Mbps)<br>192khz /20bit (7.680Mbps)<br>192khz /24bit (9.216Mbps) | | | 6.144<br>7.680<br>9.216 | 97<br>78<br>65 | * |
| 2+6ch | 48khz /16bit (1.536Mbps) | 48khz /16bit (4.608Mbps)<br>48khz /20bit (5.760Mbps)<br>48khz /24bit (6.912Mbps) | | 6.144<br>7.296<br>8.448 | 97<br>82<br>70 | *<br>* |
| | 48khz /20bit (1.920Mbps) | 48khz /16bit (4.608Mbps)<br>48khz /20bit (5.760Mbps)<br>48khz /24bit (6.912Mbps) | | 6.528<br>7.680<br>8.832 | 91<br>78<br>67 | * |
| | 48khz /24bit (2.304Mbps) | 48khz /16bit (4.608Mbps)<br>48khz /20bit (5.760Mbps)<br>48khz /24bit (6.912Mbps) | | 6.912<br>8.064<br>9.216 | 86<br>74<br>65 | * |
| | 96khz /16bit (3.072Mbps) | 48khz /16bit (4.608Mbps)<br>48khz /20bit (5.760Mbps) | | 7.680<br>8.832 | 78<br>67 | |
| | 96khz /20bit (3.840Mbps) | 48khz /16bit (4.608Mbps)<br>48khz /20bit (5.760Mbps) | | 8.448<br>9.600 | 71<br>62 | |
| | 96khz /24bit (4.608Mbps) | 48khz /16bit (4.608Mbps) | | 9.216 | 65 | |
| 2+8ch | 48khz /16bit (1.536Mbps) | | 48khz /16bit (6.144Mbps)<br>48khz /20bit (7.680Mbps) | 7.680<br>9.216 | 78<br>65 | |
| | 48khz /20bit (1.920Mbps) | | 48khz /16bit (6.144Mbps)<br>48khz /20bit (7.680Mbps) | 8.064<br>9.600 | 74<br>62 | |
| 6ch | | 48khz /16bit (4.608Mbps)<br>48khz /20bit (5.760Mbps)<br>48khz /24bit (6.912Mbps)<br>96khz /16bit (9.216Mbps) | | 4.608<br>5.760<br>6.912<br>5.216 | 129<br>103<br>86<br>65 | *<br>* |
| 8ch | | | 48khz /16bit (6.144Mbps)<br>48khz /20bit (7.680Mbps)<br>48khz /24bit (9.216Mbps) | 6.144<br>7.680<br>9.216 | 97<br>78<br>65 | * |

FIG. 21

| | 2CH | FRONT 3CH | REAR 2CH, LFE 1CH | Mbps | TIME |
|---|---|---|---|---|---|
| 2+6ch | 48khz / 16bit (1.536Mbps) | 96khz / 16bit (4.608Mbps) | 48khz / 16bit (2.304Mbps) | 8.448 | 70 |
| | 〃 | 96khz / 20bit (5.760Mbps) | 48khz / 16bit (2.304Mbps) | 9.6 | 62 |
| | 48khz / 20bit (1.920Mbps) | 96khz / 16bit (4.608Mbps) | 48khz / 16bit (2.304Mbps) | 8.832 | 67 |

FIG. 22

| | 2CH | FRONT 3CH | REAR 2CH | Mbps | TIME |
|---|---|---|---|---|---|
| 2+5ch | 48khz / 16bit (1.536Mbps) | 96khz / 20bit (5.760Mbps) | 48khz / 16bit (1.536Mbps) | 8.832 | 67 |
| | 48khz / 20bit (1.920Mbps) | 96khz / 20bit (5.760Mbps) | 48khz / 16bit (1.536Mbps) | 9.216 | 65 |
| | 48khz / 20bit (1.920Mbps) | 96khz / 20bit (5.760Mbps) | 48khz / 20bit (1.920Mbps) | 9.6 | 62 |

FIG. 23

| | | FRONT 3CH | REAR 2CH, LFE 1CH | Mbps | TIME |
|---|---|---|---|---|---|
| 6ch | | 96khz / 16bit (4.608Mbps) | 48khz / 16bit (2.304Mbps) | 6.912 | 86 |
| | | 96khz / 20bit (5.760Mbps) | 48khz / 16bit (2.304Mbps) | 8.064 | 74 |
| | | | 48khz / 20bit (2.880Mbps) | 8.64 | 68 |
| | | | 48khz / 24bit (3.456Mbps) | 9.216 | 65 |
| | | 96khz / 24bit (6.912Mbps) | 48khz / 16bit (2.304Mbps) | 9.216 | 65 |

FIG. 32

| CHANNEL ASSIGNMENT INFORMATION (BIT PATTERN) | CHANNEL STRUCTURE OF GROUPS 1, 2 | | | | | | CHANNEL NUMBER IN GROUP 1 | CHANNEL NUMBER IN GROUP 2 |
|---|---|---|---|---|---|---|---|---|
| | ACH0 | ACH1 | ACH2 | ACH3 | ACH4 | ACH5 | | |
| 00000b | C(mono) | none | none | none | none | none | 1 | 0 |
| 00001b | L | R | none | none | none | none | 2 | 0 |
| 00010b | Lf | Rf | S | none | none | none | 2 | 1 |
| 00011b | Lf | Rf | Ls | Rs | none | none | 2 | 2 |
| 00100b | Lf | Rf | LFE | none | none | none | 2 | 1 |
| 00101b | Lf | Rf | LFE | S | none | none | 2 | 2 |
| 00110b | Lf | Rf | LFE | Ls | Rs | none | 2 | 3 |
| 00111b | Lf | Rf | C | none | none | none | 2 | 1 |
| 01000b | Lf | Rf | C | S | none | none | 2 | 2 |
| 01001b | Lf | Rf | C | Ls | Rs | none | 2 | 3 |
| 01010b | Lf | Rf | C | LFE | none | none | 2 | 2 |
| 01011b | Lf | Rf | C | LFE | S | none | 2 | 3 |
| 01100b | Lf | Rf | C | LFE | Ls | Rs | 2 | 4 |
| 01101b | Lf | Rf | C | S | none | none | 3 | 1 |
| 01110b | Lf | Rf | C | Ls | Rs | none | 3 | 2 |
| 01111b | Lf | Rf | C | LFE | none | none | 3 | 1 |
| 10000b | Lf | Rf | C | LFE | S | none | 3 | 2 |
| 10001b | Lf | Rf | C | LFE | Ls | Rs | 3 | 3 |
| 10010b | Lf | Rf | Ls | Rs | LFE | none | 4 | 1 |
| 10011b | Lf | Rf | Ls | Rs | C | none | 4 | 1 |
| 10100b | Lf | Rf | Ls | Rs | C | LFE | 4 | 2 |
| OTHERS | RESERVED | | | | | | | |

CHANNEL GROUP 1 | CHANNEL GROUP 2

FIG. 34

LINEAR PCM PRIVATE HEADER

| | FILED | BIT NUMBER | BYTE NUMBER |
|---|---|---|---|
| | SUB STREAM ID | 8 | 1 |
| | RESERVED | 4 | 2 |
| | ISRC NUMBER | 4 | |
| | ISRC DATA | 8 | |
| | PRIVATE HEADER LENGTH | 8 | 1 |
| | FIRST ACCESS UNIT POINTER | 16 | 2 |
| ADI | AUDIO EMPHASIS FLAG | 1 | 1 |
| ADI | RESERVED | 1 | |
| ADI | RESERVED | 2 | |
| ADI | DOWN MIX CODE | 4 | |
| ADI | QUANTIZATION WORD LENGTH 1 | 4 | 1 |
| ADI | QUANTIZATION WORD LENGTH 2 | 4 | |
| ADI | AUDIO SAMPLING FREQUENCY fs 1 | 4 | 1 |
| ADI | AUDIO SAMPLING FREQUENCY fs 2 | 4 | |
| ADI | RESERVED | 4 | 1 |
| ADI | MULTICHANNEL TYPE | 4 | |
| ADI | RESERVED | 3 | 1 |
| ADI | CHANNEL ASSIGNMENT | 5 | |
| ADI | DYNAMIC RANGE CONTROL | 8 | 1 |
| | STUFFING BYTE | — | 0—7 |

VIDEO SIGNAL
AUDIO SIGNAL
Lf, Rf
C
Ls, Rs
17
D / A
PICTURE CONV
READ
VIDEO PACK BUFFER
CONT PACK DET
PARAMETER
A—CONT PACK DET
AUDIO PACK BUFFER
PCM CONV
TOC MEMORY
14A
fs, Q DET
95
CONTROL UNIT
OPERATION UNIT
REMOTE CONTROL
1
2
3
4
5
6
7
8
9
10
11
12
13
14
18
19
23

17D
VIDEO SIGNAL
AUDIO SIGNAL (Lf, Rf, Ls, Rs) (C, LFE)
CHARACTER INFORMATION
D / A
PICTURE CONV
READ
VIDEO PACK BUFFER
VIDEO PACK DET
PARAMETER
PCM CONV
AUDIO, RTI PACK BUFFER
AUDIO, RTI PACK DET
DISPLAY SIGNAL GENE
DISPLAY
fs, Q DET
CONTROL UNIT
OPERATION UNIT
REMOTE CONTROL
1
2
3A
4
5
6
7
8
9A
10
11A
12
13
14
18
19
20
21
23
95

110
DEMUX
A
A
A—CONT
PCI
131-1
AUDIO BUFFER
(4kB)
131-2
AUDIO BUFFER
(4kB)
151
A—CONT BUFFER
141
PCI BUFFER
132
AUDIO DECODER
133
DECODER BUFFER
152
A—CONT DECODER
153
DECODER BUFFER
142
PCI DECODER
143
DECODER BUFFER
96kHz
48kHz
134-1
D / A
3ch (FRONT)
134-2
D / A
3ch (REAR+LFE)
154
AUDIO HLI BUFFER
155
AUDIO HLI DECODER
156
DECODER BUFFER
144
HLI BUFFER
145
HLI DECODER
146
DECODER BUFFER
105
PACK REPRO
DVD

110
DEMUX
CONT
A—CONT
V
SP
A
PCI
111
VIDEO BUFFER
121
SUB PICTURE BUFFER
(52kB)
131
AUDIO BUFFER
(4kB)
141
PCI BUFFER
(980×3B)
112
VIDEO DECODER
122
SUB PICTURE DECODER
132
AUDIO DECODER
142
PCI DECODER
DECODER BUFFER
113
DECODER BUFFER
123
DECODER BUFFER
133
DECODER BUFFER
143
114
REORDER BUFFER
115
116
LETTER BOX CONVERTER
117
HLI BUFFER
144
HLI DECODER
145
DECODER BUFFER
146
105
PACK REPRO
DVD

RECORDING MEDIUM AND AUDIO-SIGNAL PROCESSING APPARATUS

This application is a divisional of U.S. Ser. No. 09/114,185, filed Jul. 13, 1998 now U.S. Pat. No. 6,636,474.

BACKGROUND OF THE INVENTION

1. Field of the Invention

This invention relates to a recording medium such as a digital video disc, or a digital versatile disc (DVD). Also, this invention relates to an apparatus for encoding an audio signal. Furthermore, this invention relates to an apparatus for decoding an audio signal. In addition, this invention relates to an optical disc player such as a DVD (digital video disc) player.

2. Description of the Related Art

Optical discs for storing information include digital video discs (DVD's). A standard DVD stores a combination of an audio signal and a video signal. The audio-signal recording capacity of the standard DVD is significantly smaller than the video-signal recording capacity thereof. It is difficult to manage time-related information of the audio signal recorded on the standard DVD. It is difficult to read out information of the titles of tunes represented by the audio signal recorded on the standard DVD.

SUMMARY OF THE INVENTION

It is a first object of this invention to provide an improved recording medium.

It is a second object of this invention to provide an improved apparatus for encoding an audio signal.

It is a third object of this invention to provide an improved apparatus for decoding an audio signal.

It is a fourth object of this invention to provide an improved optical disc player.

A first aspect of this invention provides a digital signal recording disc comprising a first area storing a first-channel digital audio signal and a second-channel digital audio signal, the first-channel digital audio signal resulting from quantizing a first-channel analog audio signal with a first quantization bit number, the second-channel digital audio signal resulting from quantizing a second-channel analog audio signal with a second quantization bit number; and a second area differing from the first area and storing information of the first and second quantization bit numbers.

A second aspect of this invention is based on the first aspect thereof, and provides a digital signal recording disc wherein the first-channel digital audio signal comprises a front-channel digital audio signal and the second channel digital audio signal comprises a rear-channel digital audio signal, and the first and second quantization bit numbers are different from each other.

A third aspect of this invention provides a digital signal recording disc comprising a first area storing a first-channel digital audio signal and a second-channel digital audio signal, the first-channel digital audio signal resulting from an analog-to-digital conversion of a first-channel analog audio signal at a first sampling frequency, the second-channel digital audio signal resulting from an analog-to-digital conversion of a second-channel analog audio signal at a second sampling frequency; and a second area differing from the first area and storing information of the first and second sampling frequencies.

A fourth aspect of this invention is based on the third aspect thereof, and provides a digital signal recording disc wherein the first-channel digital audio signal comprises a front-channel digital audio signal and the second-channel digital audio signal comprises a rear-channel digital audio signal, and the first and second sampling frequencies are different from each other.

A fifth aspect of this invention is based on the third aspect thereof, and provides a digital signal recording disc wherein the first-channel digital audio signal comprises a front-channel digital audio signal and the second-channel digital audio signal comprises a rear-channel digital audio signal, and the first and second sampling frequencies are equal to each other, and wherein the rear-channel digital audio signal results from thinning (decimation), and the second area stores information of the thinning (the decimation).

A sixth aspect of this invention is based on the third aspect thereof, and provides a digital signal recording disc wherein the first-channel digital audio signal comprises a front-channel digital audio signal and the second-channel digital audio signal comprises a low-frequency-effect-channel digital audio signal, and the first and second sampling frequencies are equal to each other, and wherein the low-frequency-effect-channel digital audio signal results from thinning, and the second area stores information of the thinning.

A seventh aspect of this invention provides a digital signal recording disc comprising a first area storing a first-channel digital audio signal and a second-channel digital audio signal, the first-channel digital audio signal resulting from an analog-to-digital conversion of a first-channel analog audio signal at a first sampling frequency and a first quantization bit number, the second-channel digital audio signal resulting from an analog-to-digital conversion of a second-channel analog audio signal at a second sampling frequency and a second quantization bit number, the second sampling frequency differing from the first sampling frequency, the second quantization bit number differing from the first quantization bit number; and a second area differing from the first area and storing information of the first and second sampling frequencies and also information of the first and second quantization bit numbers.

An eighth aspect of this invention provides a digital signal recording disc comprising a first area storing at least first-channel and second-channel digital audio signals each assigned to either a first channel group or a second channel group, the digital audio signal in the first channel group resulting from an analog-to-digital conversion of a first analog audio signal at a first sampling frequency and a first quantization bit number, the digital audio signal in the second channel group resulting from an analog-to-digital conversion of a second analog audio signal at a second sampling frequency and a second quantization bit number; and a second area differing from the first area and storing information of the first and second sampling frequencies and information of the first and second quantization bit numbers, and also information of the assignment of the first-channel and second-channel digital audio signals to the first and second channel groups.

A ninth aspect of this invention is based on the seventh aspect thereof, and provides a digital signal recording disc wherein the first area stores left-channel and right-channel stereophonic digital audio signals, the left-channel and right-channel stereophonic digital audio signals resulting from an analog-to-digital conversion of left-channel and right-channel stereophonic analog audio signals at a third sampling frequency, and wherein the second area stores information of the third sampling frequency.

A tenth aspect of this invention is based on the seventh aspect thereof, and provides a digital signal recording disc wherein the first area stores left-channel and right-channel stereophonic digital audio signals, the left-channel and right-channel stereophonic digital audio signals resulting from an analog-to-digital conversion of left-channel and right-channel stereophonic analog audio signals at a third quantization bit number, and wherein the second area stores information of the third quantization bit number.

An eleventh aspect of this invention is based on the ninth aspect thereof, and provides a digital signal recording disc wherein the left-channel and right-channel stereophonic digital audio signals differ from the first-channel and second-channel digital audio signals, and the first area comprises a first sub area storing the first-channel and the second-channel digital audio signals and a second sub area storing the left-channel and right-channel stereophonic digital audio signals.

A twelfth aspect of this invention is based on the seventh aspect thereof, and provides a digital signal recording disc wherein the first-channel and second-channel digital audio signals result from an encoding process selected from among an AC-3 encoding process, an MPEG-1 encoding process, and an MPEG-2 encoding process.

A thirteenth aspect of this invention provides an audio-signal encoding apparatus comprising first means for quantizing a front-channel analog audio signal into a corresponding front-channel digital audio signal at a first quantization bit number; second means for quantizing a rear-channel analog audio signal into a corresponding rear-channel digital audio signal at a second quantization bit number differing from the first quantization bit number; and third means for formatting the front-channel digital audio signal, the rear-channel digital audio signal, and information of the first and second quantization bit numbers into a structure having first and second areas, the first area containing the front-channel digital audio signal and the rear-channel digital audio signal, the second area differing from the first area and containing the information of the first and second quantization bit numbers.

A fourteenth aspect of this invention provides an audio-signal encoding apparatus comprising first means for quantizing a front-channel analog audio signal into a corresponding front-channel digital audio signal at a first sampling frequency; second means for quantizing a rear-channel analog audio signal into a corresponding rear-channel digital audio signal at a second sampling frequency differing from the first sampling frequency; and third means for formatting the front-channel digital audio signal, the rear-channel digital audio signal, and information of the first and second sampling frequencies into a structure having first and second areas, the first area containing the front-channel digital audio signal and the rear-channel digital audio signal, the second area differing from the first area and containing the information of the first and second sampling frequencies.

A fifteenth aspect of this invention provides an audio-signal encoding apparatus comprising first means for quantizing a front-channel analog audio signal into a corresponding front-channel digital audio signal at a first quantization bit number and a first sampling frequency; second means for quantizing a rear-channel analog audio signal into a corresponding rear-channel digital audio signal at a second quantization bit number and a second sampling frequency, the second quantization bit number differing from the first quantization bit number, the second sampling frequency differing from the first sampling frequency; and third means for formatting the front-channel digital audio signal, the rear-channel digital audio signal, information of the first and second quantization bit numbers, and information of the first and second sampling frequencies into a structure having first and second areas, the first area containing the front-channel digital audio signal and the rear-channel digital audio signal, the second area differing from the first area and containing the information of the first and second quantization bit numbers and the information of the first and second sampling frequencies.

A sixteenth aspect of this invention provides an audio-signal encoding apparatus comprising first means for assigning each of first-channel and second-channel analog audio signals to either a first channel group or a second channel group; second means for quantizing the analog audio signal in the first channel group into a corresponding digital audio signal in the first channel group at a first sampling frequency and a first quantization bit number; third means for quantizing the analog audio signal in the second channel group into a corresponding digital audio signal in the second channel group at a second sampling frequency and a second quantization bit number; and fourth means for formatting the digital audio signals in the first and second channel groups, information of the first and second quantization bit numbers, information of the first and second sampling frequencies, and information of the assignment of the first-channel and second-channel analog audio signals to the first and second channel groups into a structure having first and second areas, the first area containing the digital audio signals of the first and second channel groups, the second area differing from the first area and containing the information of the first and second quantization bit numbers, the information of the first and second sampling frequencies, and the information of the assignment of the first-channel and second-channel analog audio signals to the first and second channel groups.

A seventeenth aspect of this invention provides an audio-signal decoding apparatus comprising first means for extracting information of a first quantization bit number for a front channel and information of a second quantization bit number for a rear channel from a reproduced signal, the second quantization bit number differing from the first quantization bit number; second means for deriving a front-channel digital audio signal and a rear-channel digital audio signal from the reproduced signal; third means for decoding the front-channel digital audio signal in response to the information of the first quantization bit number; and fourth means for decoding the rear-channel digital audio signal in response to the information of the second quantization bit number.

An eighteenth aspect of this invention provides an audio-signal decoding apparatus comprising first means for extracting information of a first sampling frequency for a front channel and information of a second sampling frequency for a rear channel from a reproduced signal, the second sampling frequency differing from the first sampling frequency; second means for deriving a front-channel digital audio signal and a rear-channel digital audio signal from the reproduced signal; third means for decoding the front-channel digital audio signal in response to the information of the first sampling frequency; and fourth means for decoding the rear-channel digital audio signal in response to the information of the second sampling frequency.

A nineteenth aspect of this invention provides an audio-signal decoding apparatus comprising first means for extracting information of a first quantization bit number and a first sampling frequency for a front channel and information of a second quantization bit number and a second sampling frequency for a rear channel from a reproduced signal, the second quantization bit number differing from the first quantization bit number, the second sampling frequency differing from the first sampling frequency; second means for deriving a front-channel digital audio signal and a rear-channel digital audio signal from the reproduced signal; third means for decoding the front-channel digital audio signal in response to the information of the first quantization bit number and the first sampling frequency; and fourth means for decoding the rear-channel digital audio signal in response to the information of the second quantization bit number and the second sampling frequency.

A twentieth aspect of this invention provides an audio-signal decoding apparatus comprising first means for extracting information of a first quantization bit number and a first sampling frequency for a first channel group and information of a second quantization bit number and a second sampling frequency for a second channel group from a reproduced signal, the second quantization bit number differing from the first quantization bit number, the second sampling frequency differing from the first sampling frequency; second means for deriving a first-channel digital audio signal and a second-channel digital audio signal from the reproduced signal, each of the derived first-channel and second-channel digital audio signals being assigned to either the first channel group or the second channel group; third means for extracting information of the assignment of the first-channel and second-channel digital audio signals to the first and second channel groups from the reproduced signal; and fourth means for decoding the first-channel digital audio signal and the second-channel digital audio signal in response to the information of the first and second quantization bit numbers, the information of the first and second sampling frequencies, and the information of the assignment of the first-channel and second-channel digital audio signals to the first and second channel groups.

A twenty-first aspect of this invention provides an optical disc player comprising first means for reproducing audio packs and control packs from an optical disc; first and second buffers; second means for alternately writing the reproduced audio packs into the first and second buffers; third means for decoding the reproduced control packs into control data; fourth means for decoding the audio packs in the first and second buffers into audio data in response to the control data; and a D/A converter for converting the audio data into an analog audio signal.

A twenty-second aspect of this invention is based on the twenty-first aspect thereof, and provides an optical disc player wherein each of the first and second buffers has a capacity of 4 kilobytes.

A twenty-third aspect of this invention is based on the eighth aspect thereof, and provides a digital signal recording disc wherein the first area stores audio data in an audio packet, and the second area stores audio data information ADI in the audio packet.

A twenty-fourth aspect of this invention is based on the eighth aspect thereof, and provides a digital signal recording disc wherein the first area comprises an audio contents block set ACBS, and the second area stores an audio-only-title audio-object attribute AOTT-AOB-ATR in audio title set information ATSI.

A twenty-fifth aspect of this invention is based on the sixteenth aspect thereof, and provides an audio-signal encoding apparatus further comprising fifth means for formatting the digital audio signals into audio data in audio packets; and sixth means for formatting the information of the first and second sampling frequencies, the information of the first and second quantization bit numbers, and the information of the assignment of the first-channel and second-channel analog audio signals to the first and second channel groups into audio data information ADI in the audio packets.

A twenty-sixth aspect of this invention is based on the sixteenth aspect thereof, and provides an audio-signal encoding apparatus further comprising fifth means for formatting the digital audio signals into an audio contents block set ACBS; and sixth means for formatting the information of the first and second sampling frequencies, the information of the first and second quantization bit numbers, and the information of the assignment of the first-channel and second-channel analog audio signals to the first and second channel groups into an audio-only-title audio-object attribute AOTT-AOB-ATR in audio title set information ATSI.

A twenty-seventh aspect of this invention is based on the twentieth aspect thereof, and provides an audio-signal decoding apparatus wherein the first means comprises means for reproducing the information of the first quantization bit number and the first sampling frequency, and the information of the second quantization bit number and the second sampling frequency from audio data information ADI in an audio packet, and wherein the third means comprises means for reproducing the information of the assignment of the first-channel and second-channel digital audio signals to the first and second channel group from the audio data information ADI in the audio packet.

A twenty-eighth aspect of this invention is based on the twentieth aspect thereof, and provides an audio-signal decoding apparatus wherein the first means comprises means for reproducing the information of the first quantization bit number and the first sampling frequency, and the information of the second quantization bit number and the second sampling frequency from an audio-only-title audio-object attribute AOTT-AOB-ATR in audio title set information ATSI, and wherein the third means comprises means for reproducing the information of the assignment of the first-channel and second-channel digital audio signals to the first and second channel group from the audio-only-title audio-object attribute AOTT-AOB-ATR in audio title set information ATSI.

BRIEF DESCRIPTION OF THE DRAWINGS

FIG. 5 is a diagram of the structure of an AMGI area in FIG. 3.

FIG. 8 is a diagram of the structure of an ATSI area in FIG. 4.

FIG. 9 is a diagram of the structure of an ATSI-MAT area in FIG. 8.

FIG. 11 is a diagram of the structure of an ATS-AST-ATRT area in FIG. 9.

FIG. 16 is a diagram of the structure of an ACD area in FIG. 15.

FIG. 17 is a diagram of the indication of an English-added Japanese tune name.

FIG. 20 is a diagram of the relation among channels, sampling frequencies, quantization bit numbers, data rates, and longest recording times.

FIG. 21 is a diagram of the relation among channels, sampling frequencies, quantization bit numbers, data rates, and longest recording times in the case of a 2-channel plus 6-channel audio signal.

FIG. 22 is a diagram of the relation among channels, sampling frequencies, quantization bit numbers, data rates, and longest recording times in the case of a 2-channel plus 5-channel audio signal.

FIG. 23 is a diagram of the relation among channels, sampling frequencies, quantization bit numbers, data rates, and longest recording times in the case of a 6-channel audio signal.

FIG. 32 is a diagram of channel assignment.

FIG. 34 is a diagram of the structure of an ADI area in FIG. 33.

DESCRIPTION OF THE PREFERRED EMBODIMENTS

First Embodiment

Figure 1:
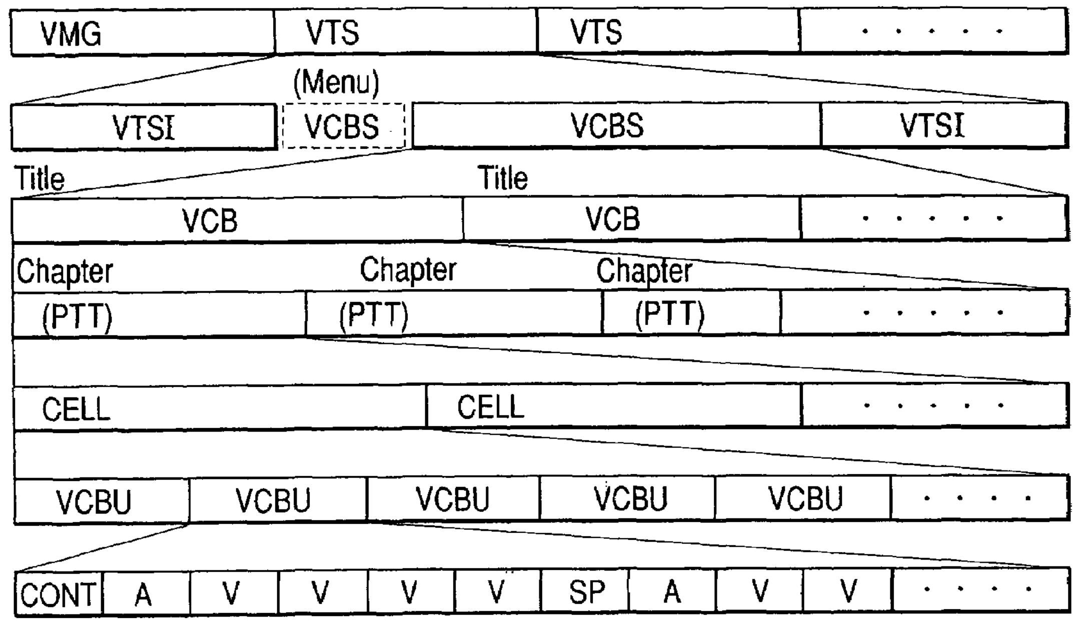
FIG. 1 is a diagram of the signal recording format of a DVD-Video.

FIG. 1 shows the signal recording format of a DVD-Video (digital video disc-video). As shown in FIG. 1, the DVD-Video has a first area assigned to a video manager VMG. The VMG area is followed by a sequence of second and later areas assigned to video title sets VTS respectively.

Each VTS area has a sequence of an area assigned to VTS information VTSI, one or more areas assigned to respective video contents block sets VCBS, and an area assigned to VTS information VTSI. The first video contents block set VCBS stores menu information for indicating a menu picture.

Each VCBS area has a sequence of areas assigned to video contents blocks VCB respectively. Each video contents block VCB corresponds to one video title.

Each VCB area has a sequence of areas corresponding to chapters respectively. Each chapter contains information representing a part of a title which is denoted by PTT.

Each chapter has a sequence of cells. Each cell has a sequence of VCB units VCBU. Each VCB unit VCBU has a sequence of packs. Each pack has 2,048 bytes.

In each VCB unit VCBU, a first pack is a control pack CONT followed by a sequence of packs including video packs V, audio packs A, and sub picture packs SP. The control pack CONT is assigned to information for controlling video packs V following the control pack CONT. The control information includes video-pack-synchronizing information. Each audio pack is assigned to audio data.

Figure 2:
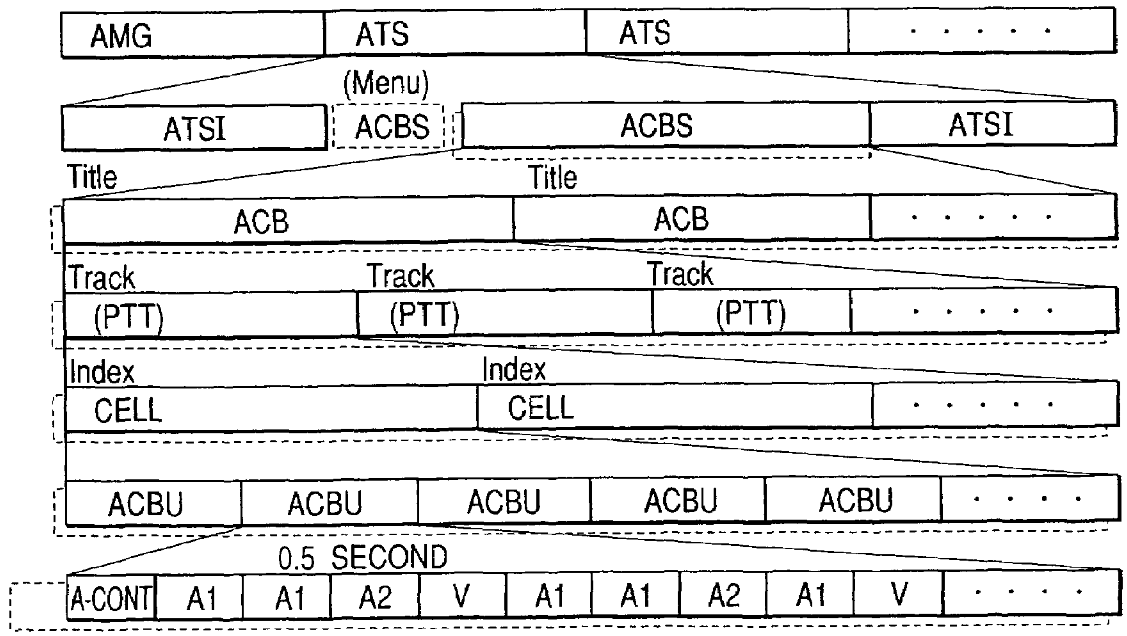
FIG. 2 is a diagram of the signal recording format of a DVD-Audio according to a first embodiment of this invention.

FIG. 2 shows the signal recording format of a DVD-Audio (digital video disc-audio) according to a first embodiment of this invention. The DVD-Audio is compatible with a DVD-Video (see FIG. 1). As shown in FIG. 2, the DVD-Audio has a first area assigned to an audio manager AMG. The AMG area is followed by a sequence of second and later areas assigned to audio title sets ATS respectively.

Each ATS area has a sequence of an area assigned to ATS information ATSI, one or more areas assigned to respective audio contents block sets ACBS, and an area assigned to ATS information ATSI. The ATS information ATSI indicates play time lengths of respective tunes represented by audio data in the audio contents block sets ACBS. The play time lengths of the respective tunes are expressed in terms of real time. The first audio contents block set ACBS stores menu information for indicating a menu picture. Each ACBS area has a sequence of areas assigned to audio contents blocks ACB respectively. Each audio contents block ACB corresponds to one audio title.

Each ACB area has a sequence of areas corresponding to tracks respectively. Each track contains information representing a part of a title which is denoted by PTT.

Each track has a sequence of indexes (cells). Each index has a sequence of ACB units ACBU. Each ACB unit ACBU has a sequence of packs. Each pack has 2,048 bytes.

In each ACB unit ACBU, a first pack is an audio control pack A-CONT followed by a sequence of packs including audio packs A1 and A2 and video packs V. The audio control pack A-CONT is assigned to information for managing an audio signal (audio data) in audio packs A1 and A2 following the audio control pack A-CONT. The managing information in the audio control pack A-CONT is basically similar to TOC (table of contents) information in a compact disc (CD). The managing information contains audio-pack-synchronizing information. Each audio pack A1 or A2 is assigned to audio data. The video packs V are assigned to video data and non-audio data such as closed caption (CC) data. The video packs V may be omitted from the ACB unit ACBU.

It should be noted that each ACB unit ACBU may further include a control pack CONT.

Figure 3:
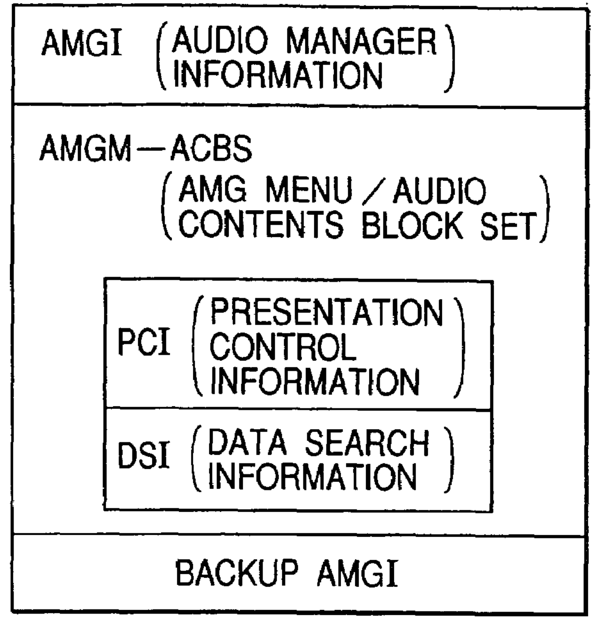
FIG. 3 is a diagram of the structure of an AMG area in FIG. 2.

As shown in FIG. 3, the AMG area (see FIG. 2) stores audio manager information AMGI, an audio contents block set AMGM-ACBS for an AMG menu, and backup audio manager information AMGI. The audio manager information AMGI has TOC (table of contents) information. The audio contents block set AMGM-ACBS has presentation control information PCI and data search information DSI which are control information pieces respectively.

Figure 4:
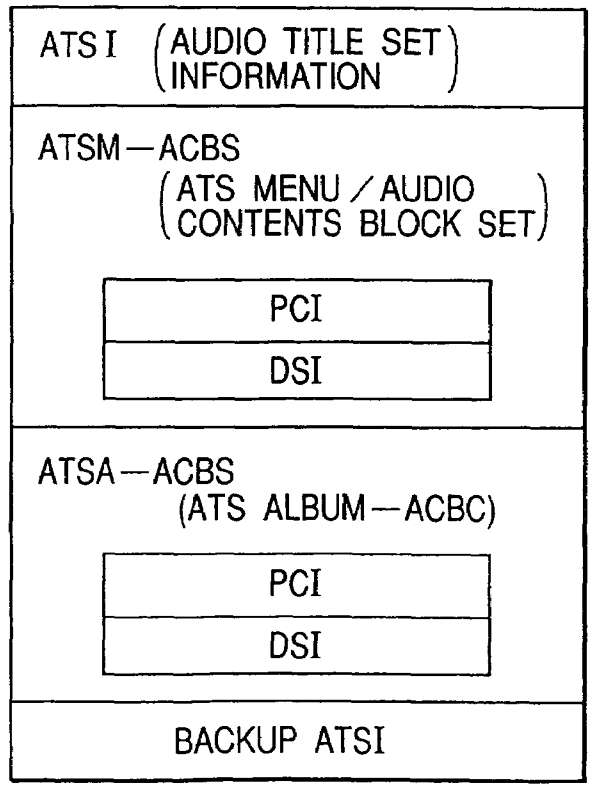
FIG. 4 is a diagram of the structure of an ATS area in FIG. 2.

As shown in FIG. 4, the ATS area (see FIG. 2) stores audio title set information ATSI, an audio contents block set ATSM-ACBS for an ATS menu, an audio contents block set ATSA-ACBS for an ATS title, and backup audio title set information ATSI. The audio title set information ATSI has TOC (table of contents) information. Each of the audio contents block sets ATSM-ACBS and ATSA-ACBS has presentation control information PCI and data search information DSI.

As shown in FIG. 5, the audio manager information AMGI (see FIG. 3) has a management table AMGI-MAT therefor, a title search pointer table T-SRPT, an audio manager menu program chain information unit table AMGM-PGCI-UT, a parental management information table PTL-MAIT, an audio title set attribute table ATS-ATRT, a text data manager TXTDT-MG, an audio manager menu cell (index) address table AMGM-C-ADT, and an audio manager menu audio contents block unit address map AMGM-ACBU-ADMAP.

Figures 6, 7:
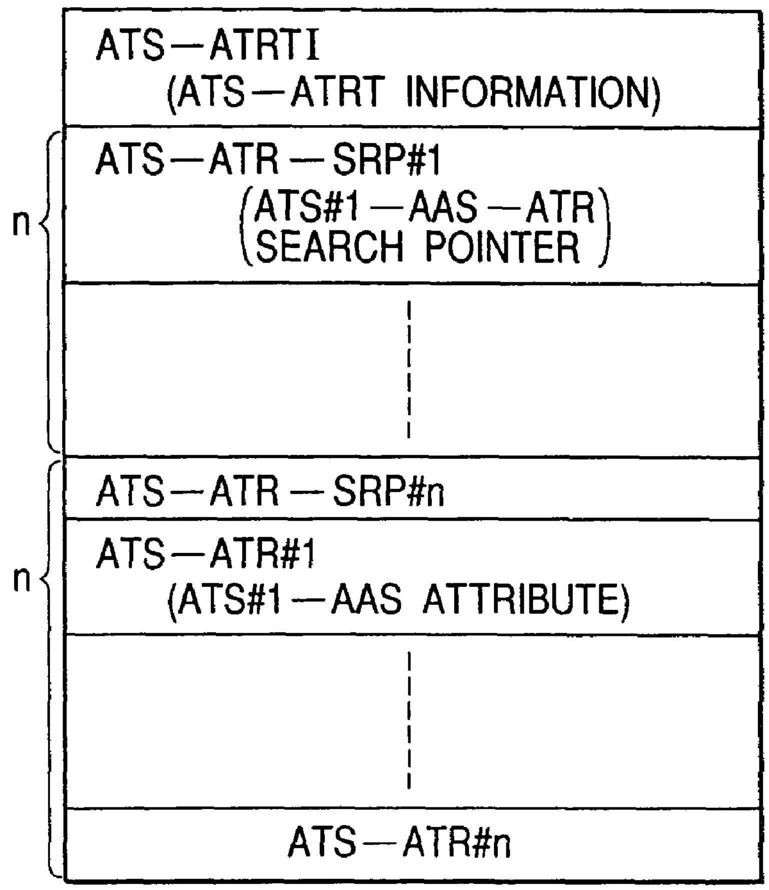
FIG. 6 is a diagram of the structure of an ATS-ATRT area in FIG. 5.
FIG. 7 is a diagram of the structure of an ATS-ATR area in FIG. 6.

As shown in FIG. 6, the audio title set attribute table ATS-ATRT (see FIG. 5) has audio title set attribute table information ATS-ATRTI, audio title set attribute search pointers ATS-ATR-SRP#1, ATS-ATR-SRP#2, . . . , ATS-ATR-SRP#n for respective “n” audio title sets ATS, and audio title set attribute data pieces ATS-ATR-#1, ATS-ATR-#2, . . . , ATS-ATR-#n for the respective “n” audio title sets ATS.

As shown in FIG. 7, each of the audio title set attribute data pieces ATS-ATR-#1, ATS-ATR-#2, . . . , ATS-ATR-#n (see FIG. 6) represents an end address ATS-ATR-EA of the audio title set attribute, a category ATS-CAT of the audio title set, and audio title set attribute information ATS-ATRI.

As shown in FIG. 8, the audio title set information ATSI (see FIG. 4) has a management table ATSI-MAT for the audio title set information ATSI, a part-of-title search pointer table ATS-PTT-SRPT for the audio title set, a program chain information table ATS-PGCIT for the audio title set, a PGCI unit table ATSM-PGCI-UT for the audio title set menu, a time map table ATS-TMAPT for the audio title set, a cell (index) address table ATSM-C-ADT for the audio title set menu, an audio contents block unit address map ATSM-ACBU-ADMAP for the audio title set menu, a cell (index) address table ATS-C-ADT for the audio title set, and an audio contents block unit address map ATS-ACBU-ADMAP for the audio title set.

As shown in FIG. 9, the audio title set information management table ATSI-MAT (see FIG. 8) has an identifier ATS-ID for the audio title set, an end address ATS-EA of the audio title set, an end address ATSI-EA for the audio title set information, a version number VERN of the specifications of the DVD-Audio, a category ATS-CAT of the audio title set, an end address ATSI-MAT-EA of the audio title set information management table, a start address ATSM-ACBS-SA of the ATS menu audio contents block set, a start address ATSA-ACBS-SA of the ATS title audio contents block set, a start address ATS-PTT-SRPT-SA of the audio title set part-of-title search pointer table, a start address ATS-PGCIT-SA of the audio title set program chain information table, a start address ATSM-PGCI-UT-SA of the audio title set menu program chain information unit table, a start address ATS-TMAPT-SA of the audio title set time map table, a start address ATSM-C-ADT-SA of the audio title set menu cell address table, a start address ATSM-ACBU-ADMAP-SA of the ATS menu audio contents block unit address map, an ATS menu audio stream attribute ATSM-AST-ATR, the number ATS-AST-Ns of audio streams in the audio title set, and an ATS audio stream attribute table ATS-AST-ATRT.

Figure 10:
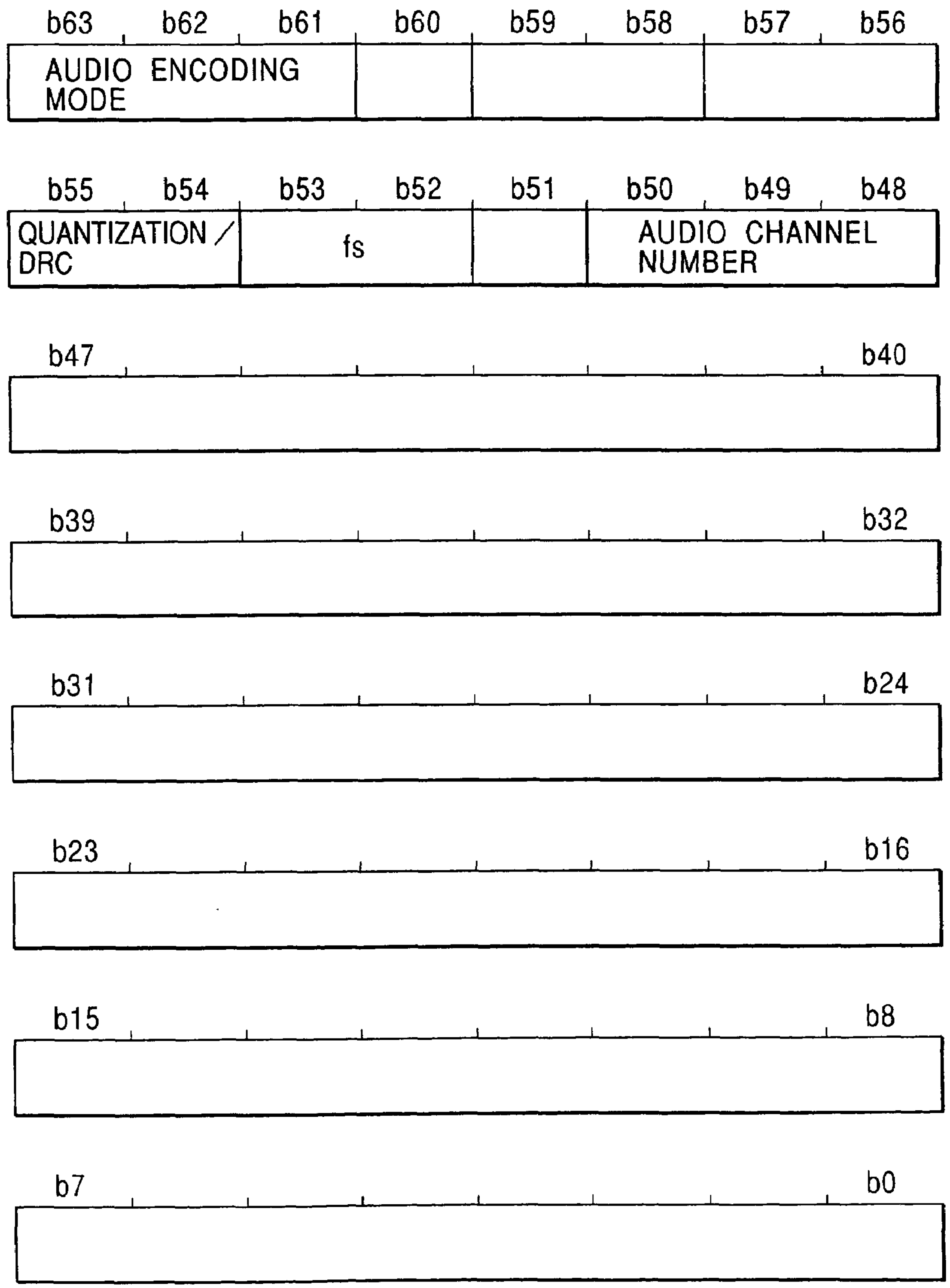
FIG. 10 is a diagram of the structure of an ATSM-AST-ATR area in FIG. 9.

As shown in FIG. 10, the ATS menu audio stream attribute ATSM-AST-ATR (see FIG. 9) has a sequence of 8 bytes, that is, 64 bits b63, b62, b61, . . . , b1, b0. A set of the bits b63, b62, and b61 represents an audio encoding mode selected from among a Dolby AC-3 encoding mode, an encoding mode corresponding to MPEG-1 or MPEG-2 without any extension bit stream, an encoding mode corresponding to MPEG-2 with an extension bit stream, a first linear PCM audio encoding mode, and a second linear PCM audio encoding mode. The second linear PCM audio encoding mode is of a type containing a sub type corresponding to 2 channels plus 5 channels, a sub type corresponding to 2 channels plus 6 channels, and a sub type corresponding to 2 channels plus 8 channels. Specifically, a bit sequence of “000” is assigned to the Dolby AC-3 encoding mode. A bit sequence of “010” is assigned to the encoding mode corresponding to MPEG-1 or MPEG-2 without any extension bit stream. A bit sequence of “011” is assigned to the encoding mode corresponding to MPEG-2 with an extension bit stream. A bit sequence of “100” is assigned to the first linear PCM audio encoding mode. A bit sequence of “101” is assigned to the second linear PCM audio encoding mode.

A set of the bits b55 and b54 in the ATS menu audio stream attribute ATSM-AST-ATR represents information of quantization/dynamic range control (DRC). When the audio encoding mode is “000”, the information of quantization/DRC is set to “11”. When the audio encoding mode is “010” or “001”, a bit sequence of “00” which relates to the information of quantization/DRC represents the absence of dynamic control data from the MPEG audio stream. When the audio encoding mode is “010” or “011”, a bit sequence of “01” which relates to the information of quantization/DRC represents the presence of dynamic control data in the MPEG audio stream. When the audio encoding mode is “100” or “101”, a bit sequence of “00” which relates to the information of quantization/DRC represents that each of channels (two stereophonic channels) has 16 bits for every signal sample. When the audio encoding mode is “100” or “101”, a bit sequence of “01” which relates to the information of quantization/DRC represents that each of channels (two stereophonic channels) has 20 bits for every signal sample. When the audio encoding mode is “100” or “101”, a bit sequence of “10” which relates to the information of quantization/DRC represents that each of channels (two stereophonic channels) has 24 bits for every signal sample.

A set of the bits b53 and b52 in the ATS menu audio stream attribute ATSM-AST-ATR represents a sampling frequency "fs" related to each of two stereophonic channels. Specifically, a bit sequence of "00" indicates that the sampling frequency "fs" is equal to 48 kHz. A bit sequence of "01" indicates that the sampling frequency "fs" is equal to 96 kHz. A bit sequence of "10" indicates that the sampling frequency "fs" is equal to 192 kHz.

A set of the bits b50, b49, and b48 in the ATS menu audio stream attribute ATSM-AST-ATR represents the number of audio channels. Specifically, a bit sequence of "000" indicates that there is only one channel ("monaural"). A bit sequence of "001" indicates that there are two stereophonic channels. A bit sequence of "010" indicates that there are three channels. A bit sequence of "011" indicates that there are four channels. A bit sequence of "100" indicates that there are two stereophonic channels plus five channels. A bit sequence of "101" indicates that there are two stereophonic channels plus six channels. A bit sequence of "110" indicates that there are seven channels. A bit sequence of "111" indicates that there are two stereophonic channels plus eight channels.

As shown in FIG. 11, the ATS audio stream attribute table ATS-AST-ATRT (see FIG. 9) has attributes ATS-AST-ATR of respective ATS audio streams ATS-AST#0, ATS-AST#1, . . . , ATS-AST#7. Each of the ATS audio stream attributes ATS-AST-ATR has 8 bytes. Accordingly, the total number of bytes representing the ATS audio stream attribute table ATS-AST-ATRT is equal to 64.

Figure 12:
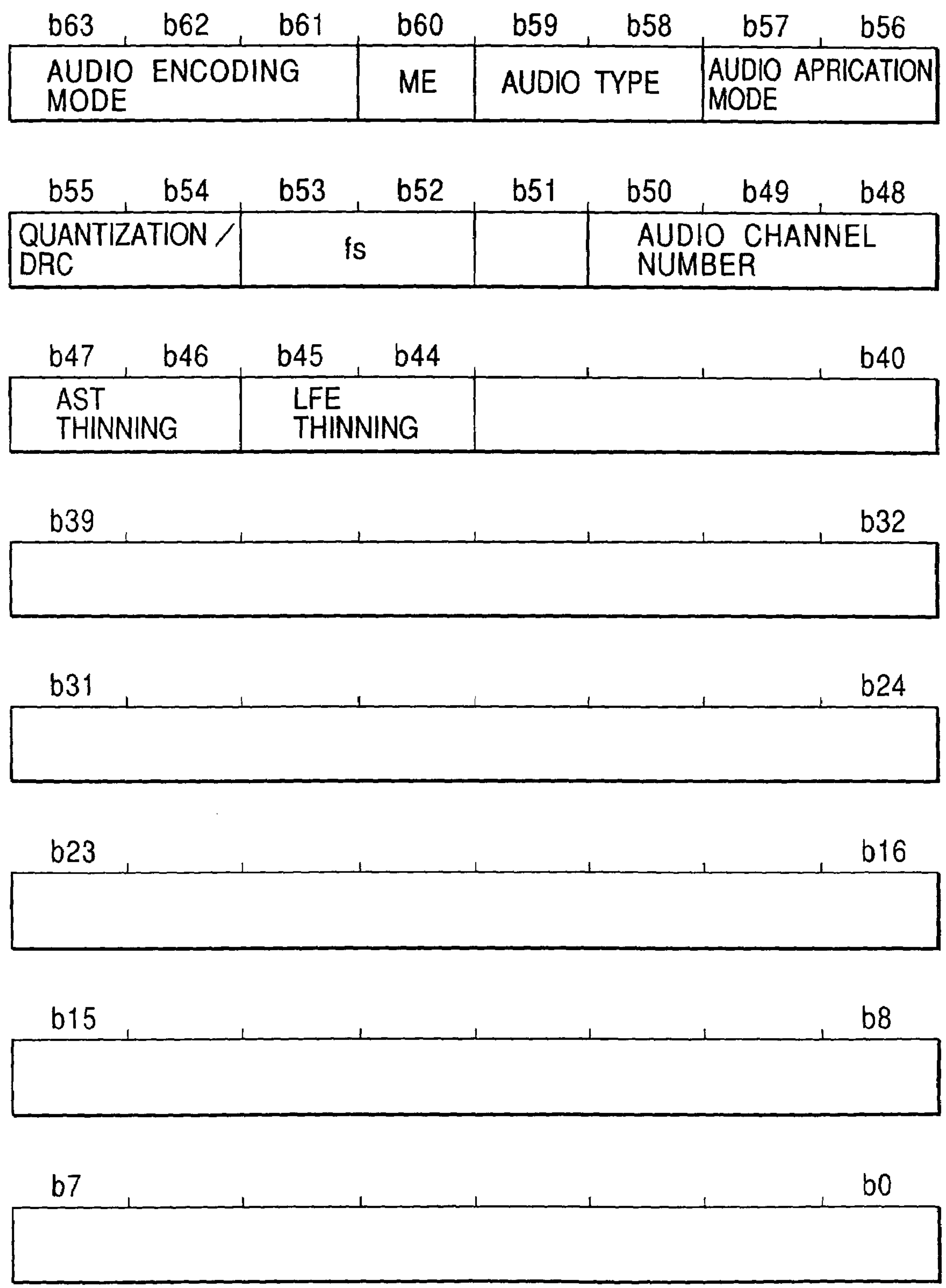
FIG. 12 is a diagram of the structure of an ATS-AST-ATR area in FIG. 11.

As shown in FIG. 12, each ATS audio stream attribute ATS-AST-ATR (see FIG. 11) has a sequence of 8 bytes, that is, 64 bits b63, b62, b61, . . . , b1, b0. A set of the bits b63, b62, and b61 in the ATS audio stream attribute ATS-AST-ATR represents an audio encoding mode as in the ATS menu audio stream attribute ATSM-AST-ATR (see FIG. 10). A set of the bits b55 and b54 in the ATS audio stream attribute ATS-AST-ATR represents information of quantization/dynamic range control (DRC) as in the ATS menu audio stream attribute ATSM-AST-ATR (see FIG. 10). A set of the bits b53 and b52 in the ATS audio stream attribute ATS-AST-ATR represents a sampling frequency "fs" as in the ATS menu audio stream attribute ATSM-AST-ATR (see FIG. 10). A set of the bits b50, b49, and b48 in the ATS audio stream attribute ATS-AST-ATR represents the number of audio channels as in the ATS menu audio stream attribute ATSM-AST-ATR (see FIG. 10).

The bit b60 in the ATS audio stream attribute ATS-AST-ATR represents information of multichannel extension ME. A set of the bits b59 and b58 in the ATS audio stream attribute ATS-AST-ATR represents an audio type.

A set of the bits b57 and b56 in the ATS audio stream attribute ATS-AST-ATR represents an audio application mode. Specifically, a bit sequence of "01" indicates a karaoke mode. A bit sequence of "10" indicates a surround mode. A bit sequence of "11" indicates a 2-channel plus surround mode.

A set of the bits b47 and b46 in the ATS audio stream attribute ATS-AST-ATR represents information of thinning (decimating) the related audio stream AST. Specifically, a bit sequence of "00" indicates that thinning corresponds to "full" (1/1, absence of thinning). A bit sequence of "01" indicates that thinning corresponds to "half" (½). A bit sequence of "10" indicates that thinning corresponds to "quarter" (¼).

A set of the bits b45 and b44 in the ATS audio stream attribute ATS-AST-ATR represents information of thinning data in the related low frequency effect (LFE) channel. Specifically, a bit sequence of "00" indicates that thinning corresponds to "full" (1/1, absence of thinning). A bit sequence of "01" indicates that thinning corresponds to "half" (½). A bit sequence of "10" indicates that thinning corresponds to "quarter" (¼).

For the audio stream AST#0, the bits b50, b49, and b48 in the ATS menu audio stream attribute ATSM-AST-ATR (see FIG. 10) are fixed to "001" indicating that there are two stereophonic channels. For the audio stream AST#1, the bits b50, b49, and b48 in the ATS menu audio stream attribute ATSM-AST-ATR (see FIG. 10) are fixed to "010" indicating that there are three channels.

In the case where a recorded audio signal of one title has two stereophonic channels plus six channels, 2-channel stereophonic signals are assigned to the audio stream AST#0 and 3-channel front signals among 6-channel signals are assigned to the audio stream AST#1, and 2-channel rear signals and a 1-channel LFE signal are assigned to the audio stream AST#2. In this case, a signal of "3" indicating use of three audio streams (the audio stream AST#0, AST#1, and AST#2) is placed in the management table AMGI-MAT within the audio manager information AMGI of FIG. 5 and also the management table ATSI-MAT within the audio title set information ATSI of FIG. 8.

An explanation will be given of the case where an original analog audio signal has two stereophonic channels plus six channels, and the original analog audio signal is processed into a digital audio signal under conditions indicated below before the digital audio signal is recorded. The 2-channel analog stereophonic signals are sampled at a frequency "fs" of 48 kHz, and are quantized with a quantization bit number of 20. The 3-channel analog front signals are sampled at a frequency "fs" of 96 kHz, and are quantized with a quantization bit number of 16. The 2-channel analog rear signals and the 1-channel analog LFE signal are sampled at a frequency "fs" of 48 kHz, and are quantized with a quantization bit number of 16. The resultant 8-channel digital signals are unthinned. In this case, information pieces of attributes of stereophonic two channels are set in the ATS menu audio stream attribute ATSM-AST-ATR of FIG. 10 as follows. The bits b63, b62, and b61 in the ATS menu audio stream attribute ATSM-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS menu audio stream attribute ATSM-AST-ATR are set to "01" representing that each of two stereophonic channels has 20 bits for every signal sample. The bits b53 and b52 in the ATS menu audio stream attribute ATSM-AST-ATR are set to "00" indicating that the sampling frequency "fs" is equal to 48 kHz.

The bits b50, b49, and b48 in the ATS menu audio stream attribute ATSM-AST-ATR are set to "101" indicating that there are two stereophonic channels plus six channels.

In the above-mentioned case, information pieces of attributes are set in the ATS audio stream attribute ATS-AST-ATR of FIG. 12 for the audio stream AST#0 as follows. The bits b63, b62, and b61 in the ATS audio stream attribute ATS-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to "01" representing that each of two stereophonic channels has 20 bits for every signal sample. The bits b53 and b52 in the ATS audio stream attribute ATS-AST-ATR are set to "00" indicating that the sampling frequency "fs" is equal to 48 kHz. The bits b50, b49, and b48 in the ATS audio stream attribute ATS-AST-ATR are set to "001" indicating that there are two stereophonic channels. The bits b57 and b56 in the ATS audio stream attribute ATS-AST-ATR are set to "11" indicating the 2-channel plus surround mode. As information of thinning the related audio stream AST#0, the bits b47 and b46 in the ATS audio stream attribute ATS-AST-ATR are set to "00" indicating that thinning corresponds to "full" (1/1, absence of thinning). As information of thinning data in the related LFE channel, the bits b45 and b44 in the ATS audio stream attribute ATS-AST-ATR are set to "00" indicating that thinning corresponds to "full" (1/1, absence of thinning).

In the above-mentioned case, information pieces of attributes are set in the ATS audio stream attribute ATS-AST-ATR of FIG. 12 for the audio stream AST#1 as follows. The bits b63, b62, and b61 in the ATS audio stream attribute ATS-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to "00" representing that each channel has 16 bits for every signal sample. The bits b53 and b52 in the ATS audio stream attribute ATS-AST-ATR are set to "01" indicating that the sampling frequency "fs" is equal to 96 kHz. The bits b50, b49, and b48 in the ATS audio stream attribute ATS-AST-ATR are set to "010" indicating that there are three channels. The bits b57 and b56 in the ATS audio stream attribute ATS-AST-ATR are set to "11" indicating the 2-channel plus surround mode. As information of thinning the related audio stream AST#1, the bits b47 and b46 in the ATS audio stream attribute ATS-AST-ATR are set to "00" indicating that thinning corresponds to "full" (1/1, absence of thinning). As information of thinning data in the related LFE channel, the bits b45 and b44 in the ATS audio stream attribute ATS-AST-ATR are set to "00" indicating that thinning corresponds to "full" (1/1, absence of thinning).

In the above-mentioned case, information pieces of attributes are set in the ATS audio stream attribute ATS-AST-ATR of FIG. 12 for the audio stream AST#2 as follows. The bits b63, b62, and b61 in the ATS audio stream attribute ATS-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to "00" representing that each channel has 16 bits for every signal sample. The bits b53 and b52 in the ATS audio stream attribute ATS-AST-ATR are set to "00" indicating that the sampling frequency "fs" is equal to 48 kHz. The bits b50, b49, and b48 in the ATS audio stream attribute ATS-AST-ATR are set to "010" indicating that there are three channels. The bits b57 and b56 in the ATS audio stream attribute ATS-AST-ATR are set to "11" indicating the 2-channel plus surround mode. As information of thinning the related audio stream AST#2, the bits b47 and b46 in the ATS audio stream attribute ATS-AST-ATR are set to "00" indicating that thinning corresponds to "full" (1/1, absence of thinning). As information of thinning data in the related LFE channel, the bits b45 and b44 in the ATS audio stream attribute ATS-AST-ATR are set to "00" indicating that thinning corresponds to "full" (1/1, absence of thinning).

Figure 13:
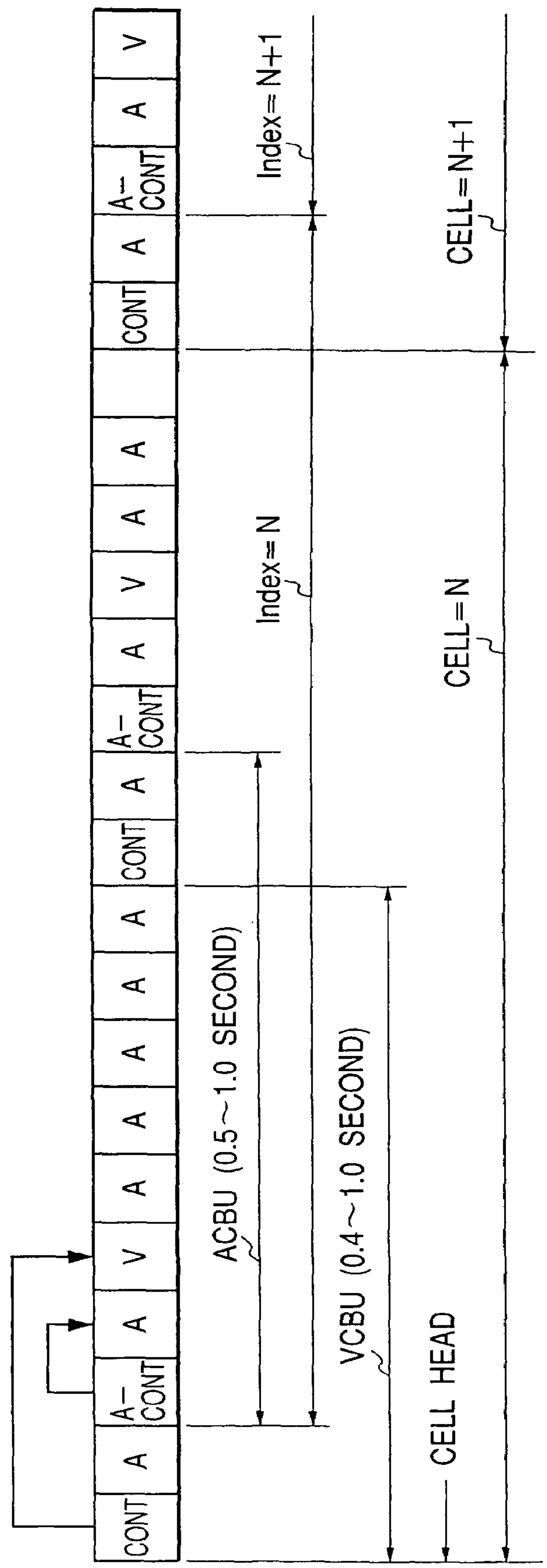
FIG. 13 is a diagram of a sequence of packs.

With reference to FIG. 13, there is a sequence of packs containing control packs CONT, audio packs A, audio control packs A-CONT, and video packs V. Audio streams are recorded in the audio packs A. Each VCB unit VCBU has a set of successive packs which corresponds to a time length of 0.4 second to 1.0 second. The total number of packs in one VCB unit VCBU is arbitrary. The first pack in each VCB unit VCBU is a control pack CONT. On the other hand, each ACB unit ACBU has a set of successive packs which corresponds to a time length of 0.5 second to 1.0 second. The total number of packs in one ACB unit ACBU is arbitrary. The first pack in each ACB unit ACBU is an audio control pack A-CONT. An audio control pack A-CONT in each ACB unit ACBU in a DVD-Audio is located at a place corresponding to a third pack in a VCB unit VCBU in a DVD-Video.

Basically, audio control packs A-CONT are spaced at intervals corresponding to 0.5 second. In the boundary between indexes (cells), audio control packs A-CONT are spaced at intervals corresponding to a time of 0.5 second to 1.0 second.

Time (GOF, group of audio frames) related to audio is represented by each audio control pack A-CONT, and a related data position is decided by an audio frame number, a first access unit pointer, and the number of frame headers. Audio packs A immediately before audio control packs A-CONT may be padded to provide 0.5-second intervals between the audio control packs A CONT.

Audio signal segments stored in respective neighboring audio packs A have a predetermined relation with each other. In the case where a recorded audio signal is of the stereophonic type, neighboring audio packs A store a left-channel signal segment and a right-channel signal segment, respectively. In the case where a recorded audio signal is of the multiple-channel type (the 5-channel type, the 6-channel type, or the 8-channel type), neighboring audio packs A store different channel signal segments, respectively.

Each video pack V stores information of a picture which relates to audio signal segments in audio packs A near the video pack V.

Figure 14:
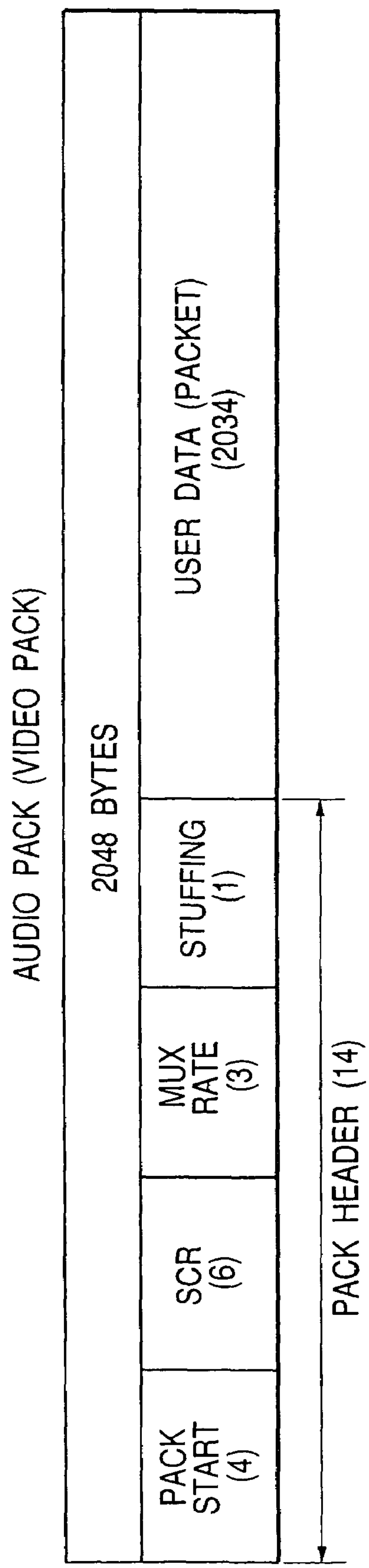
FIG. 14 is a diagram of the structure of an audio pack A or a video pack V.

As shown in FIG. 14, each of audio packs A and video packs V has a sequence of 4-byte pack start information, 6-byte SCR (system clock reference) information, 3-byte mux rate information, 1-byte stuffing information, and 2,034-byte packet-form user data. Thus, each of audio packs A and video packs V has 2,048 bytes. In each audio pack A or video pack V, pack start information, SCR information, mux rate information, and stuffing information compose a 14-byte pack header. SCR information in each audio pack A or video pack V serves as a time stamp.

A time stamp in a first audio pack A among audio packs related to one title is set to "1". Time stamps in second and later audio packs related to the same title are set to serial numbers "2", "3", "4", . . . , respectively. The serially-numbered time stamps enable management of times of audio packs A related to the same title.

Figure 15:
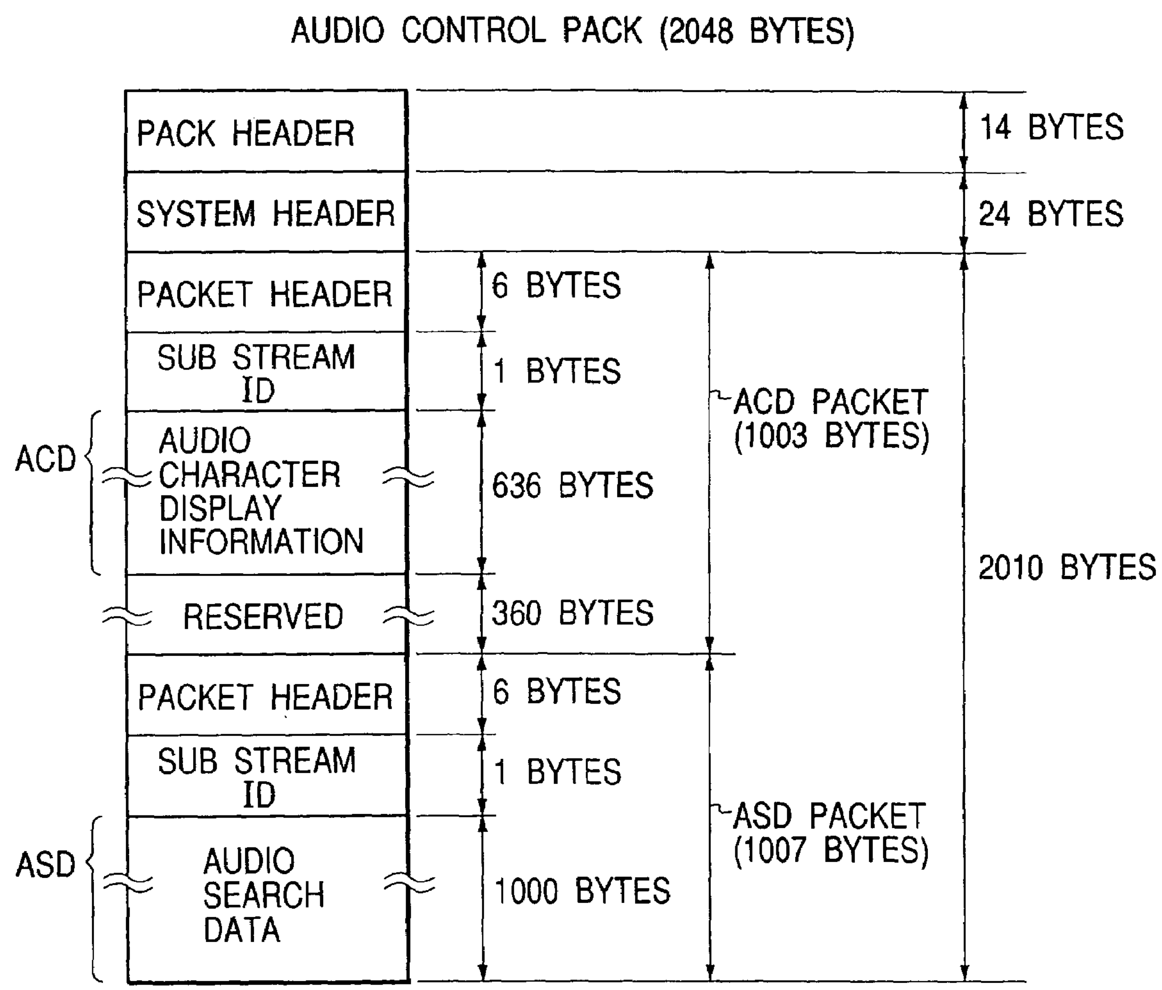
FIG. 15 is a diagram of the structure of an audio control pack A-CONT.

As shown in FIG. 15, each audio control pack A-CONT has a sequence of a 14-byte pack header, a 24-byte system header, a 1003-byte audio character display (ACD) packet, and a 1007-byte audio search data (ASD) packet. The ACD packet has a sequence of a 6-byte packet header, a 1-byte area assigned to sub stream identification (ID) information, a 636-byte area assigned to audio character display (ACD) information, and a 360-byte reserved area. The ASD packet has a sequence of a 6-byte packet header, a 1-byte area assigned to sub stream identification (ID) information, and a 1000-byte area assigned to audio search data (ASD).

As shown in FIG. 16, the 636-byte ACD information area has a 48-byte area assigned to general information, a 294-byte area for a first language, and a 294-byte area for a second language. The 294-byte area for the first language is divided into a 93-byte name space area, a first 93-byte free space area, a second 93-byte free space area, and a 15-byte data pointer area. Similarly, the 294-byte area for the second language is divided into a 93-byte name space area, a first 93-byte free space area, a second 93-byte free space area, and a 15-byte data pointer area. In the case where the first language is Japanese, the 93-byte name space area for the first language stores data representing an English-added Japanese tune name as shown in FIG. 17. In the case where the second language is English, the 93-byte name space area for the second language stores data representing an English tune name. The first and second languages may be decided by the publisher of the present DVD-Audio.

The 48-byte general information area in the ACD information area of FIG. 16 has a 16-byte area assigned to service level information, a 12-byte area assigned to language code information, a 6-byte area assigned to character set code information, a 6-byte area assigned to display item information, a 2-byte area assigned to information of the difference from the previous ACD information, and a 6-byte reserved area. The 16-byte service level information represents a display size, a display type, a discrimination among audio, video, and sub picture SP, and a stream. Characters designated by the 48-byte general information are mandatory while bit maps designated thereby are optional. The 12-byte language code information has a first 2-byte information piece designating the first language, and a second 2-byte information piece designating the second language. Eight or less languages can be designated in one file. Regarding the first and second languages, the English language is mandatory.

The 6-byte character set code information represents 15 or less character code words corresponding to language code words. The 6-byte character set code information has a 1-byte information piece representing whether the first and second languages are present or absent, and also representing the types of the first and second languages. For example, a first language code word corresponds to the "ISO646" standards and a second language code word corresponds to the "ISO8859-1" standards while a third language code word corresponds to the "MS-JIS" standards.

The 6-byte display item information represents whether the free spaces (see FIG. 16) for the first and second languages and the data pointers (see FIG. 16) for the first and second languages are present or absent. The 6-byte display item information contains related ID (identification) information. It should be noted that the name spaces (see FIG. 16) for the first and second languages are mandatory. An information piece of a title name, an information piece of a music name, and an information piece of an artist name are stored in the name space areas for the first and second languages.

Figure 18:
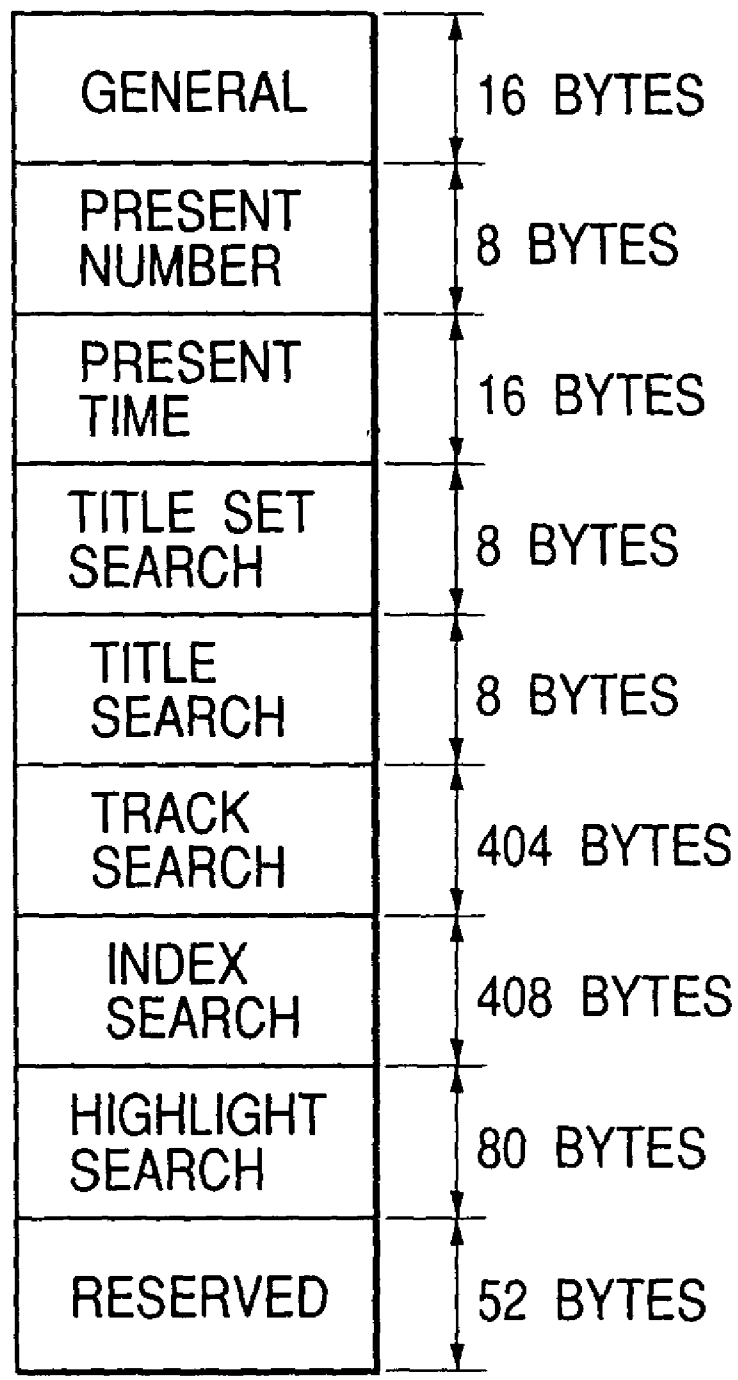
FIG. 18 is a diagram of the structure of an ASD area in FIG. 15.

As shown in FIG. 18, the 1000-byte audio search data (ASD) area (see FIG. 15) is divided into a 16-byte area assigned to general information, an 8-byte area assigned to information of the present number, a 16-byte area assigned to information of the present time, an 8-byte area assigned to title set search information, an 8-byte area assigned to title search information, a 404-byte area assigned to track search information, a 408-byte area assigned to index search information, an 80-byte area assigned to highlight search information, and a 52-byte reserved area.

The 8-byte present number information area in FIG. 18 is divided into a 2-byte area assigned to BCD information of the present title number of the related title set, a 2-byte area assigned to BCD information of the present track number of the related title set, a 2-byte area assigned to BCD information of the present index number of the related track, and a 2-byte reserved area.

The 16-byte present time information area in FIG. 18 is divided into a 4-byte area assigned to BCD information of a playback time of the related track, a 4-byte area assigned to BCD information of a remaining playback time of the related track, a 4-byte area assigned to BCD information of an absolute time of the related title, and a 4-byte area assigned to BCD information of a remaining absolute time of the related title.

The 8-byte title set search information area in FIG. 18 is divided into a 4-byte area assigned to information of an order number of a first sector regarding the related title set, and a 4-byte area assigned to information of an order number of a final sector regarding the related title set.

The 8-byte title search information area in FIG. 18 is divided into a 4-byte area assigned to information of an order number of a first sector in the related title, and a 4-byte area assigned to information of an order number of a final sector in the related title.

The 404-byte track search information area in FIG. 18 is divided into a 4-by-99-byte area assigned to information of order numbers of sectors and order numbers of tracks in the related title, a 4-byte area assigned to information of an order number of a first track in the related title, and a 4-byte area assigned to information of an order number of a final track in the related title.

The 408-byte index search information area in FIG. 18 is divided into a 4-by-100-byte area assigned to information of order numbers of sectors and order numbers of indexes in the related track, a 4-byte area assigned to information of an order number of a first index in the related track, and a 4-byte area assigned to information of an order number of a final index in the related track.

The 80-byte highlight search information area in FIG. 18 is divided into a 4-by-10-byte area assigned to information of order numbers of in-sectors in the related track, and a 4-by-10-byte area assigned to information of order numbers of out-sectors in the related track.

With reference back to FIGS. 2 and 13, in the DVD-Audio, an audio control pack A-CONT precedes a plurality of audio packs A. The audio control pack A-CONT stores information for managing audio signal segments stored in the following audio packs A. In the DVD-Audio, audio data can be independent of video data. The DVD-Audio has a greater audio recording capacity than that of the DVD-Video. Audio control packs A-CONT in the DVD-Audio enable management of audio-related time. Character information representing, for example, a tune name, can be read out from an audio control pack A-CONT.

In the DVD-Audio, each audio control pack A-CONT stores managing information (TOC information) representing a title, a start address, and a play time. During playback of the audio signal from the DVD-Audio, information requested by the user can be read out from audio control packs A-CONT and be indicated on a display of a DVD-Audio player. The user can decide a desired position of restart of playback by referring to the indicated information. Playback can be restarted from the desired position in response to user's request.

In the DVD-Audio, audio manager information AMGI and audio title set information ATSI have TOC information. Before playback of the audio signal from the DVD-Audio, the TOC information can be read out from the DVD-Audio and be stored into a memory within a DVD-Audio player. Information requested by the user can be read out from the memory and be indicated on a display of the DVD-Audio player. The user can decide a desired position of start of playback by referring to the indicated information. Playback can be started from the desired position in response to user's request.

Regarding the DVD-Audio, it is possible to implement a search for and a random access to a title, a tune, and an index. In addition, it is possible to implement a random access, a time search, and a tune-head search in unit of GOF (group of audio frames). Furthermore, it is possible to manage title-related time, tune-related time, and index-related time on a real-time basis.

Video packs V in the DVD-Audio make it possible to manage and indicate the present time and the remaining play time of a tune or a title.

Figure 19:
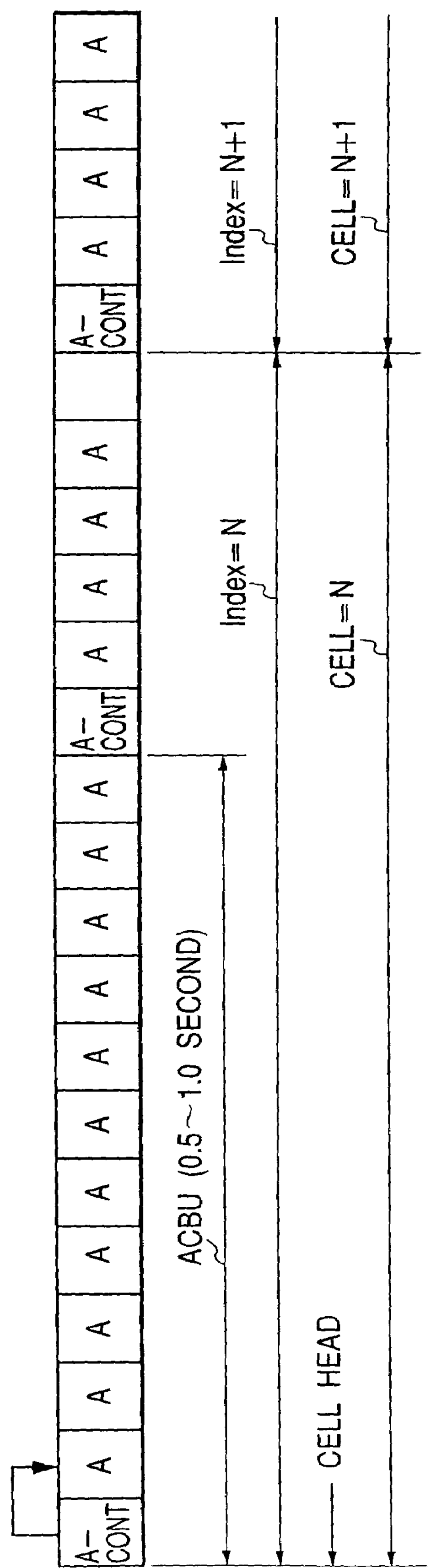
FIG. 19 is a diagram of a sequence of packs.

It should be noted that the pack sequence of FIG. 13 may be replaced by a pack sequence of FIG. 19 from which video packs V and control packs CONT are omitted.

As shown in FIG. 20, the time length of an audio signal which can be recorded on a DVD-Audio depends on the number of channels of the audio signal, a sampling frequency "fs", and a quantization bit number. The time length ranges from several tens of minutes to about four hundred minutes.

FIG. 21 shows the relation among the time length of a 2-channel plus 6-channel audio signal which can be recorded on a DVD-Audio, a sampling frequency "fs", and a quantization bit number. In this case, the 6 channels are 3 front channels, 2 rear channels, and one LFE channel. In FIG. 21, the time length ranges from 62 minutes to 70 minutes.

FIG. 22 shows the relation among the time length of a 2-channel plus 5-channel audio signal which can be recorded on a DVD-Audio, a sampling frequency "fs", and a quantization bit number. In this case, the 5 channels are 3 front channels and 2 rear channels. In FIG. 22, the time length ranges from 62 minutes to 67 minutes.

FIG. 23 shows the relation among the time length of a 6-channel audio signal which can be recorded on a DVD-Audio, a sampling frequency "fs", and a quantization bit number. In this case, the 6 channels are 3 front channels, 2 rear channels, and one LFE channel. In FIG. 23, the time length ranges from 65 minutes to 86 minutes.

Figure 24:
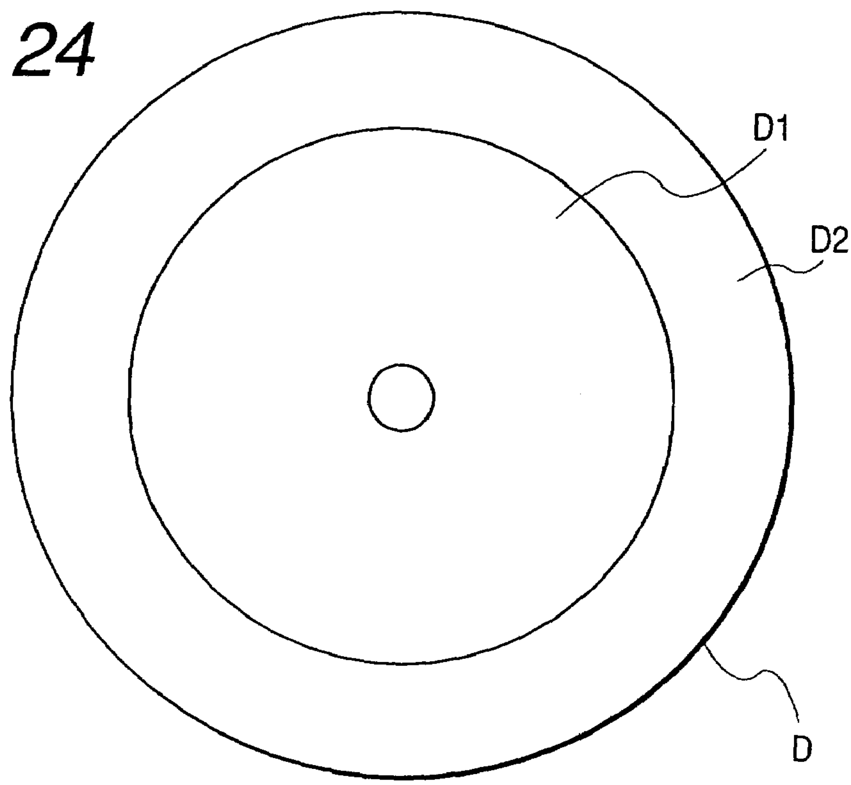
FIG. 24 is a diagram of a DVD-Audio.

With reference to FIG. 24, a DVD-Audio D has an inner area D1 and an outer area D2. The outer area D2 extends outward of the inner area D1. The DVD-Audio D is applied to a 2-channel plus multiple-channel audio signal. Audio streams related to the multiple-channels are stored in the inner area D1 while audio streams related to the 2-channels are stored in the outer area D2.

As previously explained, the audio encoding mode can be selected from among the Dolby AC-3 encoding mode, the encoding mode corresponding to MPEG-1 or MPEG-2 without any extension bit stream, the encoding mode corresponding to MPEG-2 with an extension bit stream, the first linear PCM audio encoding mode, and the second linear PCM audio encoding mode. In the case where the audio encoding mode agrees with the Dolby AC-3 encoding mode or the MPEG-1 or MPEG-2 encoding mode, it is preferable that a sampling frequency "fs" and a quantization bit number for channels except front channels are equal to standard values while a sampling frequency "fs" and a quantization bit number for the front channels are different from the standard values.

Figure 25:
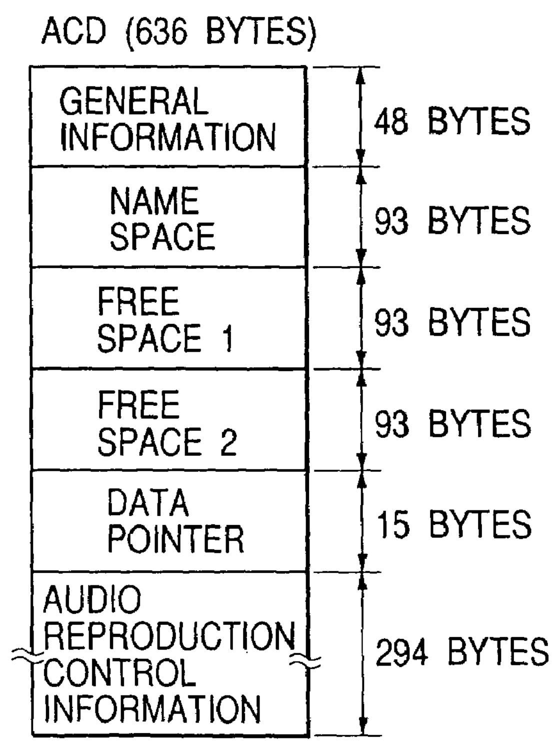
FIG. 25 is a diagram of the structure of an ACD area.

It should be noted that the 636-byte ACD information area in FIG. 16 may be replaced by a 636-byte ACD information area in FIG. 25. The 636-byte ACD information area in FIG. 25 has a 48-byte area assigned to general information, a 294-byte area for one language, and a 294-byte area assigned to audio reproduction control information. The 294-byte area for the language stores information used to indicate a tune name as audio navigation. The 294-byte area for the language is divided into a 93-byte name space area, a first 93-byte free space area, a second 93-byte free space area, and a 15-byte data pointer area.

The 294-byte audio reproduction control information area is divided into a 250-byte area assigned to the audio reproduction control information, and a 44-byte reserved area. The 250-byte audio reproduction control information area is divided into ten 25-byte areas assigned to different audio reproduction control information pieces respectively. Each of the 25-byte audio reproduction control information areas is divided into a 20-byte area assigned to information of a graphic equalizer, a 3-byte area assigned to information of level balance, and a 2-byte area assigned to information of addition of echo sound. During playback of an audio signal from a DVD-Audio, one of the audio reproduction control information pieces can be selected by a user to control the quality of reproduced sounds. The audio reproduction control information pieces are data recommended by a professional mixer which can optimize the quality of reproduced sounds in accordance with a type of a tune and also playing and recording conditions of the tune. The 44-byte reserved area can store information of mixing coefficients for mixing down a 6-channel audio signal into a 2-channel audio signal.

Second Embodiment

Figure 26:
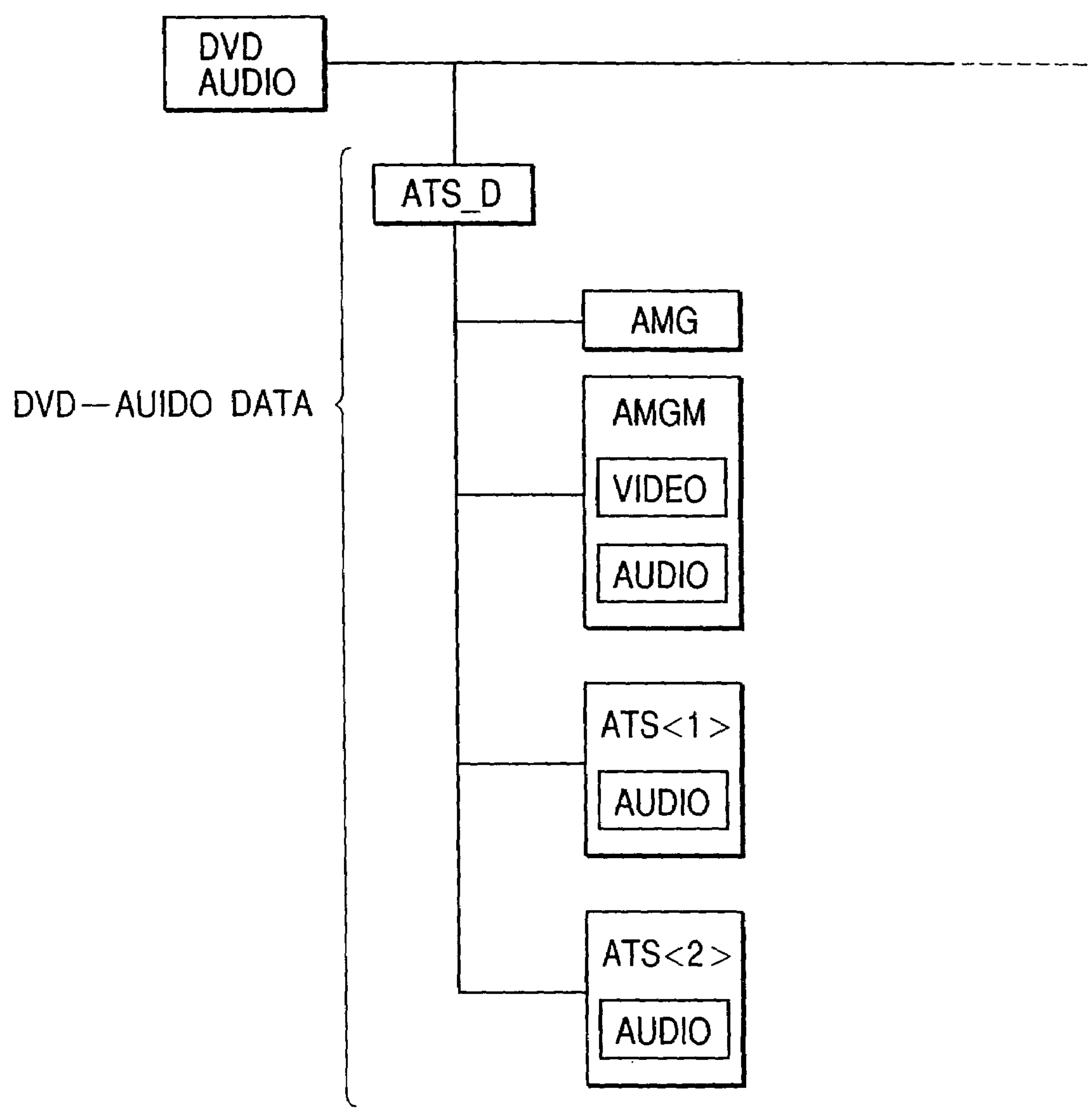
FIG. 26 is a diagram of the signal recording format of a DVD-Audio according to a second embodiment of this invention.

FIG. 26 shows the signal recording format of a DVD-Audio (digital video disc-audio) according to a second embodiment of this invention. The DVD-Audio in FIG. 26 has an area assigned to an audio title set directory ATS_D including a number of audio title sets ATS. The DVD-Audio in FIG. 26 does not have any area assigned to a video title set VTS.

The ATS_D area has an area assigned to an audio manager AMG, an area assigned to an audio manager menu AMGM, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3.

The audio title sets ATS<1> and ATS<2> are similar in structure. Thus, only the audio title set ATS<1> will be explained hereinafter.

Figure 27:
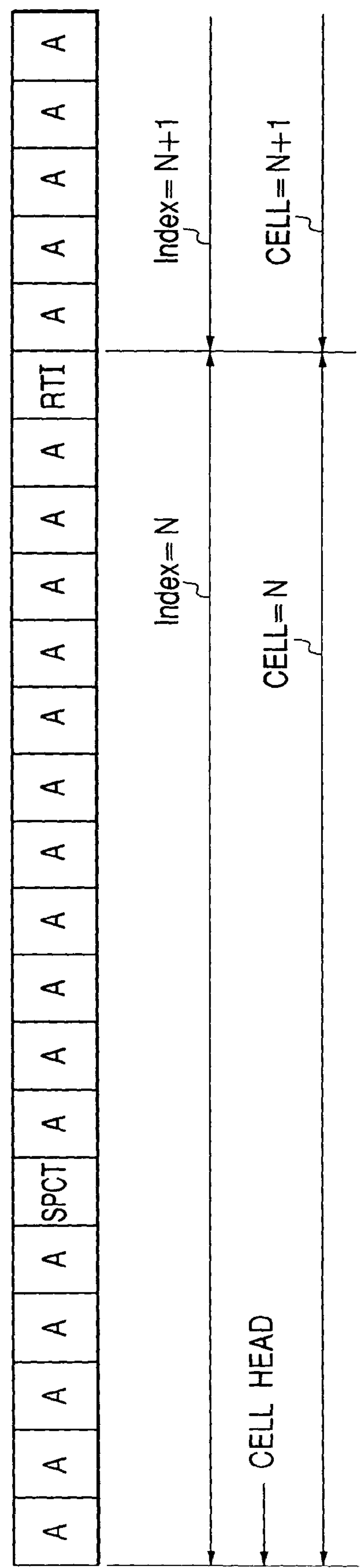
FIG. 27 is a diagram of a sequence of packs.

As shown in FIG. 27, the audio title set ATS<1> has a sequence of packs including audio packs A, still-picture packs SPCT, and real-time information packs RTI. The pack sequence in the audio title set ATS<1> does not have any audio control pack A-CONT. There is about one still-picture pack SPCT per track. The still-picture packs SPCT are video packs V of a given type. Each of the still-picture packs SPCT has a sequence of a pack header, a packet header, and data representative of a still picture. The real-time information packs RTI correspond to ACD packets in audio control packs A CONT, respectively. Each of the real-time information packs RTI has a sequence of a pack header, a packet header, sub stream identification information, ISRC information, private header length information, identification information for real-time information, stuffing bytes, and data representative of real time (audio character display data).

Figure 28:
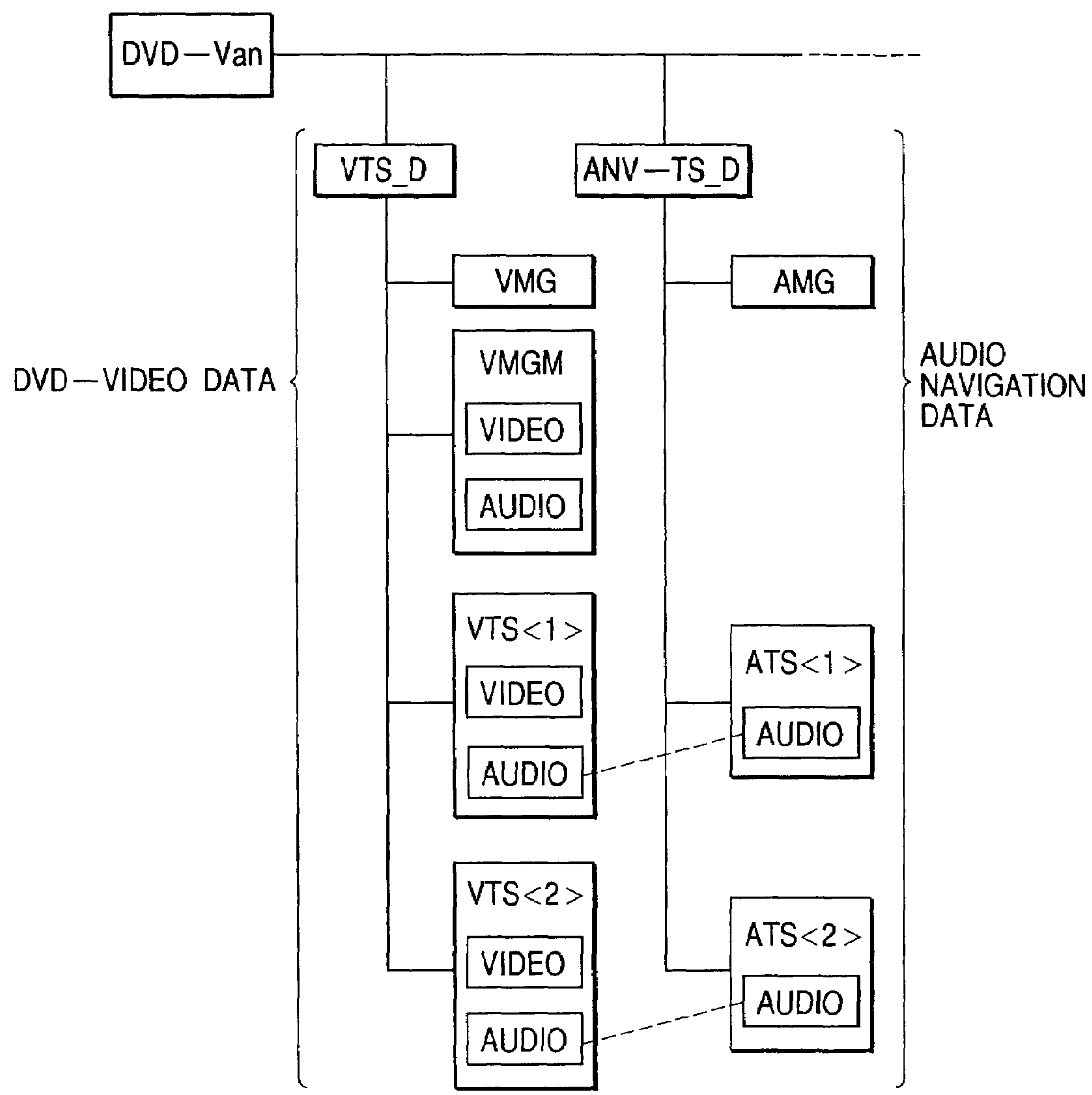
FIG. 28 is a diagram of the signal recording format of a DVD-Van.

FIG. 28 shows the signal recording format of a DVD-Van (digital video disc-video plus audio navigation). The DVD-Van in FIG. 28 has an area assigned to a video title set directory VTS_D including a number of video title sets VTS, and an area assigned to an audio navigation title set directory ANV-TS_D. The video title set VTS corresponds to DVD video data while the audio navigation title set ANV-TS corresponds to audio navigation data. The video title set VTS has a structure similar to that in FIG. 1.

The VTS_D area in FIG. 28 has an area assigned to a video manager VMG, an area assigned to a video manager menu VMGM, an area assigned to a first video title set VTS<1>, and an area assigned to a second video title set VTS<2>. The video manager VMG contains video manager information VMGI for managing the video title sets VTS<1> and VTS<2>. Each of the video title sets VTS<1> and VTS<2> has a sequence of packs including video packs V and audio packs A.

The ANV-TS_D area in FIG. 28 has an area assigned to an audio manager AMG, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3. Each of the audio title sets ATS<1> and ATS<2> has a sequence of packs including audio packs A. The first audio title set ATS<1> forms a pair with the first video title set VTS<1>. The second audio title set ATS<2> forms a pair with the second video title set VTS<2>.

Figure 29:
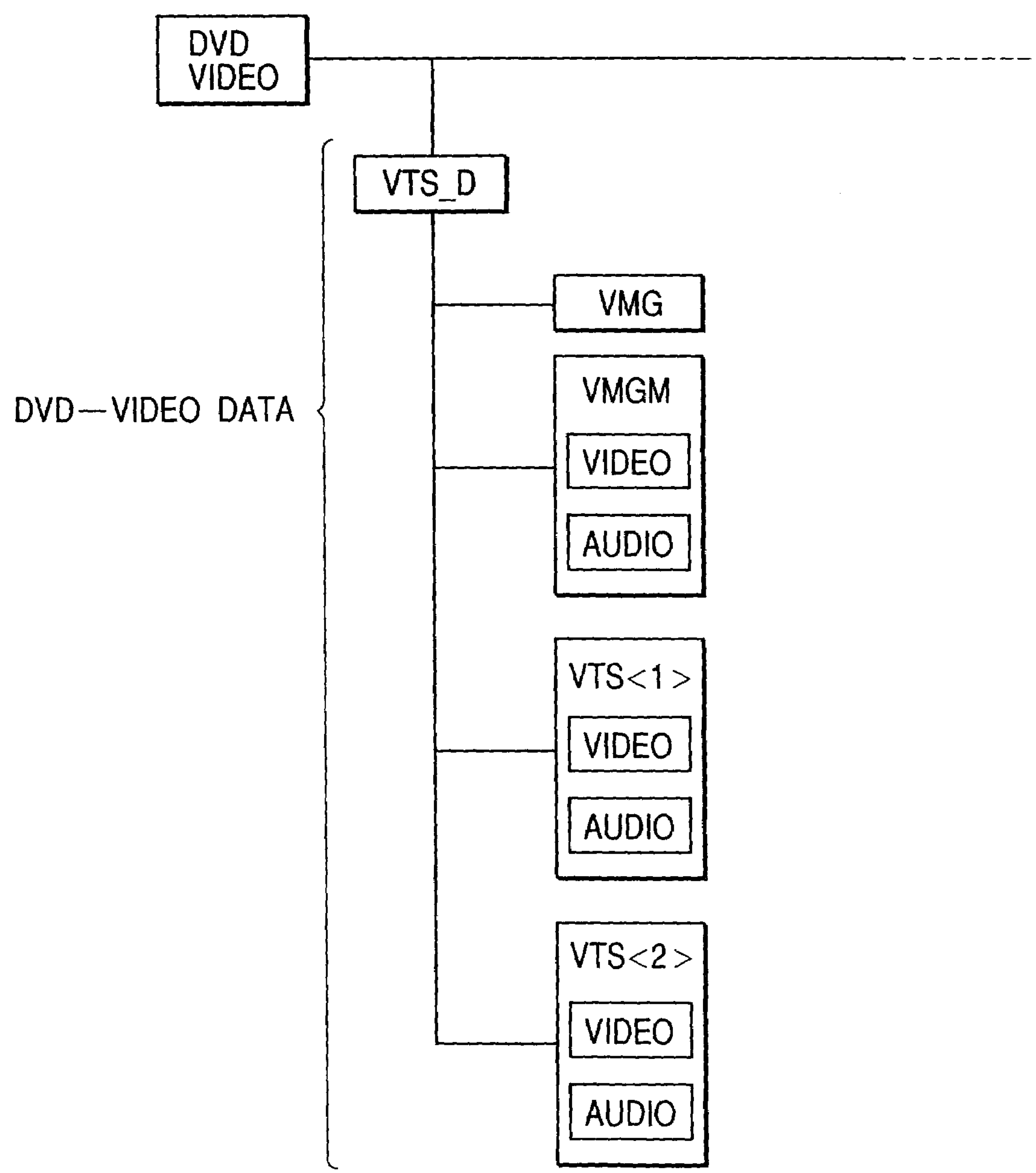
FIG. 29 is a diagram of the signal recording format of a DVD-Video.

FIG. 29 shows the signal recording format of a DVD-Video (digital video disc-video). The DVD-Video in FIG. 29 has an area assigned to a video title set directory VTS_D. The video title set VTS corresponds to DVD video data. The video title set VTS has a structure similar to that in FIG. 1. The DVD-Video in FIG. 29 does not have any area assigned to an audio title set directory ATS_D. The DVD-Video in FIG. 29 does not have any area assigned to an audio navigation title set directory ANV-TS_D.

The VTS_D area in FIG. 29 has an area assigned to a video manager VMG, an area assigned to a video manager menu VMGM, an area assigned to a first video title set VTS<1>, and an area assigned to a second video title set VTS<2>. The video manager VMG contains video manager information VMGI for managing the video title sets VTS<1> and VTS<2>. Each of the video title sets VTS<1> and VTS<2> has a sequence of packs including video packs V and audio packs A.

Figure 30:
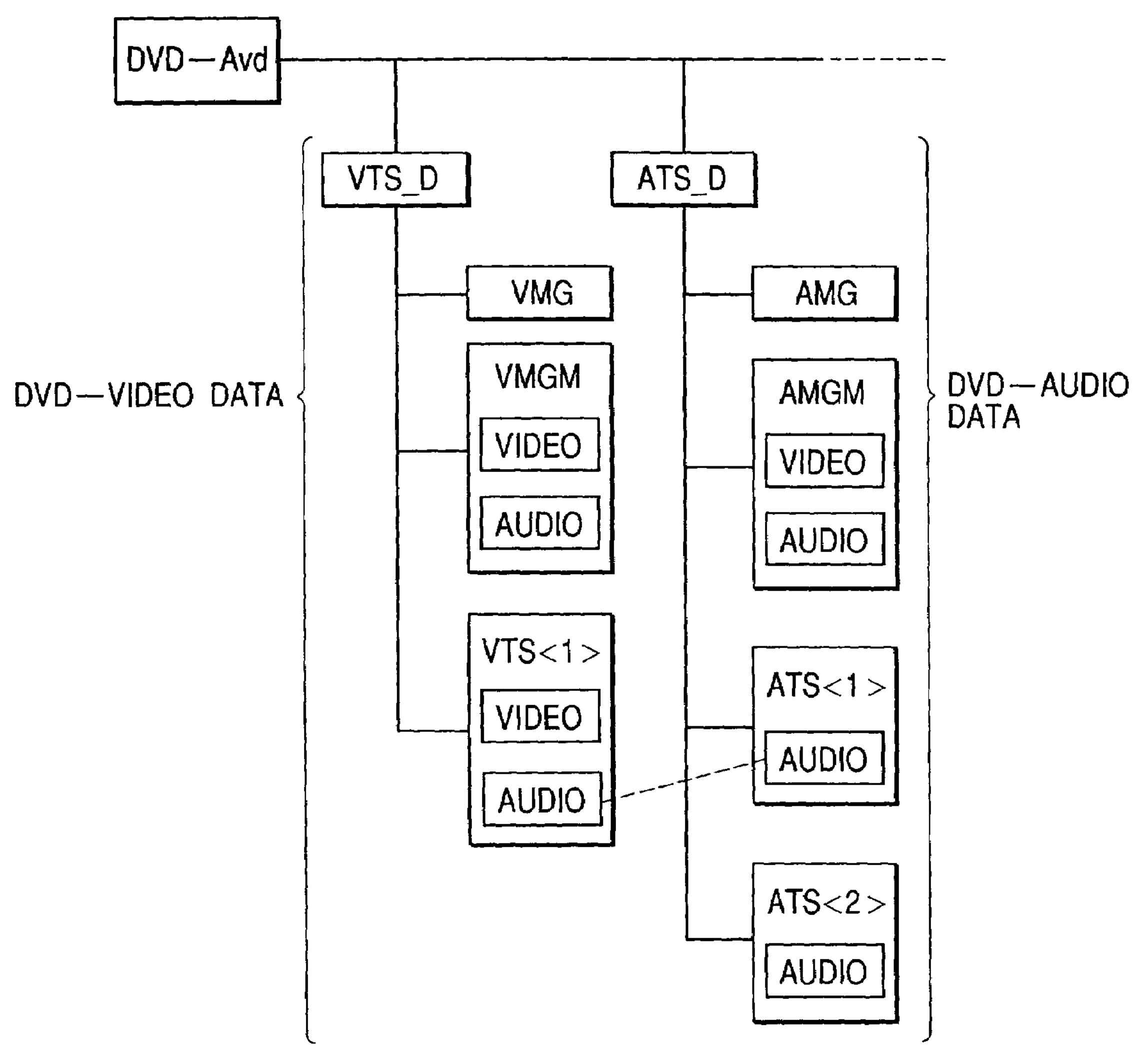
FIG. 30 is a diagram of the signal recording format of a DVD-Avd.

FIG. 30 shows the signal recording format of a DVD-Avd (digital video disc-audio plus AV data). The DVD-Avd in FIG. 30 has an area assigned to a video title set directory VTS_D, and an area assigned to an audio title set directory ATS_D. The video title set VTS corresponds to DVD video data while the audio title set ATS corresponds to DVD audio data. The video title set VTS has a structure similar to that in FIG. 1.

The VTS_D area in FIG. 30 has an area assigned to a video manager VMG, an area assigned to a video manager menu VMGM, and an area assigned to a video title set VTS<1>. The video manager VMG contains video manager information VMGI for managing the video title set VTS<1>. The video title set VTS<1> has a sequence of packs including video packs V and audio packs A.

The ATS_D area in FIG. 30 has an area assigned to an audio manager AMG, an area assigned to an audio manager menu AMGM, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3. The first audio title set ATS<1> has a sequence of packs including audio packs A. The first audio title set ATS<1> forms a pair with the video title set VTS<1>. The second audio title set ATS<2> has a sequence of packs including audio packs A, still-picture packs SPCT, and real-time information packs RTI. The pack sequence in the second audio title set ATS<2> does not have any audio control pack A-CONT.

Each of the audio title sets ATS<1> and ATS<2> in the DVD-Audio of FIG. 26 contains audio title set information ATSI. The audio title set information ATSI contains a management table ATSI-MAT having an audio-only-title audio-object attribute AOTT-AOB-ATR.

Figure 31:
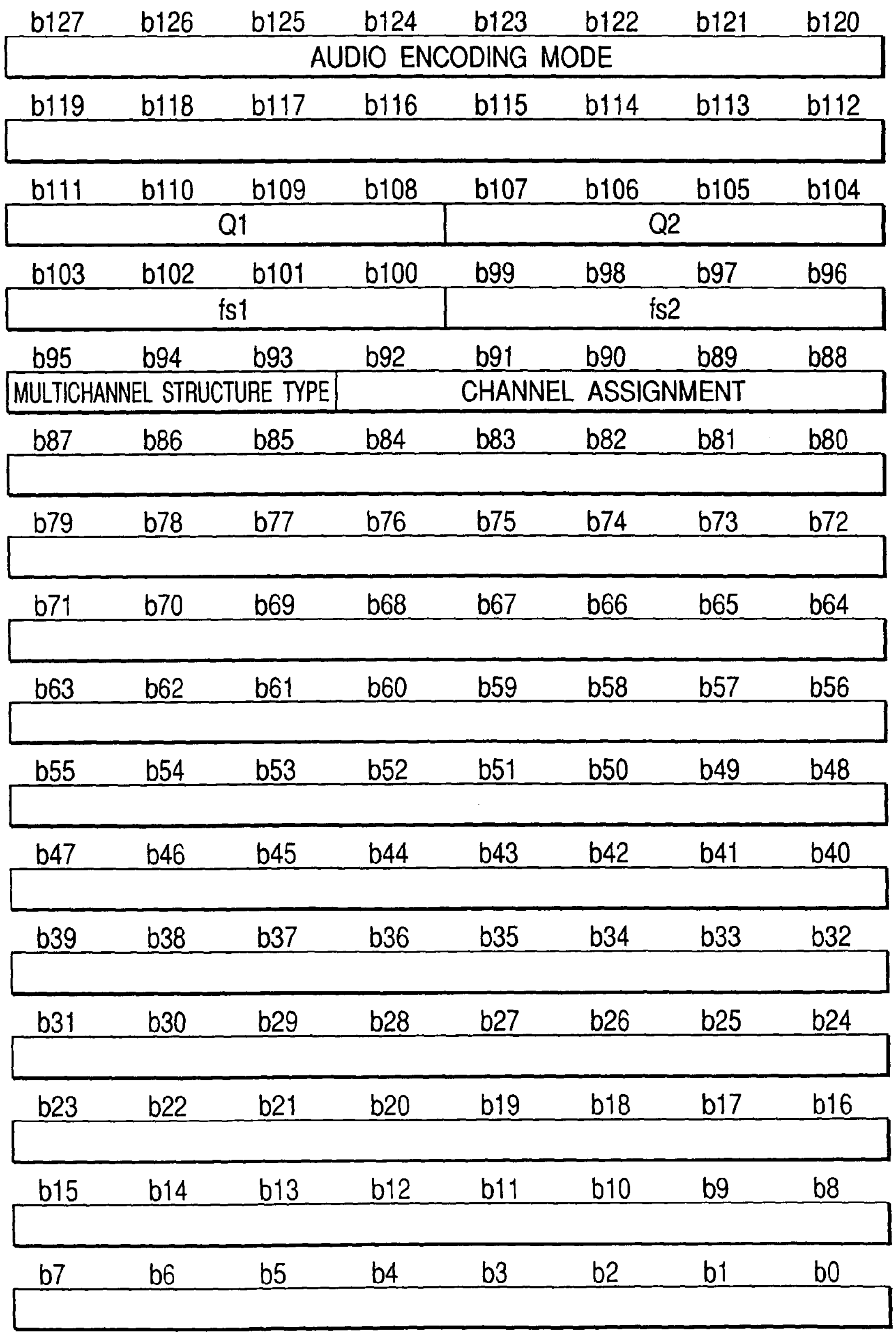
FIG. 31 is a diagram of the structure of an AOTI-AOB-ATR area.

As shown in FIG. 31, the audio-only-title audio-object attribute AOTT-AOB-ATR has a sequence of 16 bytes, that is, 128 bits b127, b126, b125, . . . , b1, b0. A set of the bits b127, b126, b125, b124, b123, b122, b121, and b120 represents an audio encoding mode. A set of the bits b111, b110, b109, and b108 represents a quantization bit number Q1 of a channel group "1". A set of the bits b107, b106, b105, and b104 represents a quantization bit number Q2 of a channel group "2". A set of the bits b103, b102, b101, and b100 represents a sampling frequency fs1 of the channel group "1".

A set of the bits b99, b98, b97, and b96 represents a sampling frequency fs2 of the channel group "2". A set of the bits b95, b94, and b93 represents a multiple channel type. A set of the bits b92, b91, b90, b89, and b88 represents channel assignment. The other bits form reserved areas.

The audio encoding mode represented by the bits b127, b126, b125, b124, b123, b122, b121, and b120 in FIG. 31 can be selected from among a linear PCM audio encoding mode, a Dolby digital encoding mode, an MPEG-2 encoding mode without any extension, an MPEG-2 encoding mode with an extension, a DTS encoding mode, and an SDDS encoding mode. Specifically, a bit sequence of "00000000" is assigned to the linear PCM audio encoding mode. A bit sequence of "00000001" is assigned to the Dolby digital encoding mode. A bit sequence of "00000010" is assigned to the MPEG-2 encoding mode without any extension. A bit sequence of "00000011" is assigned to the MPEG-2 encoding mode with an extension. A bit sequence of "00000100" is assigned to the DTS encoding mode. A bit sequence of "00000101" is assigned to the SDDS encoding mode.

The quantization bit number Q1 of the channel group "1" which is represented by the bits b111, b110, b109, and b108 in FIG. 31 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 20 bits.

The quantization bit number Q2 of the channel group "2" which is represented by the bits b107, b106, b105, and b104 in FIG. 31 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 20 bits.

The state of the set of the bits b107, b106, b105, and b104 has the following relation with the state of the set of the bits b111, b110, b109, and b108. When the set of the bits b111, b110, b109, and b108 is "0000", the set of the bits b107, b106, b105, and b104 is also “0000”. In other words, when the quantization bit number Q1 for the channel group “1” is equal to 16 bits, the quantization bit number Q2 for the channel group “2” is also equal to 16 bits. When the set of the bits b111, b110, b109, and b108 is “0001”, the set of the bits b107, b106, b105, and b104 is “0000” or “0001. In other words, when the quantization bit number Q1 for the channel group “1” is equal to 20 bits, the quantization bit number Q2 for the channel group “2” is equal to 16 bits or 20 bits. When the set of the bits b111, b110, b109, and b108 is “0010”, the set of the bits b107, b106, b105, and b104 is “0000”, “0001, or “0010”. In other words, when the quantization bit number Q1 for the channel group “1” is equal to 24 bits, the quantization bit number Q2 for the channel group “2” is equal to 16 bits, 20 bits, or 24 bits.

The sampling frequency fs1 of the channel group “1” which is represented by the bits b103, b102, b101, and b100 can be changed among 48 kHz, 96 kHz, 192 kHz, 44.1 kHz, 88.2 kHz, and 176.4 kHz. Specifically, a bit sequence of “0000” is assigned to 48 kHz. A bit sequence of “0001” is assigned to 96 kHz. A bit sequence of “0010” is assigned to 192 kHz. A bit sequence of “1000” is assigned to 44.1 kHz. A bit sequence of “1001” is assigned to 88.2 kHz. A bit sequence of “1010” is assigned to 176.4 kHz.

The sampling frequency fs2 of the channel group “2” which is represented by the bits b99, b98, b97, and b96 can be changed among 48 kHz, 96 kHz, 192 kHz, 44.1 kHz, 88.2 kHz, and 176.4 kHz. Specifically, a bit sequence of “0000” is assigned to 48 kHz. A bit sequence of “0001” is assigned to 96 kHz. A bit sequence of “0010” is assigned to 192 kHz. A bit sequence of “1000” is assigned to 44.1 kHz. A bit sequence of “1001” is assigned to 88.2 kHz. A bit sequence of “1010” is assigned to 176.4 kHz.

The state of the set of the bits b99, b98, b97, and b96 has the following relation with the state of the set of the bits b103, b102, b101, and b100. When the set of the bits b103, b102, b101, and b100 is “0000”, the set of the bits b99, b98, b97, and b96 is also “0000”. In other words, when the sampling frequency “fs” of the channel group “1” is equal to 48 kHz, the sampling frequency “fs” of the channel group “2” is also equal to 48 kHz. When the set of the bits b103, b102, b101, and b100 is “0001”, the set of the bits b99, b98, b97, and b96 is “0000” or “0001”. In other words, when the sampling frequency “fs” of the channel group “1” is equal to 96 kHz, the sampling frequency “fs” of the channel group “2” is equal to 48 kHz or 96 kHz. When the set of the bits b103, b102, b101, and b100 is “0010”, the set of the bits b99, b98, b97, and b96 is “0000”, “0001”, or “0010”. In other words, when the sampling frequency “fs” of the channel group “1” is equal to 192 kHz, the sampling frequency “fs” of the channel group “2” is equal to 48 kHz, 96 kHz, or 192 kHz. When the set of the bits b103, b102, b101, and b100 is “1000”, the set of the bits b99, b98, b97, and b96 is also “1000”. In other words, when the sampling frequency “fs” of the channel group “1” is equal to 44.1 kHz, the sampling frequency “fs” of the channel group “2” is also equal to 44.1 kHz. When the set of the bits b103, b102, b101, and b100 is “1001”, the set of the bits b99, b98, b97, and b96 is “1000” or “1001”. In other words, when the sampling frequency “fs” of the channel group “1” is equal to 88.2 kHz, the sampling frequency “fs” of the channel group “2” is equal to 44.1 kHz or 88.2 kHz. When the set of the bits b103, b102, b101, and b100 is “1010”, the set of the bits b99, b98, b97, and b96 is “1000”, “1001”, or “1010”. In other words, when the sampling frequency “fs” of the channel group “1” is equal to 176.4 kHz, the sampling frequency “fs” of the channel group “2” is equal to 44.1 kHz, 88.2 kHz, or 176.4 kHz.

Normally, the bits b95, b94, and b93 in FIG. 31 are set to “000” representing that the multiple channel type agrees with a type “1”.

The channel assignment represented by the bits b92, b91, b90, b89, and b88 in FIG. 31 can be changed among 21 different types shown in FIG. 32. A bit sequence of “00000” is assigned to a first type of the channel assignment in which a first channel ACH0 forms a monaural channel C(mono), and second and later channels ACH1, ACH2, ACH3, ACH4, and ACH5 are unused. According to the first type of the channel assignment, the monaural channel C(mono) is in the group “1”. Thus, the channel number in the group “1” is equal to one while the channel number in the group “2” is equal to zero. A bit sequence of “00001” is assigned to a second type of the channel assignment in which the first and second channels ACH0 and ACH1 form a left channel L and a right channel R respectively, and the third and later channels ACH2, ACH3, ACH4, and ACH5 are unused. According to the second type of the channel assignment, the left channel L and the right channel R are in the group “1”. Thus, the channel number in the group “1” is equal to two while the channel number in the group “2” is equal to zero. A bit sequence of “00010” is assigned to a third type of the channel assignment in which the first, second, and third channels ACH0, ACH1, and ACH2 form a left front channel Lf, a right front channel Rf, and a surround channel S respectively, and the fourth and later channels ACH3, ACH4, and ACH5 are unused. According to the third type of the bit assignment, the left front channel Lf and the right front channel Rf are in the group “1” while the surround channel S is in the group “2”. Thus, the channel number in the group “1” is equal to two while the channel number in the group “2” is equal to one. A bit sequence of “00011” is assigned to a fourth type of the channel assignment in which the first, second, third, and fourth channels ACH0, ACH1, ACH2, and ACH3 form a left front channel Lf, a right front channel Rf, a left surround channel Ls, and a right surround channel Rs respectively, and the fifth and sixth channels ACH4 and ACH5 are unused. According to the fourth type of the channel assignment, the left front channel Lf and the right front channel Rf are in the group “1” while the left surround channel Ls and the right surround channel Rs are in the group “2”. Thus, the channel number in the group “1” is equal to two while the channel number in the group “2” is also equal to two. A bit sequence of “00100” is assigned to a fifth type of the channel assignment in which the first, second, and third channels ACH0, ACH1, and ACH2 form a left front channel Lf, a right front channel Rf, and a low frequency effect channel LFE respectively, and the fourth and later channels ACH3, ACH4, and ACH5 are unused. According to the fifth type of the channel assignment, the left front channel Lf and the right front channel Rf are in the group “1” while the low frequency effect channel LFE is in the group “2”. Thus, the channel number in the group “1” is equal to two while the channel number in the group “2” is equal to one. A bit sequence of “00101” is assigned to a sixth type of the channel assignment in which the first, second, third, and fourth channels ACH0, ACH1, ACH2, and ACH3 form a left front channel Lf, a right front channel Rf, a low frequency effect channel LFE, and a surround channel S respectively, and the fifth and sixth channels ACH4 and ACH5 are unused. According to the sixth type of the channel assignment, the left front channel Lf and the right front channel Rf are in the group “1” while the low frequency effect channel LFE and the surround channel S are in the group "2". Thus, the channel number in the group "1" is equal to two while the channel number in the group "2" is also equal to two. A bit sequence of "00110" is assigned to a seventh type of the channel assignment in which the first, second, third, fourth, and fifth channels ACH0, ACH1, ACH2, ACH3, and ACH4 form a left front channel Lf, a right front channel Rf, a low frequency effect channel LFE, a left surround channel Ls, and a right surround channel Rs respectively, and the sixth channel ACH5 is unused. According to the seventh type of the channel assignment, the left front channel Lf and the right front channel Rf are in the group "1" while the low frequency effect channel LFE, the left surround channel Ls, and the right surround channel Rs are in the group "2". Thus, the channel number in the group "1" is equal to two while the channel number in the group "2" is equal to three. A bit sequence of "00111" is assigned to an eighth type of the channel assignment in which the first, second, and third channels ACH0, ACH1, and ACH2 form a left front channel Lf, a right front channel Rf, and a center channel C respectively, and the fourth and later channels ACH3, ACH4, and ACH5 are unused. According to the eighth type of the channel assignment, the left front channel Lf and the right front channel Rf are in the group "1" while the center channel C is in the group "2". Thus, the channel number in the group "1" is equal to two while the channel number in the group "2" is equal to one. A bit sequence of "01000" is assigned to a ninth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the ninth type of the channel assignment, the left front channel Lf and the right front channel Rf are in the group "1" while the center channel C and the surround channel S are in the group "2". Thus, the channel number in the group "1" is equal to two while the channel number in the group "2" is also equal to two. A bit sequence of "01001" is assigned to a tenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the tenth type of the channel assignment, the left front channel Lf and the right front channel Rf are in the group "1" while the center channel C, the left surround channel Ls, and the right surround channel Rs are in the group "2". Thus, the channel number in the group "1" is equal to two while the channel number in the group "2" is equal to three. A bit sequence of "01010" is assigned to an eleventh type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the eleventh type of the channel assignment, the left front channel Lf and the right front channel Rf are in the group "1" while the center channel C and the low frequency effect channel LFE are in the group "2". Thus, the channel number in the group "1" is equal to two while the channel number in the group "2" is also equal to two. A bit sequence of "01011" is assigned to a twelfth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the twelfth type of the channel assignment, the left front channel Lf and the right front channel Rf are in the group "1" while the center channel C, the low frequency effect channel LFE, and the surround channel S are in the group "2". Thus, the channel number in the group "1" is equal to two while the channel number in the group "2" is equal to three. A bit sequence of "01100" is assigned to a thirteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the thirteenth type of the channel assignment, the left front channel Lf and the right front channel Rf are in the group "1" while the center channel C, the low frequency effect channel LFE, the left surround signal Ls, and the right surround channel Rs are in the group "2". Thus, the channel number in the group "1" is equal to two while the channel number in the group "2" is equal to four. A bit sequence of "01101" is assigned to a fourteenth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the fourteenth type of the channel assignment, the left front channel Lf, the right front channel Rf, and the center channel C are in the group "1" while the surround channel S is in the group "2". Thus, the channel number in the group "1" is equal to three while the channel number in the group "2" is equal to one. A bit sequence of "01110" is assigned to a fifteenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the fifteenth type of the channel assignment, the left front channel Lf, the right front channel Rf, and the center channel C are in the group "1" while the left surround channel Ls and the right surround channel Rs are in the group "2". Thus, the channel number in the group "1" is equal to three while the channel number in the group "2" is equal to two. A bit sequence of "01111" is assigned to a sixteenth type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the sixteenth type of the channel assignment, the left front channel Lf, the right front channel Rf, and the center channel C are in the group "1" while the low frequency effect channel LFE is in the group "2". Thus, the channel number in the group "1" is equal to three while the channel number in the group "2" is equal to one. A bit sequence of "10000" is assigned to a seventeenth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the seventeenth type of the channel assignment, the left front channel Lf, the right front channel Rf, and the center channel C are in the group “1” while the low frequency effect channel LFE and the surround channel S are in the group “2”. Thus, the channel number in the group “1” is equal to three while the channel number in the group “2” is equal to two. A bit sequence of “10001” is assigned to an eighteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the eighteenth type of the channel assignment, the left front channel Lf, the right front channel Rf, and the center channel C are in the group “1” while the low frequency effect channel LFE, the left surround signal Ls, and the right surround channel Rs are in the group “2”. Thus, the channel number in the group “1” is equal to three while the channel number in the group “2” is also equal to three. A bit sequence of “10010” is assigned to a nineteenth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a low frequency effect channel LFE respectively, and the sixth channel ACH5 is unused. According to the nineteenth type of the channel assignment, the left front channel Lf, the right front channel Rf, the left surround channel Ls, and the right surround channel Rs are in the group “1” while the low frequency effect channel LFE is in the group “2”. Thus, the channel number in the group “1” is equal to four while the channel number in the group “2” is equal to one. A bit sequence of “10011” is assigned to a twentieth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a center channel C respectively, and the sixth channel ACH5 is unused. According to the twentieth type of the channel assignment, the left front channel Lf, the right front channel Rf, the left surround channel Ls, and the right surround channel Rs are in the group “1” while the center channel C is in the group “2”. Thus, the channel number in the group “1” is equal to four while the channel number in the group “2” is equal to one. A bit sequence of “10100” is assigned to a twenty-first type of the channel assignment in which the first, second, third, fourth, fifth, and sixth channels ACH0, ACH1, ACH2, ACH3, ACH4, and ACH5 form a left front channel Lf, a right front channel Rf, a left surround channel Ls, a right surround channel Rs, a center channel C, and a low frequency effect channel LFE respectively. According to the twenty-first type of the channel assignment, the left front channel Lf, the right front channel Rf, the left surround channel Ls, and the right surround channel Rs are in the group “1” while the center channel C and the low frequency effect channel C are in the group “2”. Thus, the channel number in the group “1” is equal to four while the channel number in the group “2” is equal to two.

Normally, in the DVD-Audio of FIG. 26, the audio encoding mode represented by the bits b127, b126, b125, b124, b123, b122, b121, and b120 in FIG. 31 agrees with the linear PCM audio encoding mode. According to the linear PCM audio encoding mode, every audio pack A has 2,048 bytes or less.

Figure 33:
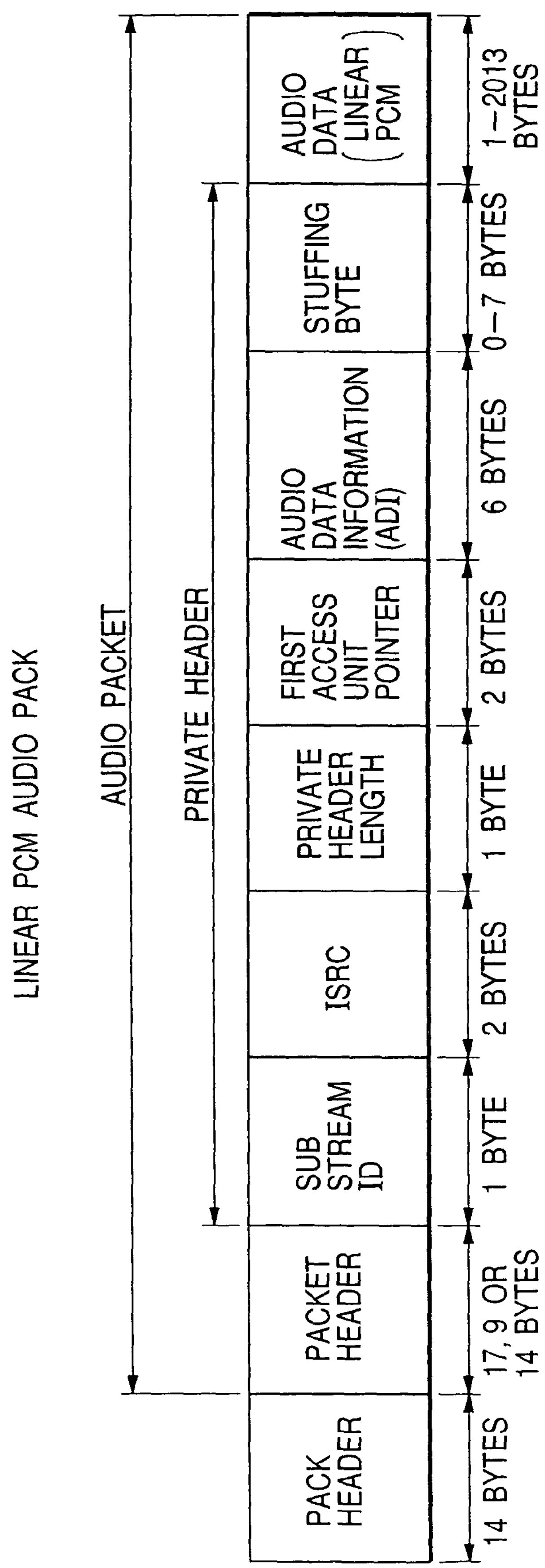
FIG. 33 is a diagram of the structure of a linear PCM audio pack.

As shown in FIG. 33, a linear PCM audio pack A has a 14-byte pack header and an audio packet. The pack header is followed by the audio packet. The audio packet has a sequence of a packet header, a private header, and audio data. The packet header has 9 bytes, 14 bytes, or 17 bytes. The audio data has 1 byte to 2,013 bytes.

As shown in FIGS. 33 and 34, the private header has a sequence of 8-bit sub stream ID (identification) information, a 4-bit reserved area, 4-bit information of an ISRC number, 8-bit information of ISRC data, 8-bit information of the private header length, a 16-bit first access unit pointer, 6-byte audio data information ADI, and 0 to 7 stuffing bytes.

As shown in FIG. 34, the audio data information ADI (see FIG. 33) has a sequence of a 1-bit audio emphasis flag, a 1-bit reserved area, a 2-bit reserved area, a 4-bit down mix code, 4-bit information of the quantization word length (the quantization bit number) in the group “1”, 4-bit information of the quantization word length (the quantization bit number) in the group “2”, 4-bit information of the audio sampling frequency fs1 in the group “1”, 4-bit information of the audio sampling frequency fs2 in the group “2”, a 4-bit reserved area, 4-bit information of a multiple channel type, a 3-bit reserved area, 5-bit channel assignment information (see FIG. 32), and 8-bit dynamic-range control information.

Figure 35:
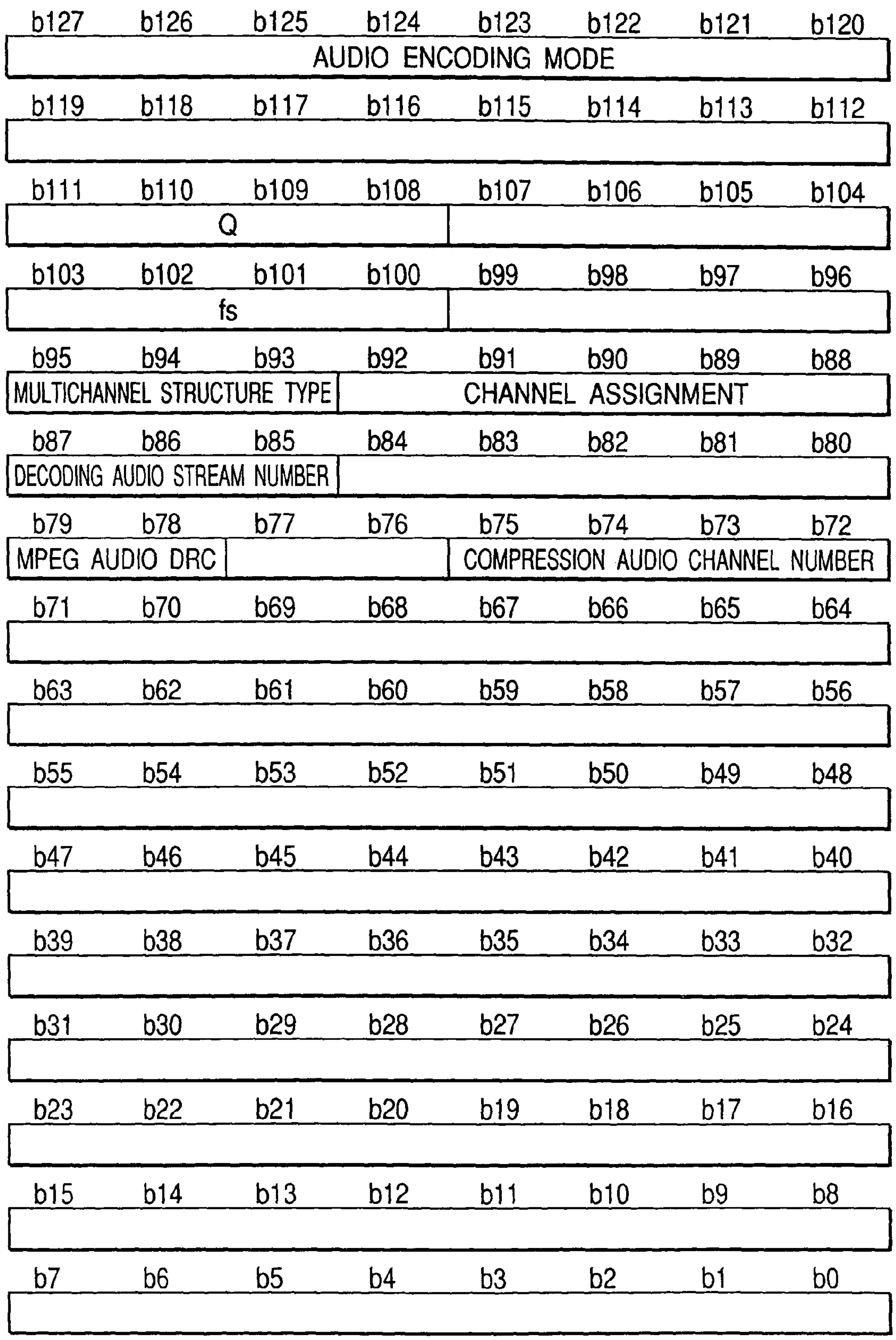
FIG. 35 is a diagram of the structure of an AOTT-VOB-AST-ATR area.

The audio-only-title audio-object attribute AOTT-AOB-ATR in FIG. 31 may be replaced by an audio-only-title video-object audio-stream attribute AOTT-VOB-AST-ATR when used in VTS_D in FIG. 30. The audio-only-title video-object audio-stream attribute AOTT-VOB-AST-ATR has a structure shown in FIG. 35.

Third Embodiment

Figure 36:
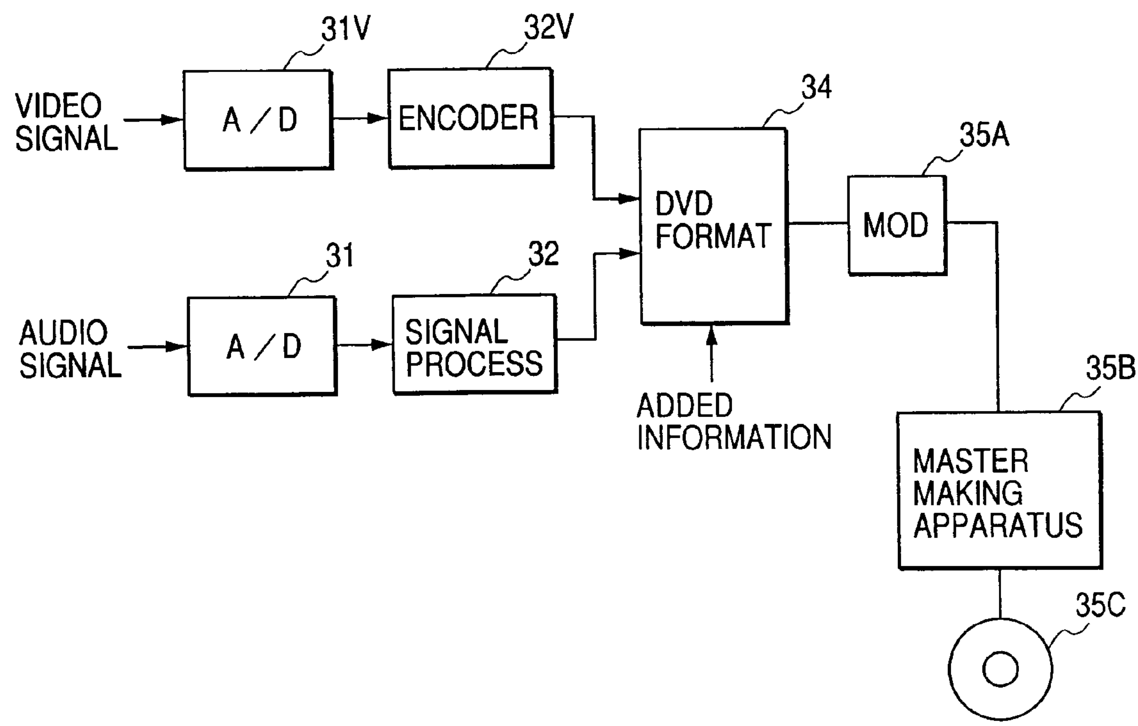
FIG. 36 is a block diagram of an audio-signal encoding apparatus according to a third embodiment of this invention.

FIG. 36 shows an audio-signal encoding apparatus according to a third embodiment of this invention. The apparatus of FIG. 36 includes analog-to-digital (A/D) converters 31 and 31V, a signal processing circuit 32, a video encoder 32V, and a DVD formatting section 34.

An analog video signal is applied to the A/D converter 31V. The A/D converter 31V is followed by the video encoder 32V. The video encoder 32V is followed by the DVD formatting section 34.

An analog audio signal is applied to the A/D converter 31. In general, the analog audio signal has multiple channels including, for example, front and rear channels. The analog audio signal may be of the monaural type. The A/D converter 31 is followed by the signal processing circuit 32. The signal processing circuit 32 is followed by the DVD formatting section 34.

The DVD formatting section 34 is successively followed by a modulation circuit 35A and a master making apparatus 35B.

Figure 37:
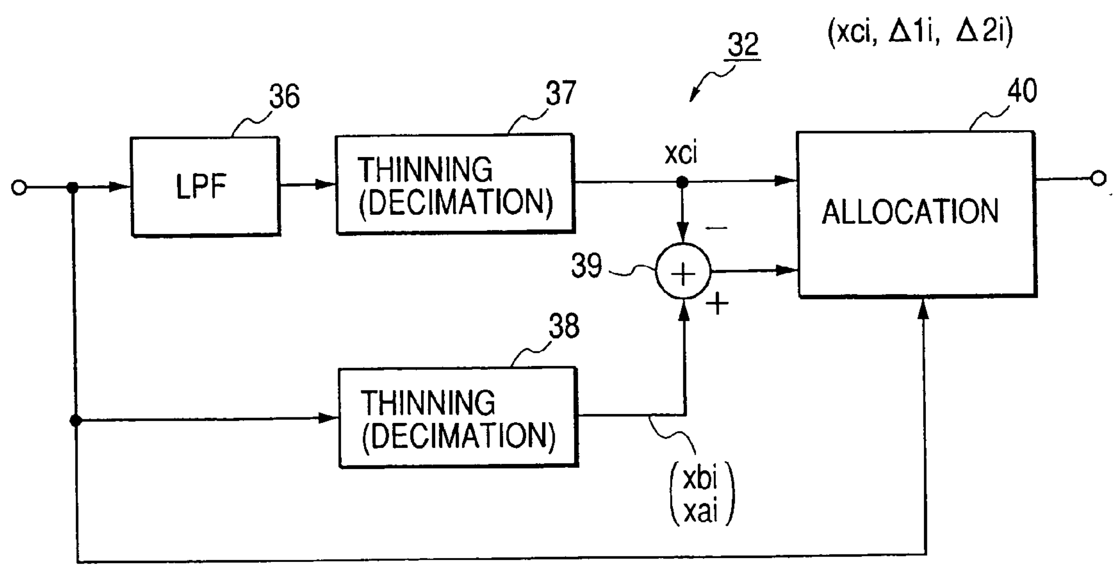
FIG. 37 is a block diagram of a signal processing circuit in FIG. 36.

As shown in FIG. 37, the signal processing circuit 32 includes a low pass filter (LPF) 36, thinning circuits (decimating circuits) 37 and 38, a subtracter 39, and an allocation circuit 40. The low pass filter 36, the thinning circuit 38, and the allocation circuit 40 follow the A/D converter 31 (see FIG. 36). The low pass filter 36 is followed by the thinning circuit 37. A first input terminal of the subtracter 39 is connected to the output terminal of the thinning circuit 37. A second input terminal of the subtracter 39 is connected to the output terminal of the thinning circuit 38. The output terminal of the subtracter 39 is connected to the allocation circuit 40. The output terminal of the thinning circuit 37 is connected to the allocation circuit 40. The allocation circuit 40 is followed by the DVD formatting section 34 (see FIG. 36).

The A/D converter 31 samples the analog audio signal at a given sampling frequency “fs”, and changes every sample of the analog audio signal into a corresponding digital sample. Thus, the A/D converter 31 changes the analog audio signal into a corresponding digital audio signal (for example, a PCM audio signal) with a given quantization bit number. In other words, the A/D converter 31 quantizes the analog audio signal into the corresponding digital audio signal. The quantization implemented by the A/D converter 31 may vary from channel to channel. For example, the A/D converter 31 quantizes front-channel components of the analog audio signal at a first predetermined sampling frequency and a first predetermined quantization bit number. The A/D converter 31 quantizes rear-channel components of the analog audio signal at a second predetermined sampling frequency and a second predetermined bit number which are equal to or different from the first predetermined sampling frequency and the first predetermined quantization bit number respectively. The A/D converter 31 outputs the digital audio signal to the signal processing circuit 32.

Operation of the signal processing circuit 32 can be changed between first and second modes which correspond to the absence and the presence of thinning respectively.

During operation of the signal processing circuit 32 in the first mode (the absence of thinning), the digital audio signal is directly transmitted from the A/D converter 31 to the allocation circuit 40. The device 40 allocates the digital audio signal to audio data which can be placed in audio packs A (see FIG. 14 or FIG. 33). The allocation circuit 40 outputs the audio data to the DVD formatting section 34.

During operation of the signal processing circuit 32 in the second mode (the presence of thinning), the digital audio signal is transmitted from the A/D converter 31 to the low pass filter 36 and the thinning circuit 38. The low pass filter 36 conducts only a half of the frequency band of the digital audio signal. The low pass filter 36 outputs the resultant signal to the thinning circuit 37. The thinning circuit 37 selects one fourth of samples of the output signal of the low pass filter 36. The thinning circuit 37 outputs only the selected signal samples to the subtracter 39 and the allocation circuit 40. The selected samples are spaced at 4-sample intervals.

During operation of the signal processing circuit 32 in the second mode (the presence of thinning), the thinning circuit 38 selects alternate ones of samples of the digital audio signal. The thinning circuit 38 outputs only the selected signal samples to the subtracter 39.

A sequence of samples of the output signal from the thinning circuit 37 is now expressed as:

$$xc1, xc2, xc3, \ldots, xci,$$

On the other hand, a sequence of samples of the output signal from the thinning circuit 38 is expressed as:

$$xb1, xa1, xb2, xa2, \ldots, xbi, xai,$$

During operation of the signal processing circuit 32 in the second mode (the presence of thinning), the subtracter 39 calculates differences Δ1i and Δ2i between the output signals of the thinning circuits 37 and 38. The differences Δ1i and Δ2i are given as follows.

$$\Delta 1i = xbi - xci$$

$$\Delta 2i = xai - xci$$

The subtracter 39 informs the allocation circuit 40 of the calculated differences Δ1i and Δ2i.

During operation of the signal processing circuit 32 in the second mode (the presence of thinning), the allocation circuit 40 combines the output signal of the thinning circuit 37 and the information of the differences Δ1i and Δ2i into audio user data which can be placed in audio packs A (see FIG. 14 or FIG. 33). The allocation circuit 40 outputs the audio user data to the DVD formatting section 34.

The A/D converter 31V changes the analog video signal into a corresponding digital video signal. The A/D converter 31V outputs the digital video signal to the video encoder 32V. The video encoder 32V changes the digital video signal into an MPEG-format signal. The video encoder 32V packs the MPEG-format signal into video user data which can be placed in video packs V. The video encoder 32V outputs the video user data to the DVD formatting section 34.

The DVD formatting section 34 receives control data from suitable devices (not shown). The control data represents character information, display time information, sampling-frequency information, quantization-bit-number information, thinning information, and other information to be added. The DVD formatting section 34 packs the audio data (or the audio user data), the video user data, and the added information into a composite signal of a DVD-Audio format corresponding to the signal recording format of the DVD-Audio in FIG. 2 or the signal recording format of the DVD-Audio in FIG. 26. The DVD formatting section 34 outputs the composite signal of the DVD-Audio format to the modulation circuit 35A. The modulation circuit 35A subjects the composite signal of the DVD-Audio format to given modulation (for example, EFM modulation) suited to a DVD-Audio. The modulation circuit 35A outputs the modulation-resultant signal to the master making apparatus 35B. The apparatus 35B makes a master disc 35C in response to the output signal of the modulation circuit 35A. The maser disc 35C stores the output signal of the modulation circuit 35A. DVD-Audios are made by a DVD making apparatus (not shown) on the basis of the master disc 35C.

Fourth Embodiment

Figure 38:
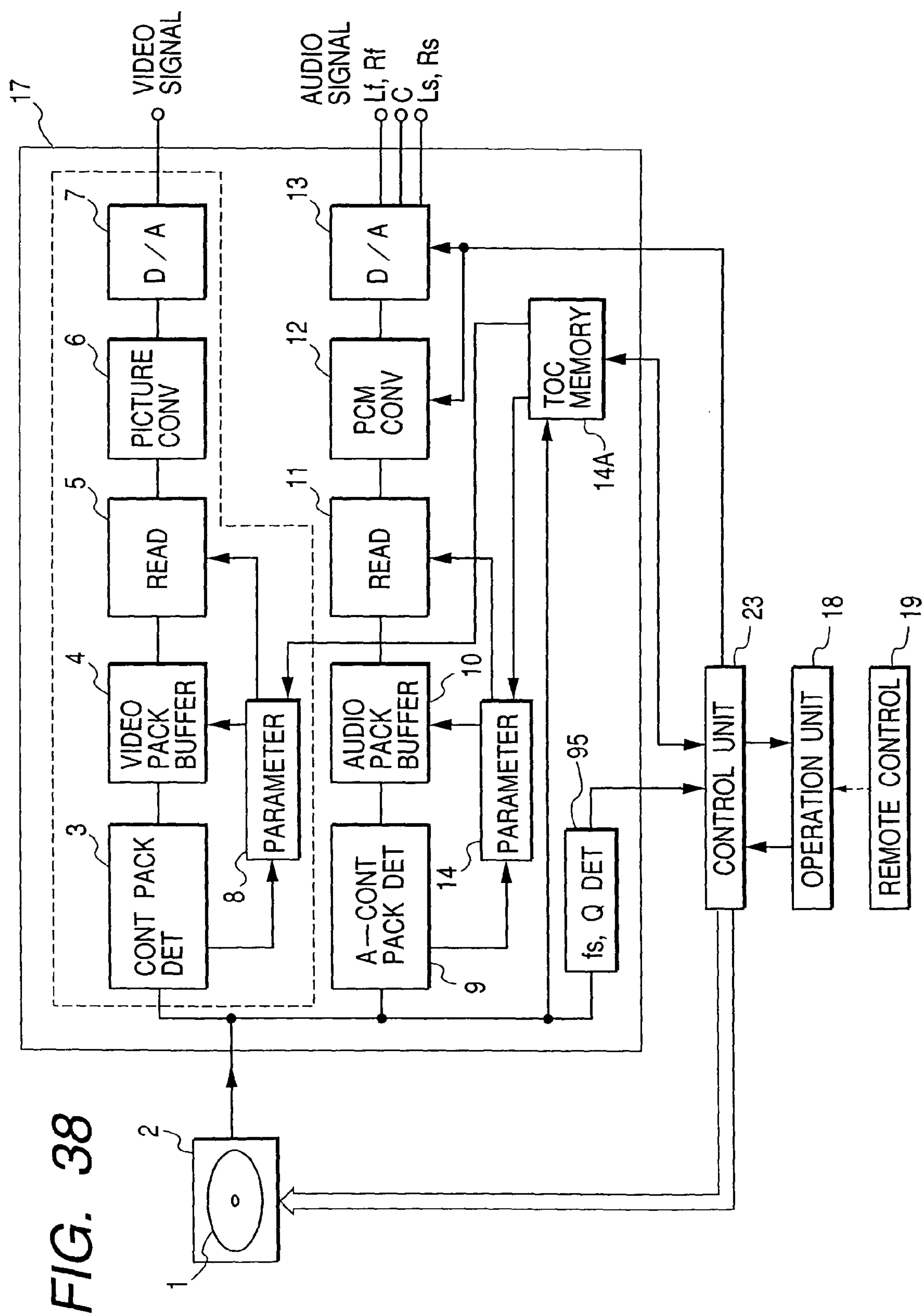
FIG. 38 is a block diagram of a DVD-Audio player including an audio-signal decoding apparatus according to a fourth embodiment of this invention.

FIG. 38 shows a DVD-Audio player including an audio-signal decoding apparatus according to a fourth embodiment of this invention. The player in FIG. 38 is designed for a DVD-Audio in FIG. 2.

The player in FIG. 38 operates on a DVD-Audio 1. The player in FIG. 38 includes an operation unit 18 and a remote control unit 19. The remote control unit 19 can communicate with the operation unit 18 by wireless. The operation unit 18 is connected to a control unit 23 including a CPU. The control unit 23 is connected to a drive unit 2 and a reproduced signal processing unit 17. The drive unit 2 is connected to the reproduced signal processing unit 17.

The CPU 23 operates in accordance with a program stored in an internal ROM. When the user actuates the operation unit 18 or the remote control unit 19 to request tune selection, playback, fast feed, or stop, the CPU 23 controls the drive unit 2 and the reproduced signal processing unit 17 to implement the requested operation mode.

During playback, the drive unit 2 reads out a signal from the DVD-Audio 1. The drive unit 2 includes a demodulator which subjects the readout signal to given demodulation (for example, EFM demodulation). The drive unit 2 outputs the demodulation-resultant signal to the reproduced signal processing unit 17 as a reproduced signal. The drive unit 2 has a function of detecting TOC information in the demodulation-resultant signal (the reproduced signal). The drive unit 2 outputs the detected TOC information to the signal processing unit 17.

The reproduced signal processing circuit 17 includes a control pack detector 3 which receives the reproduced signal from the drive unit 2. The control pack detector 3 detects every control pack CONT in the reproduced signal. The control pack detector 3 generates control parameters in response to the detected control pack CONT. The control pack detector 3 sets the control parameters in a parameter unit (a parameter memory) 8. The control pack detector 3 selects video packs V from the reproduced signal in response to the detected control pack CONT. The control pack detector 3 sequentially writes the video packs V into a video pack buffer 4.

The reproduced signal processing circuit 17 includes a reading unit 5 connected to the video pack buffer 4. The reading unit 5 reads out user data from the video packs V in the video pack buffer 4 in an order determined by SCR information (see FIG. 14) in each of the video packs V. The reading unit 5 outputs a stream of the user data to a picture converter 6. The picture converter 6 changes the user data stream into a corresponding digital video signal. The picture converter 6 outputs the digital video signal to a digital-to-analog (D/A) converter 7. The D/A converter 7 changes the digital video signal into a corresponding analog video signal. The D/A converter 7 outputs the analog video signal to an external device (not shown).

It should be noted that the reading unit 5 may read out user data from the video packs V in the video pack buffer 4 in an order determined by PTS (presentation time stamp) information in a control pack CONT. To this end, the control pack detector 3 feeds the PTS information in the detected control pack CONT to the reading unit 5.

The reproduced signal processing circuit 17 includes an audio control pack detector 9 which receives the reproduced signal from the drive unit 2. The audio control pack detector 9 detects every audio control pack A-CONT in the reproduced signal. The audio control pack detector 9 generates control parameters in response to the detected audio control pack A-CONT. The audio control pack detector 9 sets the control parameters in a parameter unit (a parameter memory) 14. The audio control pack detector 9 selects audio packs A from the reproduced signal in response to the detected audio control pack A-CONT. The audio control pack detector 9 sequentially writes the audio packs A into an audio pack buffer 10.

The reproduced signal processing circuit 17 includes a reading unit 11 connected to the audio pack buffer 10. The reading unit 11 reads out user data (audio data) from the audio packs A in the audio pack buffer 10 in an order determined by SCR information (see FIG. 14) in each of the audio packs A. The reading unit 11 outputs a stream of the user data (the audio data) to a PCM converter 12. The PCM converter 12 changes the user data stream (the audio data stream) into a corresponding digital audio signal by a PCM decoding process. The PCM converter 12 outputs the digital audio signal to a digital-to-analog (D/A) converter 13. The D/A converter 13 changes the digital audio signal into a corresponding analog audio signal. The analog audio signal has, for example a left front channel Lf, a right front channel Rf, a center channel C, a left surround channel Ls, and a right surround channel Rs. The D/A converter 13 outputs the analog audio signal to an external device (not shown).

It should be noted that the reading unit 11 may read out user data (audio data) from the audio packs A in the audio pack buffer 10 in an order determined by present-time information in audio search data ASD (see FIG. 18) in an audio control pack A-CONT. To this end, the audio control pack detector 9 feeds the present-time information in the detected audio control pack A-CONT to the reading unit 11.

The reproduced signal processing unit 17 includes a memory 14A which stores the TOC information fed from the drive unit 2. The memory 14A is connected to the parameter units 8 and 14, and the control unit 23. When the user actuates the operation unit 18 or the remote control unit 19 to select a desired tune, the control unit 23 refers to the TOC information in the memory 14A and controls the drive unit 2 and the reproduced signal processing unit 17 in response to the TOC information to start playback of the desired tune from its head.

The reproduced signal processing unit 17 includes a detector 95 which receives the reproduced signal from the drive unit 2. The detector 95 extracts information of sampling frequencies "fs" (fs1 and fs2) and information of quantization bit numbers Q (Q1 and Q2) from the reproduced signal. The detector 95 feeds the information of the sampling frequencies "fs" (fs1 and fs2) and the information of the quantization bit numbers Q (Q1 and Q2) to the CPU 23. The CPU 23 controls the PCM converter 12 and the D/A converter 13 in response to the information of the sampling frequencies "fs" (fs1 and fs2) and the information of the quantization bit numbers Q (Q1 and Q2). Accordingly, conditions of the inverse quantization (the signal decoding) implemented by the PCM converter 12 and the D/A converter 13 depend on the information of the sampling This application is a divisional of U.S. Ser No. 09/114,185, filed Jul. 13, 1998 now U.S. Pat. No. 6,636,474. frequencies "fs" (fs1 and fs2) and the information of the quantization bit numbers Q (Q1 and Q2). Thus, the inverse quantization can be on a channel by channel basis or a channel-group by channel-group basis.

Fifth Embodiment

Figure 39:
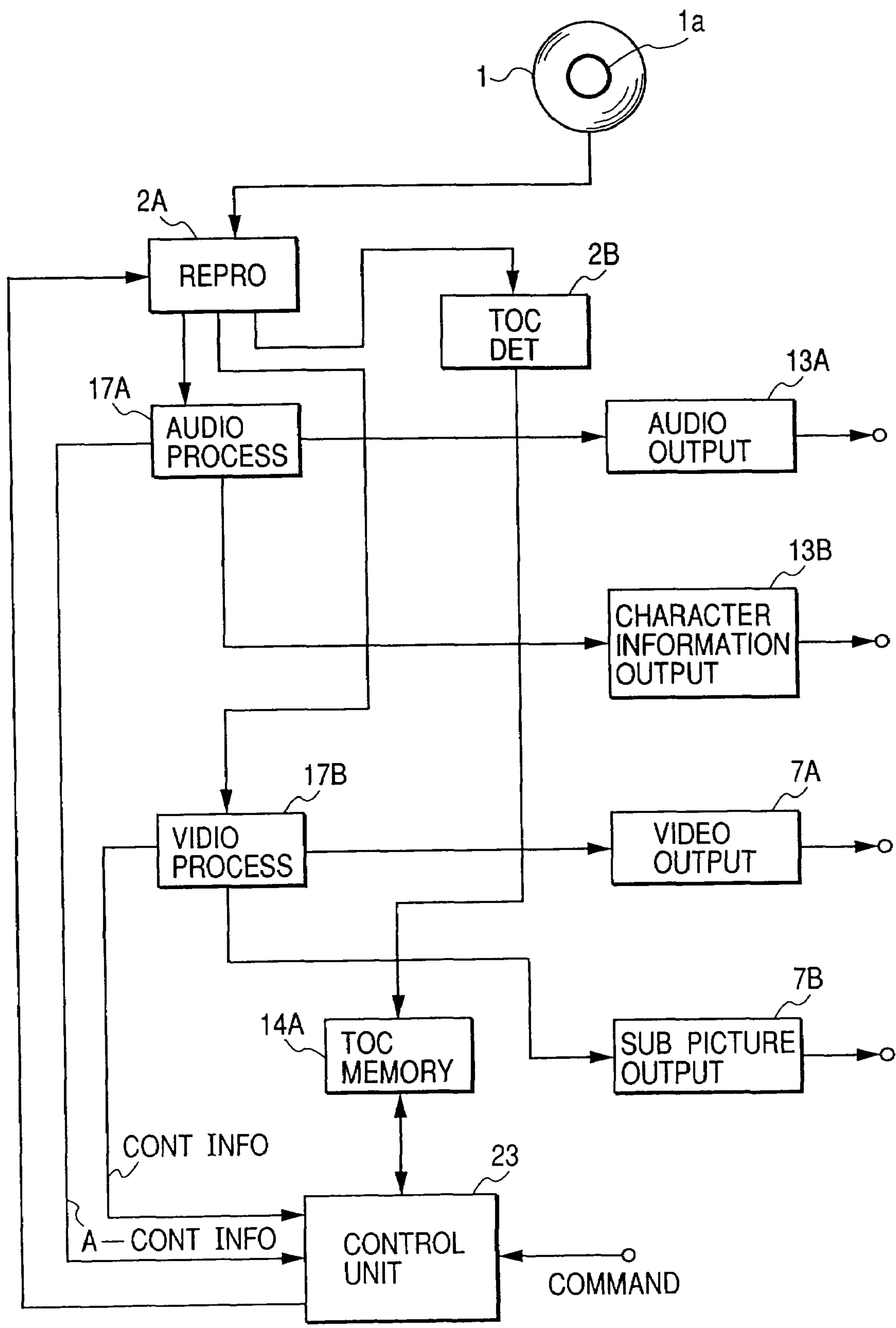
FIG. 39 is a block diagram of a DVD-Audio player including an audio-signal decoding apparatus according to a fifth embodiment of this invention.

FIG. 39 shows a DVD-Audio player including an audio-signal decoding apparatus according to a fifth embodiment of this invention. The player in FIG. 39 is basically similar to the player in FIG. 38.

The player in FIG. 39 operates on a DVD-Audio 1 which has a TOC area 1*a* loaded with TOC information. The TOC area 1*a* may be omitted from the DVD-Audio 1. The player in FIG. 39 includes a control unit 23 connected to an operation unit (not shown). The control unit 23 includes a CPU. A remote control unit (not shown) can communicate with the operation unit by wireless. The control unit 23 is connected to a reproducing device 2A.

The reproducing device 2A is connected to a TOC detector 2B, an audio processor 17A, and a video processor 17B. The TOC detector 2B is connected to a memory 14A. The memory 14A is connected to the control unit 23. The audio processor 17A and the video processor 17B are connected to the control unit 23. The audio processor 17A is connected to output devices 13A and 13B. The video processor 17B is connected to output devices 7A and 7B.

When the DVD-Audio 1 is set in position within the player of FIG. 39, the reproducing device 2A reads out a signal from the TOC area 1*a* of the DVD-Audio 1. The reproducing device 2A outputs the readout signal to the TOC detector 2B. The TOC detector 2B detects TOC information in the readout signal. The TOC detector 2B stores the detected TOC information into the memory 14A.

When the user actuates the operation unit or the remote control unit to select a desired tune, the control unit 23 refers to the TOC information in the memory 14A and controls the reproducing device 2A in response to the TOC information to start playback of the desired tune from its head.

During playback, the reproducing device 2A reads out a signal from the DVD-Audio 1. The reproducing device 2A outputs the readout signal to the audio processor 17A and the video processor 17B as a reproduced signal. The audio processor 17A separates audio data from the reproduced signal. The audio processor 17A feeds the audio data to the output device 13A. The output device 13A converts the audio data into a corresponding audio signal. The output device 13A feeds the audio signal to an external device (not shown). In addition, the audio processor 17A separates character information from the reproduced signal. The audio processor 17A feeds the character information to the output device 13B. The output device 13B converts the character information into a corresponding character signal. The output device 13B feeds the character signal to an external device (not shown). Furthermore, the audio processor 17A separates information in every audio control pack A-CONT from the reproduced signal. The audio processor 17A feeds the audio control pack information to the control unit 23.

During playback, the video processor 17B separates video data from the reproduced signal. The video processor 17B feeds the video data to the output device 7A. The output device 7A converts the video data into a corresponding video signal. The output device 7A feeds the video signal to an external device (not shown). In addition, the video processor 17B separates sub picture information from the reproduced signal. The video processor 17B feeds the sub picture information to the output device 7B. The output device 7B converts the sub picture information into a corresponding sub picture signal. The output device 7B feeds the sub picture signal to an external device (not shown). Furthermore, the video processor 17B separates information in every control pack CONT from the reproduced signal. The video processor 17B feeds the control pack information to the control unit 23.

Sixth Embodiment

Figure 40:
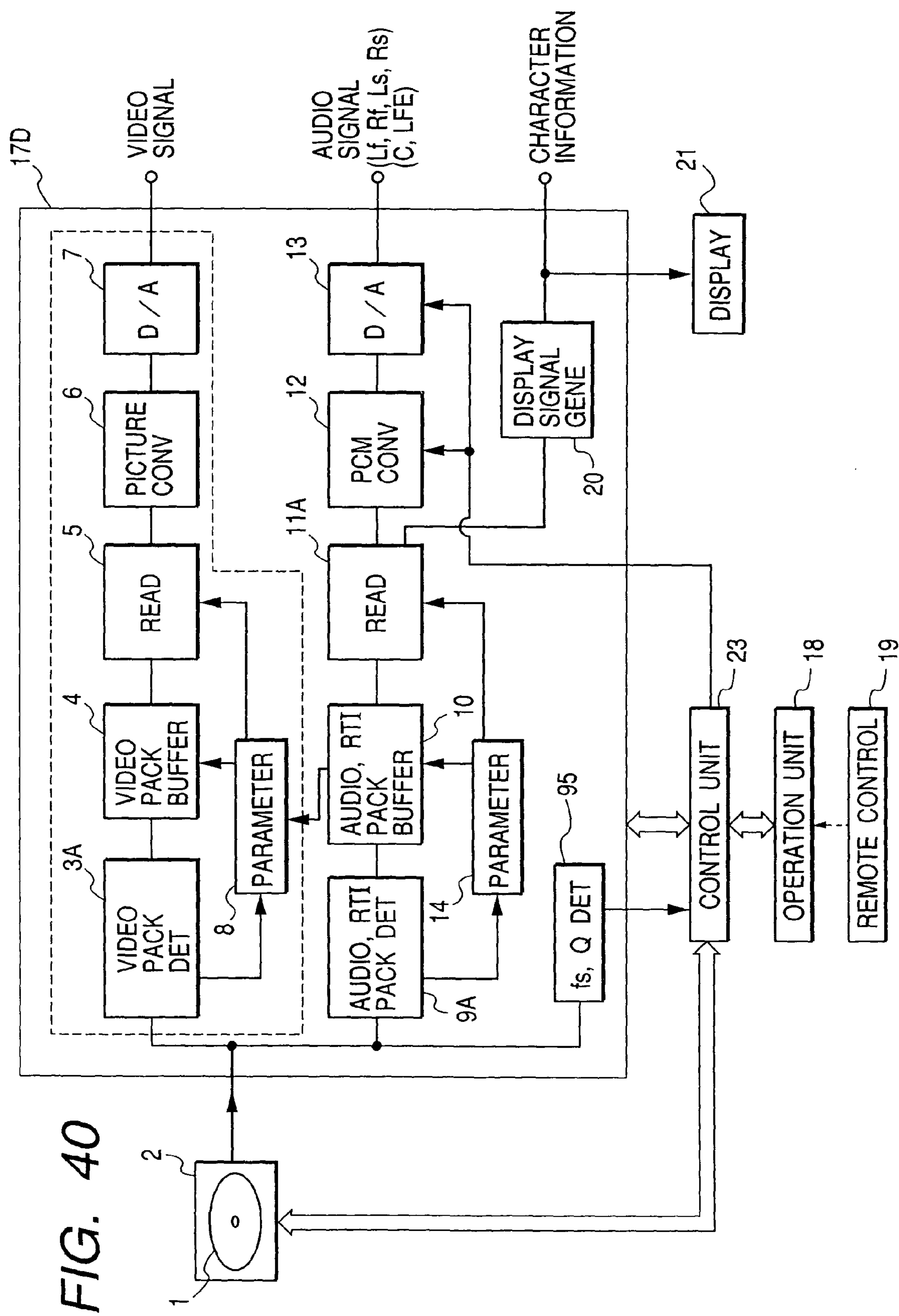
FIG. 40 is a block diagram of a DVD-Audio player including an audio-signal decoding apparatus according to a sixth embodiment of this invention.

FIG. 40 shows a DVD-Audio player including an audio-signal decoding apparatus according to a sixth embodiment of this invention. The player in FIG. 40 is designed for a DVD-Audio in FIG. 26.

The player in FIG. 40 operates on a DVD-Audio 1. The player in FIG. 40 includes an operation unit 18 and a remote control unit 19. The remote control unit 19 can communicate with the operation unit 18 by wireless. The operation unit 18 is connected to a control unit 23. The control unit 23 includes a CPU. The control unit 23 is connected to a drive unit 2 and a reproduced signal processing unit 17D. The drive unit 2 is connected to the reproduced signal processing unit 17D.

The CPU 23 operates in accordance with a program stored in an internal ROM. When the user actuates the operation unit 18 or the remote control unit 19 to request tune selection, playback, fast feed, or stop, the CPU 23 controls the drive unit 2 and the reproduced signal processing unit 17D to implement the requested operation mode.

During playback, the drive unit 2 reads out a signal from the DVD-Audio 1. The drive unit 2 includes a demodulator which subjects the readout signal to given demodulation (for example, EFM demodulation). The drive unit 2 outputs the demodulation-resultant signal to the reproduced signal processing unit 17D as a reproduced signal.

The reproduced signal processing circuit 17D includes a video pack detector 3A which receives the reproduced signal from the drive unit 2. The video pack detector 3A detects video packs V (still-picture packs SPCT) in the reproduced signal. The video pack detector 3A generates control parameters in response to the detected video packs V. The video pack detector 3A sets the control parameters in a parameter unit (a parameter memory) 8. The video pack detector 3A sequentially writes the video packs V into a video pack buffer 4.

The reproduced signal processing circuit 17D includes a reading unit 5 connected to the video pack buffer 4. The reading unit 5 reads out user data from the video packs V in the video pack buffer 4 in an order determined by SCR information (see FIG. 14) in each of the video packs V. The reading unit 5 outputs a stream of the user data to a picture converter 6. The picture converter 6 changes the user data stream into a corresponding digital video signal. The picture converter 6 outputs the digital video signal to a digital-to-analog (D/A) converter 7. The D/A converter 7 changes the digital video signal into a corresponding analog video signal. The D/A converter 7 outputs the analog video signal to an external device (not shown).

The reproduced signal processing circuit 17D includes an audio pack detector 9A which receives the reproduced signal from the drive unit 2. The audio control pack detector 9A detects audio packs A and real-time information packs RTI in the reproduced signal. The audio pack detector 9A generates control parameters in response to the detected audio packs A and the detected real-time information packs RTI. The audio pack detector 9A sets the control parameters in a parameter unit (a parameter memory) 14. The audio pack detector 9A sequentially writes the audio packs A and the real-time information packs RTI into an audio pack buffer 10.

The reproduced signal processing circuit 17D includes a reading unit 11A connected to the audio pack buffer 10. The reading unit 11A reads out user data (audio data) from the audio packs A in the audio pack buffer 10 in an order determined by SCR information (see FIG. 14) in each of the audio packs A. The reading unit 11A outputs a stream of the user data (the audio data) to a PCM converter 12. The PCM converter 12 changes the user data stream (the audio data stream) into a corresponding digital audio signal by a PCM decoding process. The PCM converter 12 outputs the digital audio signal to a digital-to-analog (D/A) converter 13. The D/A converter 13 changes the digital audio signal into a corresponding analog audio signal. The analog audio signal has, for example, a left front channel Lf, a right front channel Rf, a left surround channel Ls, a right surround channel Rs, a center channel C, and a low frequency effect channel LFE. The D/A converter 13 outputs the analog audio signal to an external device (not shown).

In addition, the reading unit 11A reads out audio character display information (ACD information) from the real-time information packs RTI in the audio pack buffer 10 in an order determined by ISCR information in each of the real-time information packs RTI. The reading unit 11A outputs the audio character display information to a display signal generator 20. The display signal generator 20 converts the audio character display information into a corresponding display signal. The display signal generator 20 outputs the display signal to a display device 21. The display device 21 indicates the display signal. The display signal generator 20 may output the display signal to an external device (not shown).

The reproduced signal processing unit 17D includes a detector 95 which receives the reproduced signal from the drive unit 2. The detector 95 extracts information of sampling frequencies "fs" (fs1 and fs2) and information of quantization bit numbers Q (Q1 and Q2) from the reproduced signal. The detector 95 feeds the information of the sampling frequencies "fs" (fs1 and fs2) and the information of the quantization bit numbers Q (Q1 and Q2) to the CPU 23. The CPU 23 controls the PCM converter 12 and the D/A converter 13 in response to the information of the sampling frequencies "fs" (fs1 and fs2 ) and the information of the quantization bit numbers Q (Q1 and Q2). Accordingly, conditions of the inverse quantization (the signal decoding) implemented by the PCM converter 12 and the D/A converter 13 depend on the information of the sampling frequencies "fs" (fs1 and fs2) and the information of the quantization bit numbers Q (Q1 and Q2). Thus, the inverse quantization can be on a channel by channel basis or a channel-group by channel-group basis.

Seventh Embodiment

Figure 41:
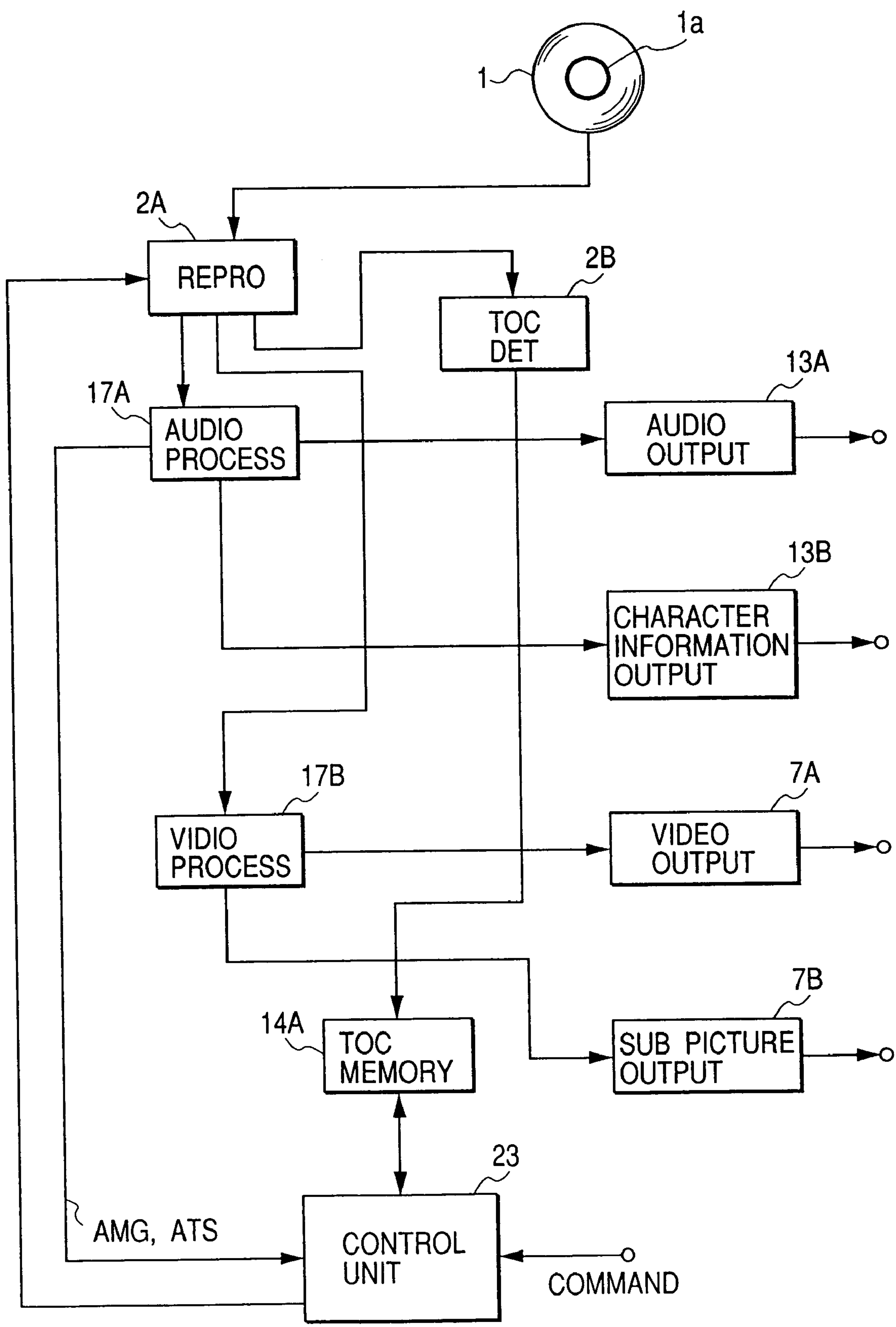
FIG. 41 is a block diagram of a DVD-Audio player including an audio-signal decoding apparatus according to a seventh embodiment of this invention.

FIG. 41 shows a DVD-Audio player including an audio-signal decoding apparatus according to a seventh embodiment of this invention. The player in FIG. 41 is basically similar to the player in FIG. 40.

The player in FIG. 41 operates on a DVD-Audio 1 which has a TOC area 1*a* loaded with TOC information. The TOC area 1*a* may be included in the lead-in area or in the AST_D. The TOC may be called SAPP (Simple Audio Play Pointer) for a DVD-Audio disc. The player in FIG. 41 includes a control unit 23 connected to an operation unit (not shown). The control unit 23 includes a CPU. A remote control unit (not shown) can communicate with the operation unit by wireless. The control unit 23 is connected to a reproducing device 2A.

The reproducing device 2A is connected to a TOC detector 2B, an audio processor 17A, and a video processor 17B. The TOC detector 2B is connected to a memory 14A. The memory 14A is connected to the control unit 23. The audio processor 17A and the video processor 17B are connected to the control unit 23. The audio processor 17A is connected to output devices 13A and 13B. The video processor 17B is connected to output devices 7A and 7B.

When the DVD-Audio 1 is set in position within the player of FIG. 41, the reproducing device 2A reads out a signal from the TOC area 1*a* of the DVD-Audio 1. The reproducing device 2A outputs the readout signal to the TOC detector 2B. The TOC detector 2B detects TOC information in the readout signal. The TOC detector 2B stores the detected TOC information into the memory 14A.

When the user actuates the operation unit or the remote control unit to select a desired tune, the control unit 23 refers to the TOC information in the memory 14A and controls the reproducing device 2A in response to the TOC information to start playback of the desired tune from its head.

During playback, the reproducing device 2A reads out a signal from the DVD-Audio 1. The reproducing device 2A outputs the readout signal to the audio processor 17A and the video processor 17B as a reproduced signal. The audio processor 17A separates audio data from the reproduced signal. The audio processor 17A feeds the audio data to the output device 13A. The output device 13A converts the audio data into a corresponding audio signal. The output device 13A feeds the audio signal to an external device (not shown). In addition, the audio processor 17A separates character information (audio character display information) from the reproduced signal. The audio processor 17A feeds the character information to the output device 13B. The output device 13B converts the character information into a corresponding character signal. The output device 13B feeds the character signal to an external device (not shown). Furthermore, the audio processor 17A separates an audio manager AMG and audio title sets ATS from the reproduced signal. The audio processor 17A feeds the audio manager AMG and the audio title sets ATS to the control unit 23.

During playback, the video processor 17B separates video data from the reproduced signal. The video processor 17B feeds the video data to the output device 7A. The output device 7A converts the video data into a corresponding video signal. The output device 7A feeds the video signal to an external device (not shown). In addition, the video processor 17B separates sub picture information from the reproduced signal. The video processor 17B feeds the sub picture information to the output device 7B. The output device 7B converts the sub picture information into a corresponding sub picture signal. The output device 7B feeds the sub picture signal to an external device (not shown).

Eighth Embodiment

Figure 42:
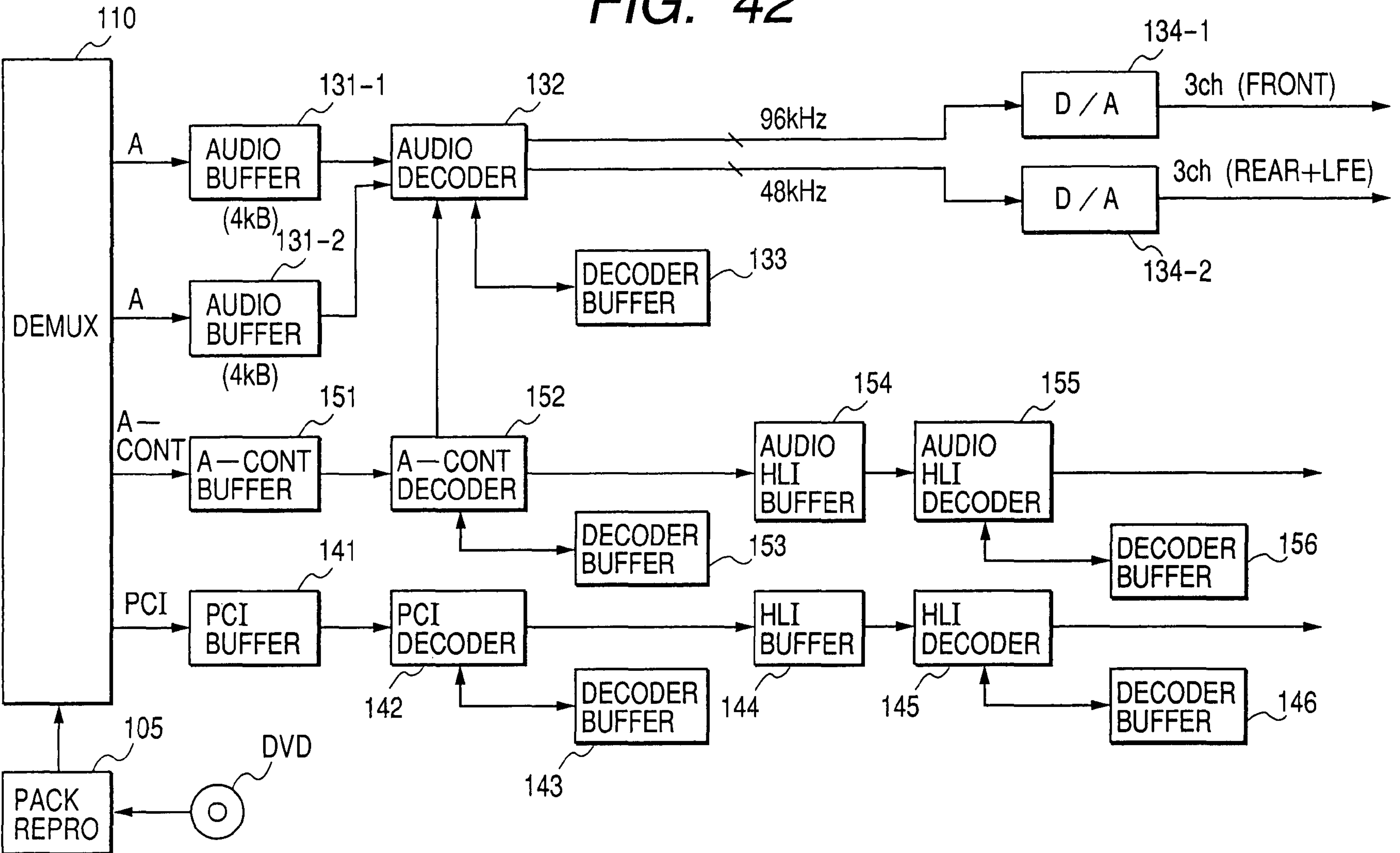
FIG. 42 is a block diagram of an optical disc player according to an eighth embodiment of this invention.

FIG. 42 shows an optical disc player or a DVD-Audio player according to an eighth embodiment of this invention. The DVD-Audio player in FIG. 42 includes a demultiplexer 110 which follows a pack reproducing section 105. The pack reproducing section 105 reads out a signal from a DVD-Audio, and derives a stream of packs from the readout signal. The demultiplexer 110 receives the pack stream from the pack reproducing section 105.

In the DVD-Audio player in FIG. 42, the demultiplexer 110 is connected to buffers 131-1, 131-2, 141, and 151. The buffers 131-1 and 131-2 are connected to a decoder 132. The decoder 132 is connected to a buffer 133, and D/A converters 134-1 and 134-2.

The buffer 141 is connected to a decoder 142. The decoder 142 is connected to buffers 143 and 144. The buffer 144 is connected to a decoder 145. The decoder 145 is connected to a buffer 146.

The buffer 151 is connected to a decoder 152. The decoder 152 is connected to buffers 153 and 154. The buffer 154 is connected to a decoder 155. The decoder 155 is connected to a buffer 156.

The demultiplexer 110 separates audio packs A from the pack stream. The demultiplexer 110 sequentially and alternately writes the separated audio packs A into the buffers 131-1 and 131-2. The capacity of each of the buffers 131-1 and 131-2 is equal to 4 kilobytes.

In addition, the demultiplexer 110 separates audio control packs A-CONT from the pack stream. The demultiplexer 110 sequentially writes the separated audio control packs A-CONT into the buffer 151.

Furthermore, the demultiplexer 110 separates control packs CONT from the pack stream. The demultiplexer 110 extracts presentation control information PCI from the separated control packs CONT. The demultiplexer 110 writes the extracted presentation control information PCI into the buffer 141.

The decoder 152 reads out information from the audio control packs A-CONT in the buffer 151. The decoder 152 cooperates with the buffer 153, thereby decoding the readout information. The decoder 152 informs the decoder 132 of the decoding-resultant information. The decoder 152 separates audio highlight information from the decoding-resultant information. The decoder 152 writes the audio highlight information into the buffer 154. The decoder 155 reads out the audio highlight information from the buffer 154. The decoder 155 cooperates with the buffer 156, thereby decoding the audio highlight information. The decoder 155 outputs the decoding-resultant information to an external device (not shown).

The decoder 132 alternately accesses the buffers 131-1 and 131-2 and reads out user data (audio data) from the audio packs A in the buffers 131-1 and 131-2. When the buffer 131-1 is accessed by the demultiplexer 110, the decoder 132 accesses the buffer 131-2. When the buffer 131-2 is accessed by the demultiplexer 110, the decoder 132 accesses the buffer 131-1. The decoder 132 cooperates with the buffer 133, thereby combining the user data into an audio data stream and decoding the audio data stream into a PCM audio signal in response to the information fed from the decoder 152. The PCM audio signal has 3 front channels, 2 rear channels, and one LFE channel. The 3 front channels relate to a sampling frequency "fs" of 96 kHz. The 2 rear channel and the LFE channel relate to a sampling frequency "fs" of 48 kHz. The decoder 132 outputs the 3 front channels of the PCM audio signal to the D/A converter 34-1. The decoder 132 outputs the 2 rear channels and the LFE channel of the PCM audio signal to the D/A converter 34-2. The D/A converter 34-1 changes the 3 front channels of the PCM audio signal into 3 front channels of a corresponding analog audio signal. The D/A converter 34-1 outputs the 3 front channels of the analog audio signal to an external device (not shown). The D/A converter 34-2 changes the 2 rear channels and the LFE channel of a corresponding analog audio signal. The D/A converter 34-2 outputs the 2 rear channels and the LFE channel of the analog audio signal to an external device (not shown).

The decoder 142 reads out the presentation control information PCI from the buffer 141. The decoder 142 cooperates with the buffer 143, thereby decoding the presentation control information PCI into highlight information. The decoder 142 writes the highlight information into the buffer 144. The decoder 145 reads out the highlight information from the buffer 144. The decoder 145 cooperates with the buffer 146, thereby decoding the highlight information. The decoder 145 outputs the decoding-resultant information to an external device (not shown).

Ninth Embodiment

Figure 43:
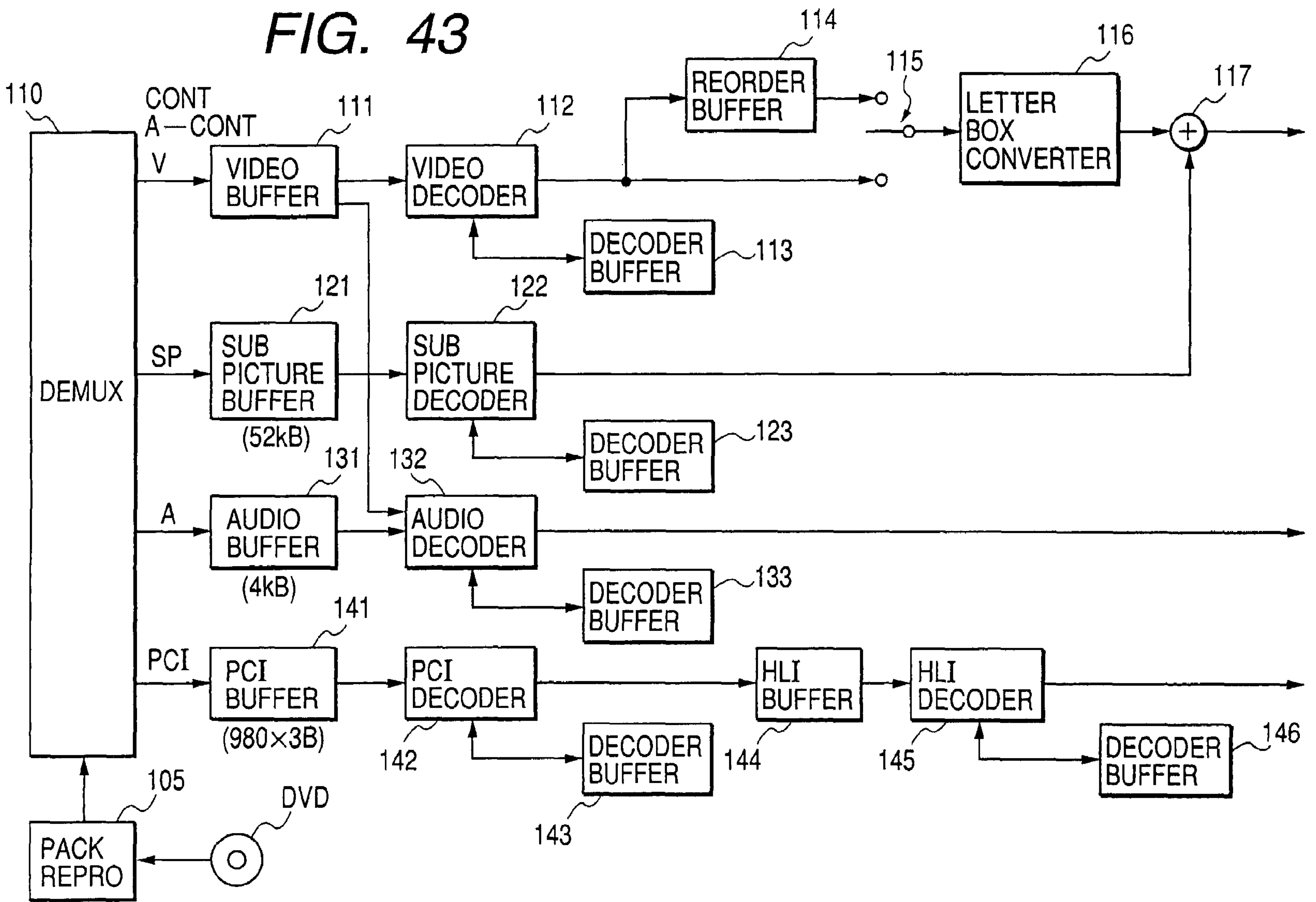
FIG. 43 is a block diagram of an optical disc player according to a ninth embodiment of this invention.

FIG. 43 shows an optical disc player or a DVD-Video player according to a ninth embodiment of this invention. The DVD-Video player in FIG. 43 includes a demultiplexer 110 which follows a pack reproducing section 105. The pack reproducing section 105 reads out a signal from a DVD-Video, and derives a stream of packs from the readout signal. The demultiplexer 110 receives the pack stream from the pack reproducing section 105.

In the DVD-Video player in FIG. 43, the demultiplexer 110 is connected to buffers 111, 121, 131, and 141. The buffer 111 is connected to decoders 112 and 132. The decoder 112 is connected to a buffer 113, a reorder buffer 114, and a switch 115. The reorder buffer 114 is connected to the switch 115. The switch 115 is connected to a letter box converter 116. The letter box converter 116 is connected to an adder 117. The buffer 121 is connected to a decoder 122. The decoder 122 is connected to the adder 117 and a buffer 123.

The buffer 131 is connected to the decoder 132. The decoder 132 is connected to a buffer 133.

The buffer 141 is connected to a decoder 142. The decoder 142 is connected to buffers 143 and 144. The buffer 144 is connected to a decoder 145. The decoder 145 is connected to a buffer 146.

The demultiplexer 110 separates video packs V, audio control packs A-CONT, and control packs CONT from the pack stream. The demultiplexer 110 writes the separated video packs V, the separated audio control packs A-CONT, and the separated control packs CONT into the buffer 111.

The demultiplexer 110 separates sub picture packs SP from the pack stream. The demultiplexer 110 sequentially writes the separated sub picture packs SP into the buffer 121.

The demultiplexer 110 separates audio packs A from the pack stream. The demultiplexer 110 sequentially writes the separated audio packs A into the buffer 131.

In addition, the demultiplexer 110 separates navigation packs from the pack stream. The demultiplexer 110 extracts presentation control information PCI from the separated navigation packs. The demultiplexer 110 may extract presentation control information PCI from the separated control packs CONT. The demultiplexer 110 writes the extracted presentation control information PCI into the buffer 141.

The decoder 112 reads out user data (video data) from the video packs V in the buffer 111. The decoder 112 cooperates with the buffer 113, thereby decoding the video data into a corresponding video signal. The decoder 112 writes the video signal into the buffer 114. In addition, the decoder 112 outputs the video signal to the switch 115. The switch 115 selectively connects the letter box converter 116 to the decoder 112 or the reorder buffer 114. When the switch 115 connects the letter box converter 116 to the decoder 112, the letter box converter 116 receives the video signal from the decoder 112. In this case, the letter box converter 116 subjects the received video signal to given conversion. The letter box converter 116 outputs the conversion-resultant signal to the adder 117. When the switch 115 connects the letter box converter 116 to the buffer 114, the letter box converter 116 accesses the video signal in the buffer 114 and reorders the video signal. In this case, the letter box converter 116 subjects the reordering-resultant video signal to the given conversion. The letter box converter 116 outputs the conversion-resultant signal to the adder 117.

The decoder 122 reads out video data from the sub picture packs SP in the buffer 121. The decoder 122 cooperates with the buffer 123, thereby decoding the video data into a sub picture signal. The decoder 122 outputs the sub picture signal to the adder 117. The adder 117 combines the output signal of the letter box converter 116 and the output signal (the sub picture signal) of the decoder 122 into a sub-picture-added video signal. The adder 117 outputs the sub-picture-added video signal to an external device (not shown).

The decoder 132 reads out information from the audio control packs A-CONT in the buffer 111. In addition, the decoder 132 reads out user data (audio data) from the audio packs A in the buffer 131 in response to the A-CONT information. The decoder 132 cooperates with the buffer 133, thereby combining the user data into an audio data stream and decoding the audio data stream into a corresponding audio signal in response to the A-CONT information. The decoder 132 outputs the audio signal to an external device (not shown).

The decoder 142 reads out the presentation control information PCI from the buffer 141. The decoder 142 cooperates with the buffer 143, thereby decoding the presentation control information PCI into highlight information. The decoder 142 writes the highlight information into the buffer 144. The decoder 145 reads out the highlight information from the buffer 144. The decoder 145 cooperates with the buffer 146, thereby decoding the highlight information. The decoder 145 outputs the decoding-resultant information to an external device (not shown).

What is claimed is:

1. A digital signal recording disc comprising:

a first area (ATS D) storing an audio manager and an audio title set (ATS) which comprises one or more audio pack(s) containing at least first and second channel digital audio signals of a plurality of channels of audio data, wherein said plurality of channels are divided into first and second channel groups (Group 1,2);

the audio title set (ATS) including an audio title set information (ATSI) containing information of first and second parameters respectively relating to the first and second channel digital audio signals, the first parameter comprising at least one item selected from the group comprising;

quantization bit numbers (Q1,Q2) of the first and second group channel digital audio signals;

sampling frequencies (fs1,fs2) of the first and second channel group digital audio signals;

the second parameter (CHANNEL ASSIGNMENT) comprising assignment of the first and second channel digital audio signals to said first and second channel groups;

the digital signal recording disc being void of a second area (VTS D) storing a video title set (VTS);

wherein said audio pack having a private header storing information of first and second parameters respectively relating to the first and second channel digital audio signals, the first parameter comprising at least one item selected from the group comprising;

quantization bit numbers (Q1,Q2) of the first and second group channel digital audio signals;

sampling frequencies (fs1,fs2) of the first and second channel group digital audio signals; and the second parameter (CHANNEL ASSIGNMENT) comprising assignment of the first and second channel digital audio signals to said first and second channel groups.

2. A digital signal recording disc as recited in claim 1, wherein the quantization bit numbers of the first and second channel digital audio signals are different from each other.

3. A digital signal recording disc as recited in claim 2, wherein the sampling frequencies of the first and second channel digital audio signals are different from each other.

4. A method of recording data to or reproducing data from the digital signal recording disc of claim 1.

5. A digital signal recording disc as recited in claim 1, wherein the audio title set (ATS) comprises an audio-only-title audio-object AOTT-AOB, and the audio title set information (ATSI) contains an audio-only-title audio-object attribute AOTT-AOB-ATR for storing the information of first and second parameters.

* * * * *